(12) United States Patent
Saitou et al.

(10) Patent No.: US 6,381,512 B1
(45) Date of Patent: Apr. 30, 2002

(54) MOLDING-CONDITION RECOVERY DEVICE IN INJECTION MOLDING MACHINE

(75) Inventors: Osamu Saitou; Kazuo Kubota, both of Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 09/321,355

(22) Filed: May 27, 1999

(30) Foreign Application Priority Data

May 28, 1998 (JP) .......................................... 10-164299

(51) Int. Cl.[7] .............................................. B29C 45/00
(52) U.S. Cl. .......................... 700/200; 700/82; 702/187
(58) Field of Search ................................ 700/200, 197, 700/201, 204, 82, 21, 87; 702/187

(56) References Cited

U.S. PATENT DOCUMENTS

| | | | | |
|---|---|---|---|---|
| 5,559,991 A | * | 9/1996 | Kanfi | .......................... 711/162 |
| 5,795,511 A | * | 8/1998 | Kalantzis et al. | .......... 264/40.6 |
| 5,844,802 A | * | 12/1998 | Lepper et al. | ............... 700/115 |
| 6,073,059 A | * | 6/2000 | Hayashi et al. | .............. 700/204 |

* cited by examiner

*Primary Examiner*—William Grant
*Assistant Examiner*—Zoila Cabrera
(74) *Attorney, Agent, or Firm*—Staas & Halsey, LLP

(57) ABSTRACT

There is provided a molding-condition recovery device which may easily recover the molding condition having been applied in the past, and also permits the storage of the past molding conditions in a memory having small capacity. A reduction in required memory capacity of the modification history storage file is permitted by storing only data of a component subjected to setting modification, among the components of the molding condition, in a modification history storage file. The recovery of the past molding condition is made by replacing all the set values of the presently-applied molding condition or the data in a temporary file stored with all the set values of the first molding condition with data in the modification history storage file in sequence.

17 Claims, 39 Drawing Sheets

FIG. 2
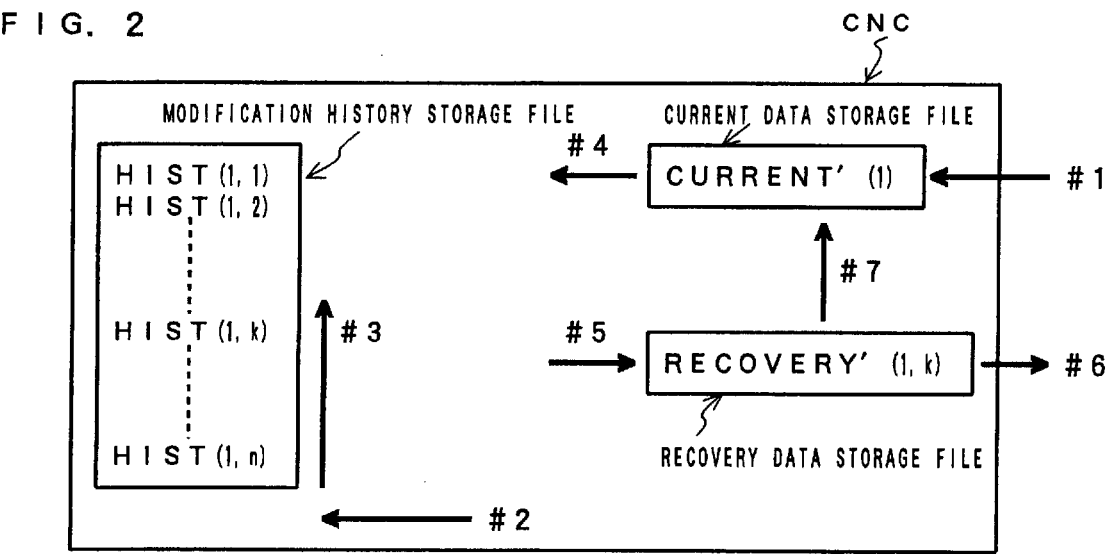
FIG. 3
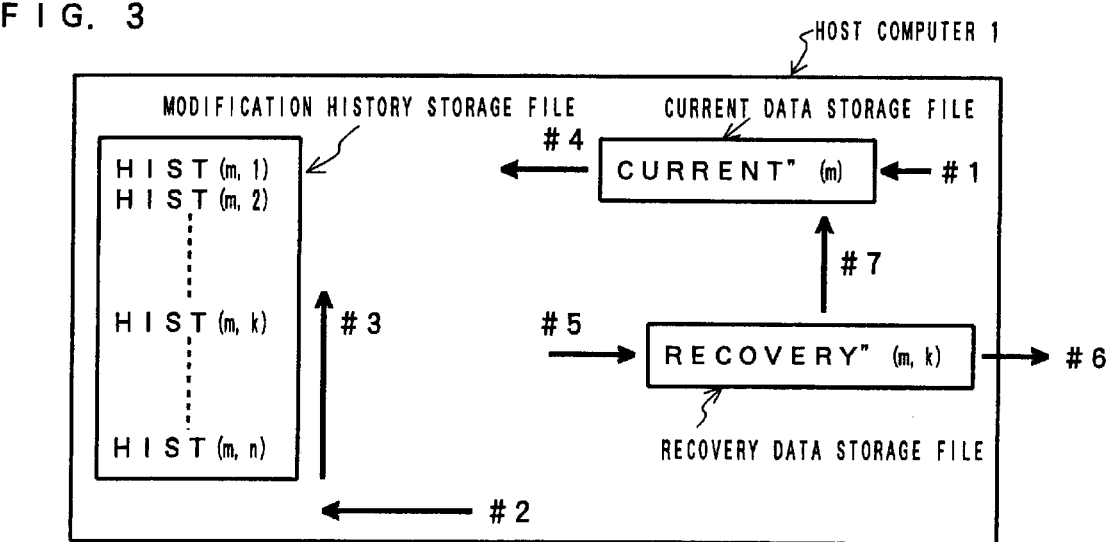
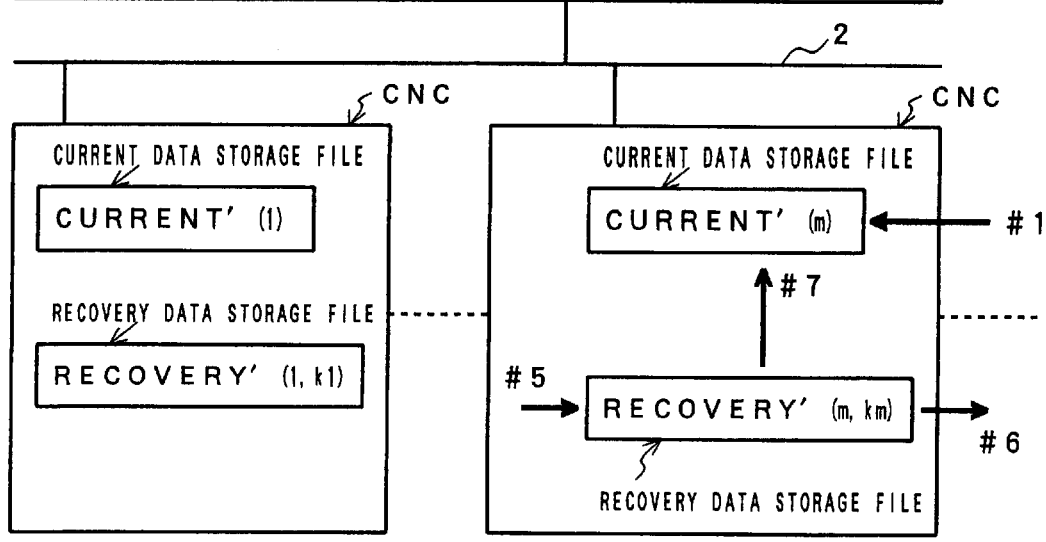

FIG. 4

|  | DATE DATA | MOLDING CONDITION No. | MOLDING CONDITION DATA BEFORE MODIFICATION | MOLDING CONDITION DATA AFTERE MODIFICATION | SHOT DATA | SUPPLEMENTARY DATA |
|---|---|---|---|---|---|---|
| HIST (m, 1) | Date (m, 1) | Pnum (m, 1) | Before P (m, 1) | AfterP (m, 1) | Shot (m, 1) | Add (m, 1) |
| HIST (m, 2) | Date (m, 2) | Pnum (m, 2) | Before P (m, 2) | AfterP (m, 2) | Shot (m, 2) | Add (m, 2) |
| ⋮ | ⋮ | ⋮ | ⋮ | ⋮ | ⋮ | ⋮ |
| HIST (m, k) | Date (m, k) | Pnum (m, k) | Before P (m, k) | AfterP (m, k) | Shot (m, k) | Add (m, k) |
| ⋮ | ⋮ | ⋮ | ⋮ | ⋮ | ⋮ | ⋮ |
| HIST (m, n) | Date (m, n) | Pnum (m, n) | Before P (m, n) | AfterP (m, n) | Shot (m, n) | Add (m, n) |

FIG. 5

| MOLDING CONDITION No. \ MACHINE No. | No. 1 MACHINE ← CURRENT (1) | No. 2 MACHINE ← CURRENT (2) | ------ | No. m MACHINE ← CURRENT (m) | ------ |
|---|---|---|---|---|---|
| 1 (1ST MOLDING CONDITION) | P (1, 1) | P (2, 1) | ------ | P (m, 1) | ------ |
| 2 (2ND MOLDING CONDITION) | P (1, 2) | P (2, 2) | ------ | P (m, 2) | ------ |
| 3 (3RD MOLDING CONDITION) | P (1, 3) | P (2, 3) | ------ | P (m, 3) | ------ |
| ⋮ | ⋮ | ⋮ | ------ | ⋮ | ⋮ |
| i (i (−) TH MOLDING CONDITION) | P (1, i) | P (2, i) | ------ | P (m, i) | ------ |
| ⋮ | ⋮ | ⋮ | ------ | ⋮ | ⋮ |
| PMAX (PMAX (−) TH MOLDING CONDITION) | P (1, PMAX) | P (2, PMAX) | ------ | P (m, PMAX) | ------ |

FIG. 6

| | | RECOVERY (1, k1) ↓ | RECOVERY (2, k2) ↓ | | RECOVERY (m, km) ↓ | |
|---|---|---|---|---|---|---|
| | | No. 1 MACHINE | No. 2 MACHINE | ··· | No. m MACHINE | ·· |
| 1ST MOLDING CONDITION | | Pr (1, 1, k1) | Pr (2, 1, k2) | ··· | Pr (m, 1, km) | ·· |
| 2ND MOLDING CONDITION | | Pr (1, 2, k1) | Pr (2, 2, k2) | ··· | Pr (m, 2, km) | ·· |
| 3RD MOLDING CONDITION | | Pr (1, 3, k1) | Pr (2, 3, k2) | ··· | Pr (m, 3, km) | ·· |
| | | ⋮ | ⋮ | ··· | ⋮ | ⋮ |
| i (−) TH MOLDING CONDITION | | Pr (1, i, k1) | Pr (2, i, k2) | ··· | Pr (m, i, km) | ·· |
| | | ⋮ | ⋮ | ··· | ⋮ | ⋮ |
| PMAX (−) TH MOLDING CONDITION | | Pr (1, PMAX, k1) | Pr (2, PMAX, k2) | ··· | Pr (m, PMAX, km) | ·· |
| DATE DATA | | Dater (1, k1) | Dater (2, k2) | | Dater (m, km) | ·· |
| SHOT No. | | Shotr (1, k1) | Shotr (2, k2) | ··· | Shotr (m, km) | ·· |
| SUPPLEMENTARY DATA | | Addr (1, k1) | Addr (2, k2) | ··· | Addr (m, km) | ·· |

F I G. 25
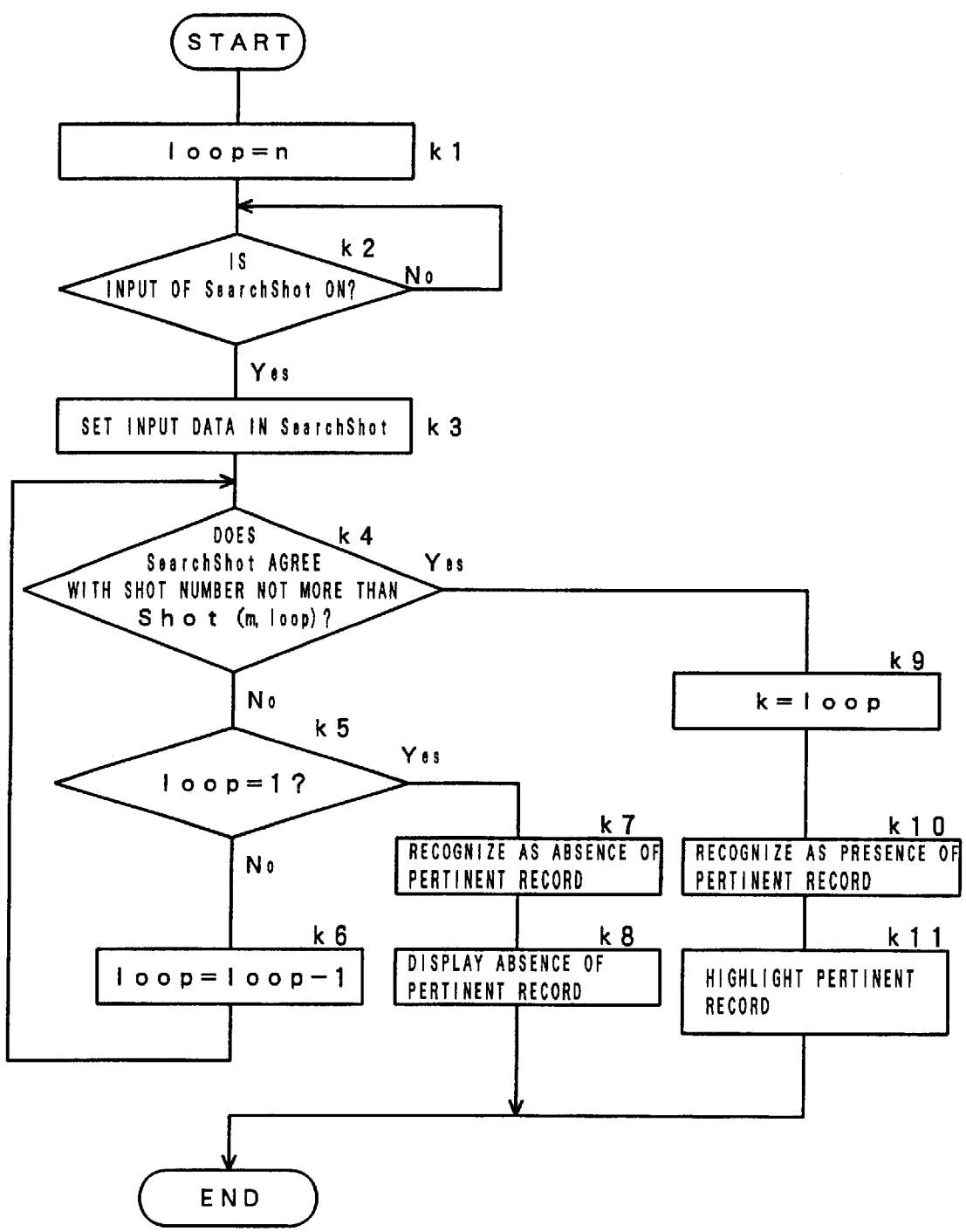

FIG. 28

| RECORD No. | MODIFICATION HISTORY DATA | PRECEDENT RECORD No. | NEXT RECORD No. |
|---|---|---|---|
| 1 | MODIFICATION HISTORY DATA 1 | ABSENCE | 3 |
| 2 | MODIFICATION HISTORY DATA 8 | 7 | END |
| 3 | MODIFICATION HISTORY DATA 2 | 1 | 6 |
| 4 | MODIFICATION HISTORY DATA 4 | 6 | 5 |
| 5 | MODIFICATION HISTORY DATA 5 | 4 | 8 |
| 6 | MODIFICATION HISTORY DATA 3 | 3 | 4 |
| 7 | MODIFICATION HISTORY DATA 7 | 8 | 2 |
| 8 | MODIFICATION HISTORY DATA 6 | 5 | 7 |

REARRANGEMENT IN ASCENDING SEQUENCE

| MODIFICATION HISTORY DATA |
|---|
| MODIFICATION HISTORY DATA 1 |
| MODIFICATION HISTORY DATA 2 |
| MODIFICATION HISTORY DATA 3 |
| MODIFICATION HISTORY DATA 4 |
| MODIFICATION HISTORY DATA 5 |
| MODIFICATION HISTORY DATA 6 |
| MODIFICATION HISTORY DATA 7 |
| MODIFICATION HISTORY DATA 8 |

(b)

REARRANGEMENT IN DESCENDING SEQUENCE

| MODIFICATION HISTORY DATA |
|---|
| MODIFICATION HISTORY DATA 8 |
| MODIFICATION HISTORY DATA 7 |
| MODIFICATION HISTORY DATA 6 |
| MODIFICATION HISTORY DATA 5 |
| MODIFICATION HISTORY DATA 4 |
| MODIFICATION HISTORY DATA 3 |
| MODIFICATION HISTORY DATA 2 |
| MODIFICATION HISTORY DATA 1 |

FIG. 40

No. m MACHINE SCHEDULE DATA FILE

| SCHEDULE No. | PRODUCTION START SCHEDULE | PRODUCTION END SCHEDULE | ... | MOLD No. | RESIN No. |
|---|---|---|---|---|---|
| 1 | 98/01/10 15:00 | 98/01/20 16:00 | ... | 123 | 10 |
| 2 | 98/01/20 16:00 | 98/01/22 10:00 | ... | 432 | 12 |
| : | : | : | ... | : | : |
| 25 | 98/02/01 11:30 | 98/02/03 16:30 | ... | 15 | 23 |
| : | : | : | ... | : | : |

FIG. 41

MOLD FILE

| MOLD No. | MOLD NAME | NUMBER OF OBTAINABLE PODUCTS | ... | REFERENCE CYCLE | MANUFACTURE DATE |
|---|---|---|---|---|---|
| 1 | LENZ-NO-1 | 3 | ... | 65.5 | 98/01/10 |
| 2 | FRAME-NO-1 | 5 | ... | 32.4 | 97/12/12 |
| : | : | : | ... | : | : |
| 15 | GEAR-PART1 | 2 | ... | 27.6 | 96/11/25 |
| : | : | : | ... | : | : |

FIG. 42

RESIN FILE

| RESIN No. | RESIN GRADE | SUPPLIER CODE | ... | RESIN NAME | RESIN COLOR |
|---|---|---|---|---|---|
| 1 | GRADE-001 | 17 | ... | RESIN-001 | WHITE |
| 2 | GRADE-002 | 29 | ... | RESIN-002 | RED |
| : | : | : | ... | : | : |
| 23 | GRADE-023 | 11 | ... | RESIN-023 | YELLOW |
| : | : | : | ... | : | : |

MOLDING-CONDITION RECOVERY DEVICE IN INJECTION MOLDING MACHINE

BACKGROUND OF THE INVENTION

1. Field of the Invention

This invention relates to a molding-condition recovery device for performing a recovery of molding condition in an injection molding machine.

2. Description of the Prior Art

An operation of making out a molding condition in an injection molding machine normally goes through the process of checking the workmanship of products while carrying out molding after setup of an approximately standard molding condition from experience, and altering set values of components such as injection speed and injection pressure in the molding condition one by one according to circumstances until the stable molding condition supposed to be an optimum condition is attained. Subtle modifications on setup of the components of the molding condition are required until an appropriate molding condition is attained.

However, inappropriate modifications made in the course of making out the molding condition frequently cause failures such as a degradation of molding condition, and there is a need for retry of the operation of making out the molding condition by backtrack to the past molding condition as occasion demands. Further, even when the appropriate molding condition is attained once, external factors such as a change in environmental temperature sometimes cause troubles in a presently-applied molding condition, and there is also a need for reuse of the past molding condition, similarly to the above.

Conventionally, an operator has performed a reset of molding condition with reference to past data at need on condition that a record of an operation or the like relating to alternations on setup of the molding condition is made thoroughly in a daily working report on an injection molding machine basis. However, this operation is complicated and causes such a problem that the operator forgets to fill the necessary items.

In Japanese Patent Application Laid-open No. 62-197262, there is disclosed "a method for storage and display of the modification history of set value", as one of means for the settlement of the above problems.

However, this method is merely effective in storing the modification history on a setup item basis in time series every setting modification, and also in displaying intact all the stored histories sequentially in time series, resulting in display of fragmentary contents.

Thus, it is not possible to repeat the past molding condition with accuracy unless the operator resets and puts back set values of components in the molding condition one by one in sequence while referring to the display of the molding condition by backtrack from the present set value to the past for the recovery of the molding condition. Consequently, the recovery of the molding condition requires an extremely troublesome operation. Backtrack of the several times of modification histories is much tolerated, while the recovery operation requiring backtrack to a considerable past molding condition causes skipping or the like of display data in the process of the above backtrack and makes it impossible to normally repeat the molding condition as of the desired past point of time.

It is possible from the technical point of view to store all the set values of the molding condition as of setting modification for writing by batch processing. However, in this case, a large number of set data of practically-unmodified components are also stored redundantly every setting modification, resulting in a waste of a memory storage area.

OBJECTS AND SUMMARY OF THE INVENTION

It is an object of the present invention to provide molding-condition recovery device which may easily recover a molding condition applied in the past, without the need for complicated operation, as the result of dissolving the drawbacks in the above prior art.

According to one aspect of the present invention for attaining the above object, a molding-condition recovery device comprises a modification history creating means for writing a modified component of a molding condition and its set value precedent to the modification in a modification history storage file for storage in association with the sequence of modifications every setup of the molding condition; a set-up means for setting up a point of time of recovery of the molding condition; and a means for recovering the molding condition, upon completion of the setup for the point of time of recovery of the molding condition, by replacing a set value for the component read out from the latest modification history in the modification history file by backtrack to the past in sequence, among the components of the molding condition as of completion of the above setup, with the readout set value precedent to modification.

According to another aspect of the present invention, a molding-condition recovery device comprises a modification history creating means for writing a modified component of a molding condition and its set value subsequent to the modification in a modification history storage file for storage in association with the sequence of modifications every setup of the molding condition; a set-up means for setting up a point of time of recovery of the molding condition, and a means for recovering the molding condition, upon completion of the setup for the point of time of recovery of the molding condition, by replacing a set value for the component read out from the oldest modification history in the modification history storage file in sequence by trace, among the components of the first molding condition, with the readout set value subjected to modification.

The recovered molding condition is displayed on a display screen or is set as an object molding condition in an injection molding machine.

A plurality of injection molding machines may be connected to a host computer to manage the modification history of each injection molding machine by batch processing on the side of the host computer.

The molding-condition recovery device displays a synopsis of the modification history storage file on the display screen to permit the selection of a target molding condition for recovery. In addition, as a means for specifically selecting the target molding condition for recovery, there are provided a means for selecting the target molding condition for recovery by designating a time of setting modification or a range of the time of setting modification, that for specifically selecting the target molding condition for recovery by designating a shot number or a range of the shot number, that for specifically selecting the target molding condition for recovery by designating a keyword, that having a data base for storing various keywords in association with each other to specifically select the target molding condition for recovery by making a search for a modification history having a designated keyword or a keyword relating to the designated keyword and that for specifically selecting the target molding condition for recovery by designating the component of the molding condition.

Further, the molding-condition recovery device comprises a plurality of set-up means for selecting the target molding condition for recovery and may select a point of time satisfying the condition redundantly designated by two or more of the above set-up means as a point of repetition of the molding condition.

Instead of the operation of specifying the point of repetition of the molding condition by designating the condition with the setup means, the molding-condition recovery device may execute the so-called undo processing to make backtrack to the past in a search for the point of repetition of the molding condition in units of one modification history at a time every operation of the set-up means.

The molding-condition recovery device according to the present invention permits the reference to the past molding condition after the recovery thereof through automatic processing with ease and also may set the recovered molding condition intact as object set data for the injection molding machine.

Besides, since the molding-condition recovery device performs the recovery of the past molding condition by the steps of causing only the practically-modified component among the plurality of components forming the molding condition to be stored in the modification history storage file, and then replacing data of each item of the molding condition by backtrack to the older molding condition in the search of the modification history storage file from the presently-applied molding condition in sequence or replacing data of each item of the molding condition by trace from the initial value of the firstly-applied molding condition to the latest molding condition in the search of the modification history storage file in sequence, it is possible to substantially reduce a required memory capacity, in comparison with the conventional device which requires storage of all the components of the molding condition every setting modification for storage of the modification history.

Further, since the molding-condition recovery device according to the present invention may make a search for the molding condition by selecting a desired means for specifically selecting the target molding condition for recovery out of a group consisting of a means for automatically selecting the target molding condition for recovery by designating a time of setting modification or a range of the time of setting modification, that for automatically selecting the target molding condition for recovery by designating a production shot number or a range of the production shot number, that for automatically selecting the target molding condition for recovery by designating a keyword, that having a data base for storing various keywords in association with each other to automatically select the target molding condition for recovery by making a search for the modification history having a designated keyword or a keyword relating to the designated keyword, that for automatically selecting the target molding condition for recovery by designating a modified component of the molding condition and that for automatically selecting the target molding condition for recovery by displaying a synopsis of a modification history storage file on a display screen, it is possible to easily make a search for the target past molding condition for recovery.

Particularly, when the molding-condition recovery device needs to select the target molding condition for recovery by making a search for the modification history having the designated keyword or the keyword relating to the designated keyword through the data base, the mere storage of one keyword in the modification history storage file permits the search using various keywords relating to this stored keyword, and besides, only one keyword is sufficient to be stored in a record of the modification history storage file, resulting in saving of the memory capacity.

Further, since the molding-condition recovery device may specify the target molding condition for recovery by a combination of a plurality of designating means, it is possible to easily execute the operation of specifying the molding condition by narrowing down the search for the molding condition as the result of the combination of various designating means.

Furthermore, the molding-condition recovery device may recover the molding condition by backtrack to the past in units of one modification history at a time every operation of the means for setting up the point of repetition of the molding condition and, as a result, is convenient for repetition of the relatively latest molding condition as well.

BRIEF DESCRIPTION OF THE DRAWINGS

The foregoing and other objects and features of the invention will become apparent from the following description of preferred embodiments of the invention with reference to the accompanying drawings, in which:

FIG. 2 is a block diagram showing the outline of the internal processing of a CNC device provided for each injection molding machine in the case of managing a modification history storage file individually by the CNC device;

FIG. 3 is a block diagram showing the outline of the internal processing in the case of managing a modification history storage file of each injection molding machine by batch processing on the side of a host computer;

FIG. 4 is a schematic view showing the specific configuration of a modification history storage file;

FIG. 5 is a schematic view showing the configuration of a current data storage file on the side of the host computer;

FIG. 6 is a schematic view showing the configuration of a recovery data storage file on the side of the host computer;

FIG. 25 is a flow chart showing the processing in the case of specifying a target point of time of recovery of the molding condition by designating a total shot number;

FIG. 28 is a schematic view showing another configuration of the modification history storage file;

FIGS. 29(a) and (b) are a schematic view showing a further configuration of the modification history storage file;

FIG. 40 is a schematic view showing a schedule data file;

FIG. 41 is a schematic view showing a mold file;

FIG. 42 is a schematic view showing a resin file; and

DETAILED DESCRIPTION OF THE PREFERRED EMBODIMENTS

Figure 1:
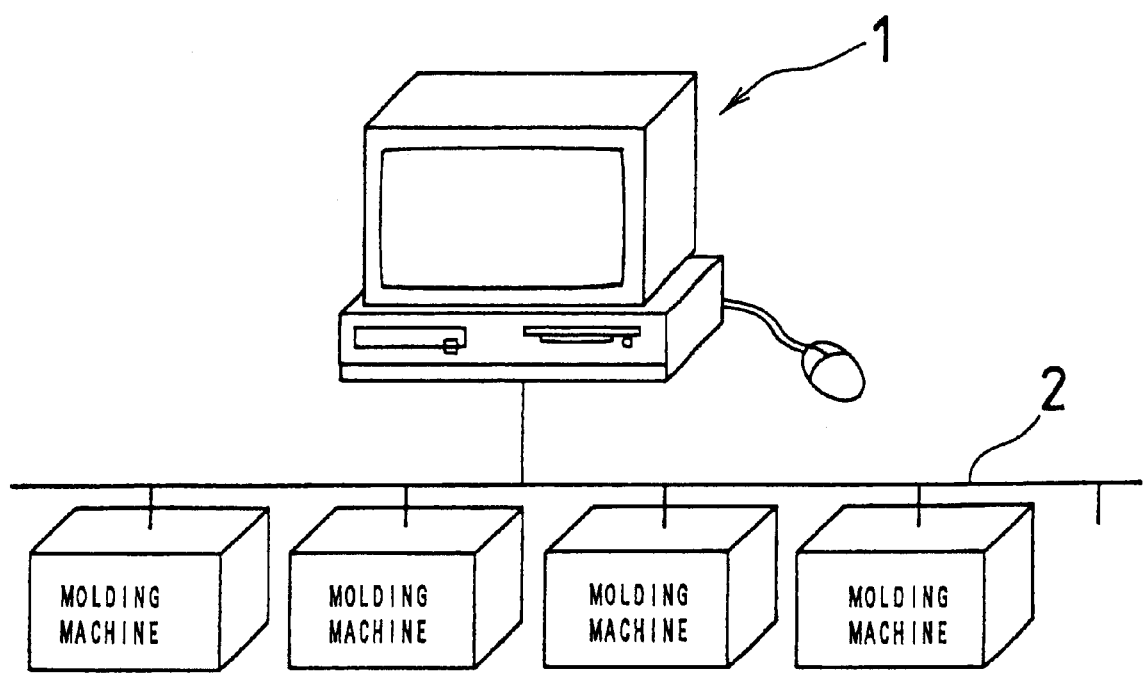
FIG. 1 is a schematic view showing an embodiment according to the present invention.

Hereinafter will be described embodiments of the present invention with reference to the accompanying drawings. FIG. 1 is a schematic view showing one embodiment according to the present invention.

FIG. 1 shows the configuration of a type including a host computer 1 formed by a personal computer or the like to collect data from injection molding machines through a data transmission line 2 for managing a modification history storage file for each injection molding machine by batch processing. The host computer 1 has a data input means such as a keyboard and a mouse and a display or the like, and each injection molding machine is provided with a CNC device serving as a dedicated control device in the form of a one-to-one correspondence. There is no need to use the host computer 1 in the case of managing the modification history storage file for each injection molding machine individually by the CNC device with display for each injection molding machine.

FIG. 2 is a block diagram showing the irreducible minimum processing action of demand for the internal processing of the CNC device with display for each injection molding machine in the case of managing the modification history storage file for each injection molding machine individually by the CNC device. FIG. 2 shows an embodiment by taking the case of No. 1 injection molding machine among a large number of injection molding machines existing in the installation for injection molding.

Each of the modification history storage file, a current data storage file and a recovery data storage file is formed in a memory of the CNC device. Among these files, each of the modification history storage file and the current data storage file needs to be a rewrite-enable nonvolatile memory, while a portion of the recovery data storage file may be a volatile memory.

Each arrow in FIG. 2 is a symbol schematically representing the flow of processing executed by a microprocessor of the CNC device. In the following description, a mark of ['] is placed on data on the side of the injection molding machine, and a mark of ["] is placed on data on the side of the host computer 1 for explicit discrimination therebetween, if need be.

The current data storage file shown in FIG. 2 is for the storage of a molding condition or the like relating to injection molding that is in execution at present. This file is stored with set values serving as components of the molding condition, for instance, data on revolving speed of screw, back pressure of screw, injection pressure, injection stage number, injection speed in each injection stage and cylinder temperature or the like, and a molding action of the injection molding machine is controlled by these set values.

1 is a symbol representing an operation for modification on the molding condition on the basis of operator action, and an operator is permitted to make modifications on the setup of the components of the molding condition one by one at will through an input operation from the keyboard or the like.

The set value of a newly-modified molding-condition component is added to the tail of the modification history storage file for preservation as a new record through the processing of the microprocessor of the CNC device, shown by #2. Data transferred from the current data storage file to the modification history storage file through the processing shown by #2 does not include all data on revolving speed of screw, back pressure of screw, injection pressure, injection stage number, injection speed in each injection stage, cylinder temperature, and the like, but only includes a set value of any component actually subjected to modification, out of those components of the molding condition.

Accordingly, the molding-condition data contained in each record such as HIST(1,1), HIST(1,2) of the modification history storage file is always data on only one of the components of the molding condition, thus resulting in saving of the memory storage area.

FIG. 4 shows the specific configuration of the modification history storage file. The modification history storage file in this embodiment is provided with a field for storage of numerical data of the molding condition precedent to modification, a field for storage of the number of the component subjected to modification on its set value, a filed for storage of a date of the setting modification, a field for storage of a shot number as of setting modification and a field for storage of supplementary data as of setting modification, in addition to a field for storage of new numerical data of the modified molding-condition component.

The component number described above is predetermined such that No. 1 denotes the injection stage number, No. 2 is the injection speed in the first injection stage and No. 3 is the injection speed in the second injection stage and so on, for instance. Further, the date of the setting modification is read from a timer built in the CNC device and is automatically stored, and the shot number as of setting modification is read from a shot counter built in the CNC device and is also automatically stored. Data written in the field for storage of the supplementary data is provided by the steps of storing a comment such as "occurrence of defective products" and "molding condition requiring care" in a non-volatile memory in advance and then selectively inputting this comment, or alternatively, displaying a text input box on a display screen at need and then inputting a predetermined range of character strings manually by the operator through a keyboard operation.

The recovery data storage file shown in FIG. 2 is for recovery of the required past molding condition, for instance, all the molding-condition components as of HIST (1,k) in the modification history storage file, that is, all the data of revolving speed of screw, back pressure of screw, injection pressure, injection stage number, injection speed in each injection stage and cylinder temperature or the like by batch processing, and the molding condition created in this recovery data storage file is allowed to be displayed on the display screen of the CNC device for verification through the processing shown by #6 in the microprocessor of the CNC device, or alternatively, is allowed to be transferred to the current data storage file through the processing shown by #7 in the microprocessor of the CNC device for the application as a new molding condition intact to injection molding. Data stored in the current data storage file is displayed on the display screen of the CNC device through the processing shown by #4 in the microprocessor of the CNC device.

As described above, only one of the components of the molding condition is stored in one record of the modification history storage file. Thus, when the recovery of the molding condition as of HIST(1, k) is required, for instance, input of only data of HIST(1, k) for setup in the recovery data storage file does not permit the recovery of all the components of the molding condition as of HIST(1, k). Normally-recovered data is limited to only the set data of one component stored in HIST(1, k), and this fact is considered to be one of the points at issue in the prior art as viewed in Japanese Patent Application Laid-open No. 62-197262.

In this connection, the embodiment of the present invention applies the microprocessor of the CNC device to the following processing including the steps of duplicating the current data storage file, that is, temporarily creating a temporary file stored with all the components of the current molding condition as initial values, then making backtrack to the target record HIST(1, k) in the search of the modification history storage file from the latest record HIST(1, n) with reference to the modification history storage file through the processing shown by #3 to detect all the modifications made on the setup of the component for a period of time from the latest record to the target record, and sequentially replacing the set data of the component read from the modification history storage file as of detection of modification with the set data of the component stored in the temporary file in association with the target component on the basis of the component number of the target record every detection of the setting modification. Finally, the microprocessor of the CNC device sets up various set data of the temporary file as of backtrack to the record of HIST(1, k) in the recovery data storage file through the processing shown by #5 and treats this set data as the molding condition as of HIST(1, k).

Thus, for the recovery of the past molding condition, the operator does not need to take the step of resetting and putting back the set values of components of the molding condition one by one in sequence with reference to the modification history of the molding condition, and, therefore, a wrong setup by the operator or mistakes in recovery caused by skipping of the modification history may be all eliminated.

The detailed description of the processing required for the operations shown by #3 and #5 will be given later with reference to flow charts.

FIG. 3 is a block diagram showing the irreducible minimum processing action of demand for the internal processing of the host computer 1 and each CNC device in the case of managing the modification history storage file for each injection molding machine by batch processing on the side of the host computer 1.

The processing shown by #1 to #7 in FIG. 3 is basically similar in function to that shown in FIG. 2, except that the modification history storage file for each injection molding machine is equipped en bloc on the side of the host computer 1. Incidentally, FIG. 3 shows the modification history storage file by taking only the case of No. m injection molding machine. However, the modification history storage files are as many as the injection molding machines connected to the host computer 1. The current data storage files and the recovery data storage files on the side of the host computer 1 are also as many as the injection molding machines connected to the host computer 1, as shown in FIGS. 5 and 6.

A description will now be given of the processing for recovery of the past molding condition by managing the modification history storage file individually by the injection molding machine unit, the processing for recovery of the past molding condition by managing the alternation history storage file for each injection molding machine by batch processing on the side of the host computer 1 and various kinds of processing required for the above processing with reference to the flow charts in detail.

Figure 7:
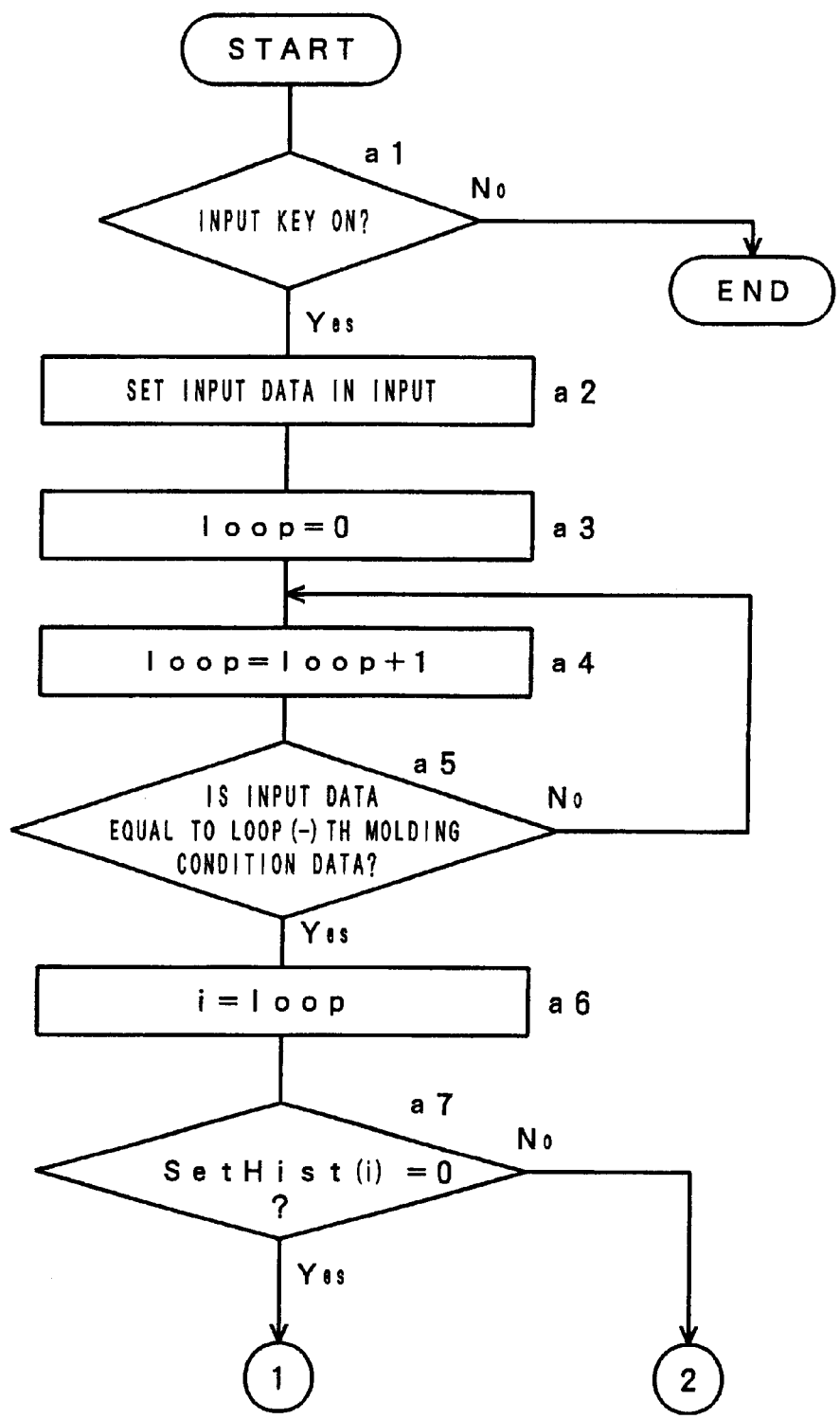
FIG. 7 is a flow chart showing the outline of the processing to alter the setup of a molding condition.
Figure 8:
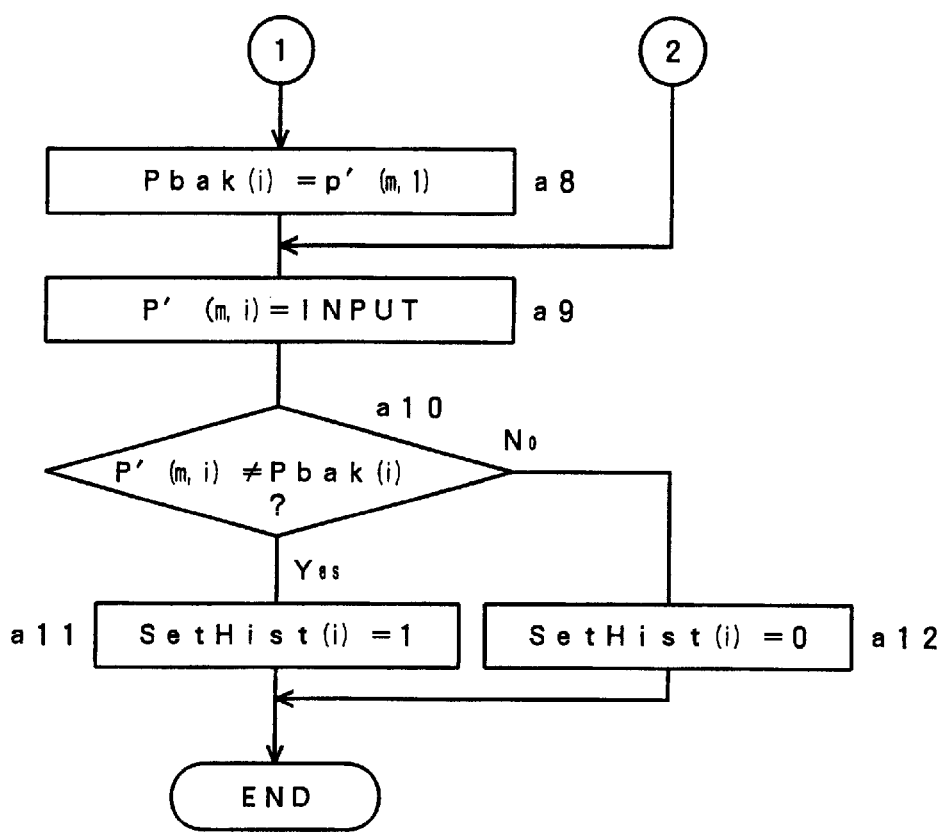
FIG. 8 is a flow chart continued from that shown in FIG. 7 and also showing the outline of the processing to alter the setup of the molding condition.

A description will firstly be given of the processing equivalent to the processing shown by #1 in FIGS. 2 and 3 for setting modification of the molding condition with reference to flow charts shown in FIGS. 7 and 8. This processing is required for the CNC device on the side of the injection molding machine and is started by the operator through the steps of operating the keyboard or the like of the CNC device to designate the number of the component of the molding condition and then operating an input key after input of set data corresponding to the designated component number.

Incidentally, the description in the flow charts of FIGS. 7 and 8 is given by taking the case of the CNC device of No. m injection molding machine. However, other injection molding machines are considered to be similar in processing action of the CNC device to No. m injection molding machine.

After having detected ON operation of the input key (Step a1), the CNC device first temporarily stores a component number selected by the operator and a set value inputted by the operator in a register INPUT (Step a2) and initializes a counter "loop" to 0 (Step a3). Subsequently, the CNC device increments a value of the counter "loop" by 1 (Step a4) and decides whether or not the component number selected by the operator agrees with a current value of the counter "loop" (Step a5). When both do not agree with each other, the CNC device repeatedly executes the processing in Steps a4 and a5 in the manner similar to the above to find a "loop" value corresponding to the component number selected by the operator and stores the found value in a register i (Step a6).

Subsequently, the CNC device decides whether or not a flag SetHist (i) is set (incidentally, this flag is initialized to 0 when the power is applied), that is, whether or not set data of No. i molding-condition component has been already backed up (Step a7). When the flag SetHist (i) is not set, that is, when the set data of No. i molding-condition component is not backed up yet, the CNC device stores set data P' (m, i) of No. i molding-condition component in the current data storage file for No. m injection molding machine in a register Pbak(i) for storage of the backup of the set data of No. i molding-condition component (Step a8). The configuration of the current data storage file in the CNC device of No. m injection molding machine shown in FIG. 3 is similar to that in a column of No. m injection molding machine shown in FIG. 5.

On the other hand, when the flag SetHist (i) is set, the set data of No. i molding-condition component has been already backed up. Thus, there is no need for backup again, and the processing in Step a8 is skipped.

Subsequently, the CNC device updates and stores contents INPUT of the set data of No. i molding-condition component subjected to setting modification by the present operation, as set data P' (m, i) of No. i molding-condition component in the current data storage file (Step a9).

Subsequently, the CNC device decides whether or not the set data P'(m, i) in the current data storage file agrees with the backup Pbak (i) of the set data (Step a10). Then, when both do not agree with each other, the CNC device sets the flag SetHist (i) (Step a11), since there is no need for backup of the contents stored as the set data of No. i molding-condition component in the current data storage file at this point of time, in case where the subsequent modification is made on the set data of No. i molding-condition component in the current data storage file. On the other hand, when both agree with each other, the CNC device resets the flag SetHist (i) (Step a12), since it is considered that the set value of No.i molding-condition component remains unmodified (or is returned to its initial value).

1 of the value for the flag SetHist (i) means that the substantial modification is made on the set value by reason that a value different from the precedent value is assigned for the set data of No.i molding-condition component in the current data storage file. On the other hand, 0 of the value for the flag SetHist (i) means that no substantial modification is made on the set value by reason that the same value as the precedent value is assigned for the set data of No. i molding-condition component in the current data storage file.

The above processing relates to the processing equivalent to that shown by #1 in FIGS. 2 and 3 for setting modification of the molding condition, and the processing for setting modification of the molding condition relating to injection molding which is in execution at present is completed by this operation.

A description will now be given of the processing equivalent to that shown by #2 in FIGS. 2 and 3 for adding a new record to the modification history storage file with reference to flow charts in FIGS. 9 and 10. This processing is executed by the CNC device on the side of the injection molding machine every completion of one cycle of injection molding through input of a first molding action execution command after the above processing for setting modification (this processing is not required every completion of one cycle of automatic/semiautomatic or manual injection molding).

Figure 9:
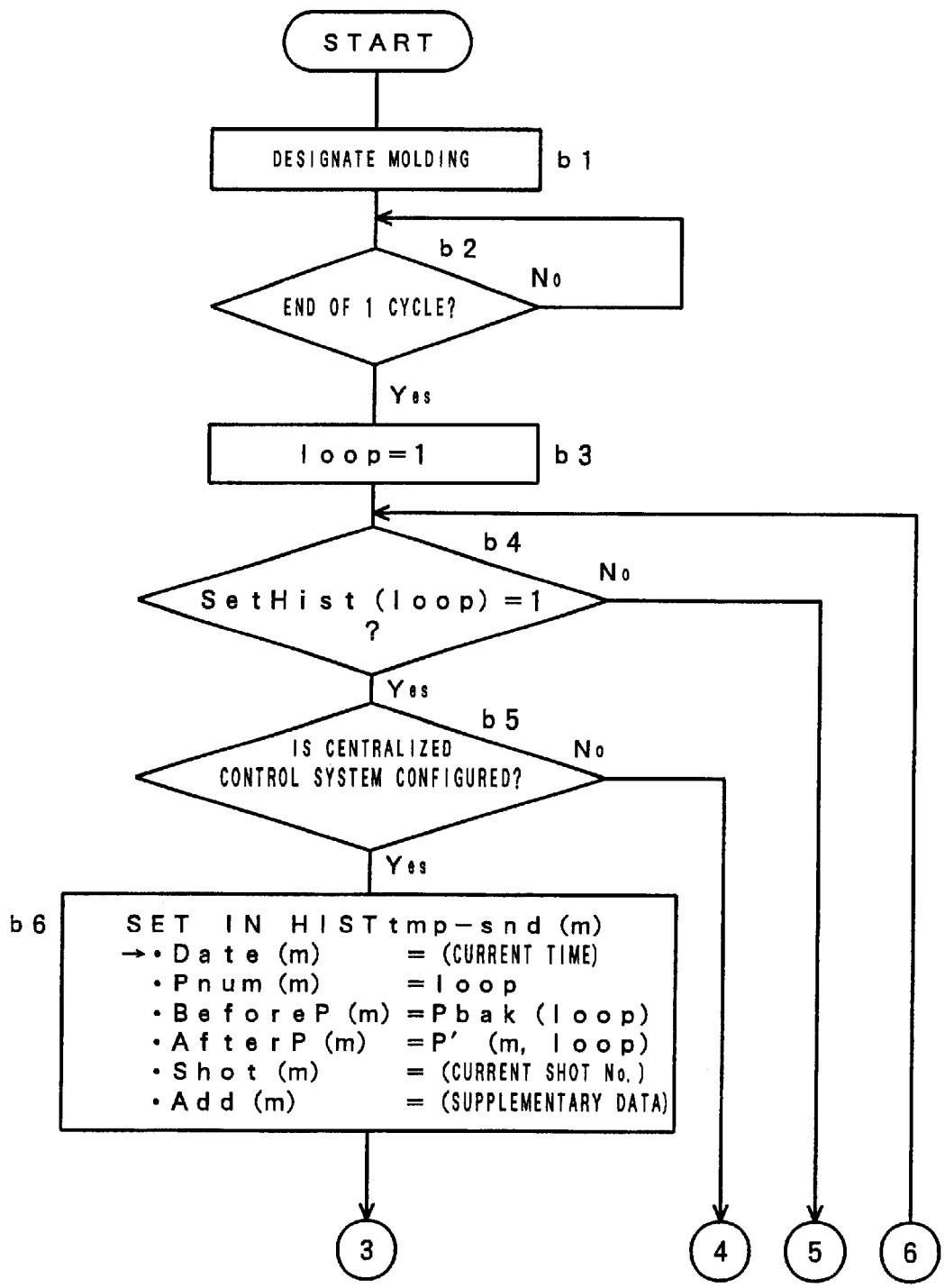
FIG. 9 is a flow chart showing the outline of the processing to add a new record to the modification history storage file.
Figure 10:
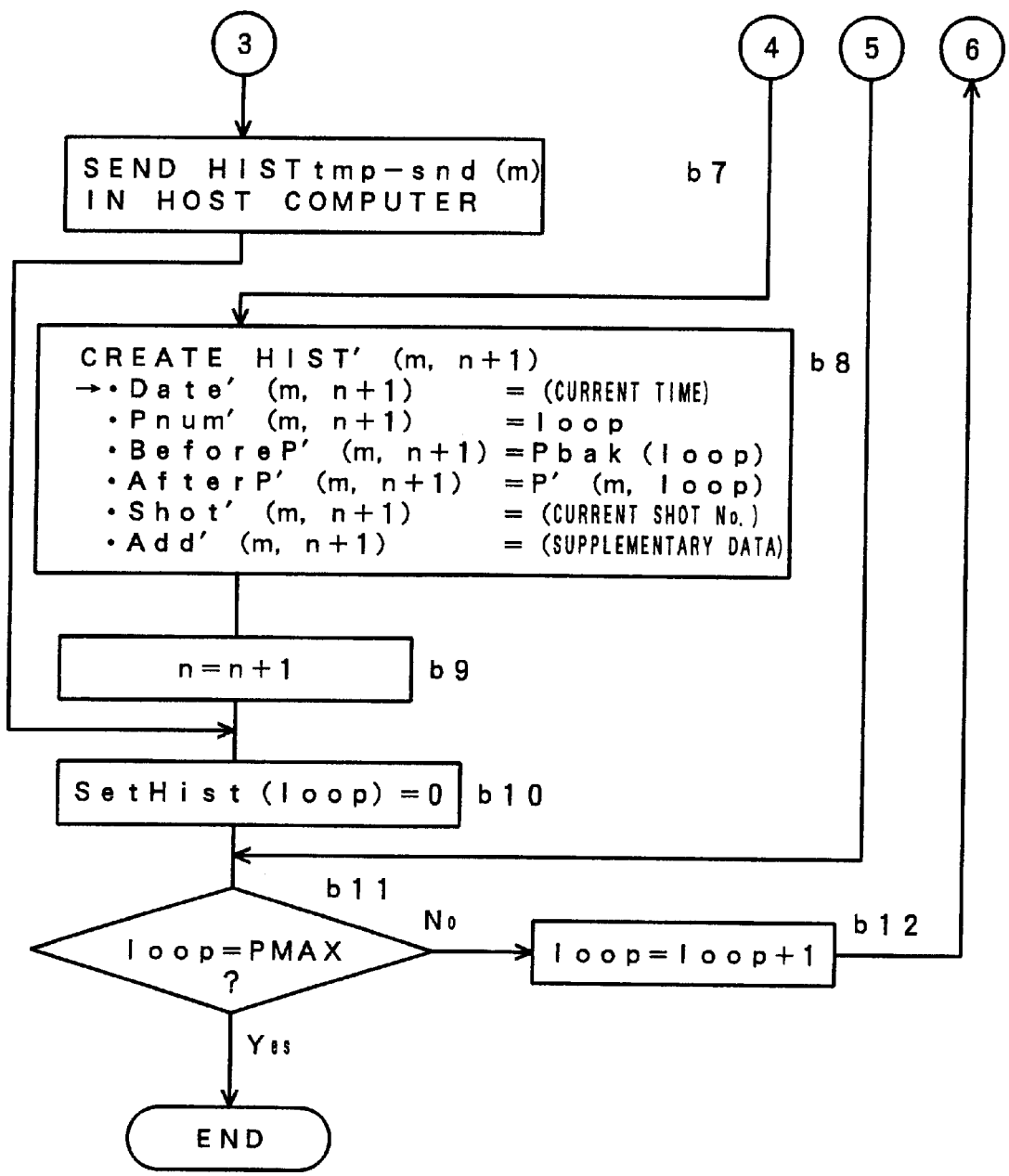
FIG. 10 is a flow chart continued from that shown in FIG. 9 and also showing the outline of the processing to add a new record to the modification history storage file.

The description in the flow charts of FIGS. 9 and 10 is given by taking the case of the CNC device of No. m injection molding machine. However, other injection molding machines are considered to be similar in processing action of the CNC device to No. m injection molding machine. Further, since the processing shown in FIGS. 9 and 10 is applicable to both the case of managing the modification history storage file individually by the injection molding machine unit and the case of managing the modification history storage file for each injection molding machine by batch processing on the side of the host computer 1, there is no need to alter the program on the side of the CNC device in either case of installing the host computer 1 or using the injection molding machines in units.

After having detected the completion of one cycle of the first injection molding subsequent to the setting modification through the processing in Steps b1 and b2, the CNC device firstly initializes the counter "loop" to 0 (Step b3), then inputs a value of the flag SetHist (loop) corresponding to a current value of the counter "loop" and decides whether or not the value of the flag is 1 (Step b4).

1 in the value of the flag SetHist (loop) means that the substantial modification is made on the set data of No. i molding-condition component in the current data storage file through the processing for setting modification. On the other hand, 0 in the value of the flag SetHist (i) means that no substantial modification is made on the set data of No. i molding-condition component in the current data storage file. Thus, the processing to add a new record to the modification history storage file is practically required only when the value of the flag SetHist (loop) is 1 (for the effective utilization of a memory).

When the decision in Step b4 results in false (No), that is, when the value of the flag SetHist (loop) is 0, there is no need to add the set data of this component to the modification history storage file, and therefore, the CNC device decides whether or not the current value of the counter "loop" reaches the maximum value PMAX of the number of the molding-condition component (Step b11). When the current value of the counter "loop" does not reach the maximum value PMAX of the number of the molding-condition component, the CNC device increments the value of the counter "loop" by 1 (Step b12) and repeatedly executes the processing in Steps b4, b11 and b12 in the manner similar to the above to find a "loop" value corresponding to the number of the component needing to add its set data to the modification history storage file.

When the molding-condition component with 1 as the value of the flag SetHist (loop) is not detected even if the value of the counter "loop" reaches PMAX, it is considered that there is no component needing to add its set data to the modification history storage file at all. Thus, the CNC device ends intact the processing for addition of the new record after the end of the processing for decision in the final stage in Step b11.

On the other hand, when the decision in Step b4 results in true (Yes) by reason that the "loop" value corresponding to the number of the component needing to add its set data to the modification history storage file is detected in the course of the repetitive execution of the processing in Steps b4, b11 and b12, the processing to transfer the modification history to the host computer 1 or the processing to add the modification history to the modification history storage file in the CNC device of the injection molding machine is selectively executed through the processing in Steps b5 to b9 depending on whether the use is made by connecting the CNC device to the host computer 1 or the injection molding machines are in use in units.

When the use is made of connecting the CNC device to the host computer 1, the decision in step b5 results in true, and the CNC device executes the following processing (step b6).

(a) Set a current time read from a timer built in the CNC device in a data field Date (m) of a temporary storage file HISTtmp-snd(m) available for data transfer.

(b) Set a current value of "loop", that is, a target molding-condition component number for transfer from this time forth, in a data field Pnum (m) of the same file.

(c) Set a value of Pbak (loop), that is, a value of the set data of No. i component having been stored in the current data storage file precedent to rewriting by the present setting modification, in a data field BeforeP(m) of the same file.

(d) Set a value of P' (m, loop), that is, a value of the set data of No. i component stored in the current data storage file subsequent to rewriting by the present setting modification, in a data field AfterP(m) of the same file.

(e) Set a current value of the shot counter of the CNC device in a data field Shot (m) of the same file.

(f) Set supplementary data in a data field Add (m) of the same file.

As described above, the supplementary data in this case is considered to be one of comments such as "occurrence of defective products" and "molding condition requiring care" stored in the non-volatile memory in advance, and the selection of the comment is made by the operator through the input means such as the keyboard. In the case of needing to input desired character strings as a comment by displaying the text input box on the display screen, the operator performs inline input from the keyboard in this stage.

Then, the data set in the temporary storage file HIST tmp-snd(m) is transferred to the host computer 1 through the data transmission line 2 (Step b7) and is then added for storage to the tail of the modification history storage file for No. m injection molding machine managed by the host computer 1 through the processing described later on the side of the host computer 1. Then, the CNC device resets the flag SetHist (loop) (Step b10).

As described above, the processing in Steps b6 and b7 is executed whenever the "loop" value corresponding to the component number needing to add its set data to the modification history storage file is detected through the processing for decision in Step b4. Thus, when modification is made simultaneously on the set data of a plurality of components in the current data storage file through the above processing for modification in setup, consideration is made to execute the processing in Steps b6 and b7 several times over.

On the other hand, when the injection molding machines are in use in units without connecting the CNC device to the host computer 1, the decision in Step b5 results in false (No), and the CNC device makes access to the modification history storage file (See FIG. 4) in the CNC device, creates a new record HIST' (m, n+1) at the tail of the record HIST' (m, n) forming the presently-available final record in the modification history storage file and executes the following processing (Step b8).

(a) Set a current time read from a timer built in the CNC device in a data field Date' (m, n+1) of the record HIST' (m, n+1).

(b) Set a current value of "loop", that is, the number of the molding-condition component, in a data field Pnum' (m, n+1) of the same record.

(c) Set a value of Pbak(loop), that is, a value of the set data of No. i component having been stored in the current data storage file precedent to rewriting by the present setting modification, in a data field BeforeP' (m, n+1) of the same record.

(d) Set a value of P' (m, loop), that is, a value of the set data of No. i component stored in the current data storage file subsequent to rewriting by the present setting modification, in a data field AfterP' (m, n+1) of the same record.

(e) Set a current value of the shot counter of the CNC device in a data field Shot' (m, n+1) of the same file, and set supplementary data in a data field Add' (m, n+1) of the same record.

Selection and input of target supplementary data for setup are made in the manner similar to those in case of the transfer processing described above.

In this case, since the modification history storage file is provided inside the CNC device itself, and the processing for addition of the new record is all executed by the CNC device, there is no need for data transfer processing as shown in Step b7.

Subsequently, the CNC device increments a value of a counter n representing the final record address in the modification history storage file by 1, updates and stores the final record address in the modification history storage file at this point of time in the counter n (Step b9) and resets the flag SetHist (loop) (Step b10).

As described above, the processing in Step b8 is executed whenever the "loop" value corresponding to the component number needing to add its set data to the modification history storage file is detected through the processing in Step b4. Thus, when modification is made simultaneously on the set data of a plurality of components in the current data storage file through the above processing for setting modification, consideration is made to execute the processing in Step b8 several times over. However, since the value of the counter n is updated on all such occasions, no overwriting of the additional record occurs.

In the final stage, whenever the decision in Step b11 results in true, and all the set data of the target component for adding to the modification history storage file are transferred to the host computer 1 or are additionally stored in the modification history storage file of the CNC device itself, the processing for addition of the new record shown in FIGS. 9 and 10 is completed.

A description will now be given of the processing for collection of information on the side of the host computer 1 in the case of managing the modification history storage file for each injection molding machine by batch processing on the side of the host computer 1 with reference to the flow chart in FIG. 11.

This processing is executed by the host computer 1 for the operation equivalent to the processing in Step b8 shown in FIG. 10, instead of the CNC device. That is, this processing is for the host computer 1 to add the latest record of the modification history to the tail of the modification history storage file for No. m injection molding machine on the basis of the data transferred from the CNC device of No. m injection molding machine to the temporary storage file HISTtmp-snd (m) through the processing in Step b7. This processing corresponds to the processing shown by #2 in FIG. 3. Further, this processing for collection of information is started every predetermined cycle through the background processing of the host computer 1 so as to make it possible to receive the data from the CNC device of each injection molding machine surely.

After having started the processing for collection of information, the host computer 1 firstly decides, whether or not any data is transferred from any CNC device, that is, whether data in the file HISTtmp-snd (m) is transferred or not (Step c1). Incidentally, m denotes a peculiar ID code set on each of a CNC device, and its value is different among every injection molding machine. As values of m, 1 is assigned to data transferred from No. 1 injection molding machine, 2 is assigned to data transferred from No. 2 injection molding machine and so on, for instance.

When the decision in Step c1 results in false without the presence of data transferred from the CNC device, the processing in the host computer 1 comes intact to an end, and the substantial processing for collection of information is made non-executable.

On the other hand, when the data transferred from the CNC device is present, the host computer 1 makes access to a temporary storage file HISTtmp-rcv (m) for data input corresponding to No. m injection molding machine having transmitted the target data for reception on this occasion on the basis of the value of the ID code m (Step c2) and executes the following processing (Step c3).

(a) Set a value of a data field Date (m) of HISTtmp-snd (m) in a data field Date (m) of the temporary storage file HIST tmp-rcv (m).

(b) Set a value of a data field Pnum (m) of HISTtmp-snd (m) in a data field Pnum (m) of the temporary storage file HISTtmp-rcv (m).

(c) Set a value of a data field BeforeP(m) of HISTtmp-snd (m) in a data field BeforeP(m) of the temporary storage file HISTtmp-rcv (m).

(d) Set a value of a data field AfterP(m) of HISTtmp-snd (m) in a data field AfterP(m) of the temporary storage file HISTtmp-rcv (m).

(e) Set a value of a data field Shot (m) of HISTtmp-snd (m) in a data field Shot (m) of the temporary storage file HISTtmp-rcv (m).

(f) Set a value of a data field Add (m) of HISTtmp-snd (m) in a data field Add (m) of the temporary storage file HISTtmp-rcv (m).

Subsequently, the host computer 1 makes access to the modification history storage file provided for No. m injection molding machine in the host computer 1 on the basis of the value of the ID code m, creates a new record HIST" (m, nm+1) at the tail of the record HIST" (m, nm) forming the presently-available final record in the modification history storage file for No. m injection molding machine and executes the following processing (Step c4).

(a) Set a value of the data field Date (m) of HISTtmp-rcv (m) in a data field Date" of the record HIST" (m, nm+1).
(b) Set a value of the data field Pnum (m) of HISTtmp-rcv (m) in a data field Pnum" (m, nm+1) of the same record.
(c) Set a value of the data field BeforeP(m) of HISTtmp-rcv (m) in a data field BeforeP" (m, nm+1) of the same record.
(d) Set a value of the data field AfterP(m) of HISTtmp-rcv (m) in a data field After P" (m, nm+1) of the same record.
(e) Set a value of the data field Shot (m) of HISTtmp-rcv (m) in a data field Shot" (m, nm+1) of the same record.
(f) Set a value of the data field Add(m) of HIST tmp-rcv (m) in a data field Add" (m, nm+1) of the same record.

The above processing causes the latest modification history for a presently-received data portion detected through the processing in Step c1 to be stored in the final record of the modification history storage file provided for No. m injection molding machine in the host computer 1. Incidentally, the individual modification history storage file for No. m injection molding machine is substantially similar in configuration to that on the side of the CNC device as shown in FIG. 4.

Subsequently, the host computer 1 resets the data of HISTtmp-snd (m) transferred from No. m injection molding machine, then increments a value of a counter nm representing the final record address of the modification history storage file for No. m injection molding machine by 1 and updates and stores the final record address of the modification history storage file for No. m injection molding machine in this point of time (Step c5).

This processing for collection of information is executed every transfer of the data of HISTtmp-snd (m) through the processing in Step b7 on the side of No. m injection molding machine. Thus, when modification is made simultaneously on the set data of a plurality of components in the current data storage file through the above processing for setting modification, the processing in Steps c1 to c4 is repeated several times. However, since the value of the counter nm is updated on such occasions, no overwriting of the additional record occurs.

Further, since the target modification history storage file for storage of transferred data is individually identified every injection molding machine by the ID code m provided on each CNC device, there is no fear that the modification history is written in a wrong file.

The above description has been given of the details of processing for storage of the modification history of the molding condition in time series according to the file address after the creation of the new record at the tail of the modification history storage file by means of updating the value of the counter n or nm. However, it is not always necessary to store the modification history of the molding condition according to the file address in time series.

In short, the storage of the modification history will do so long as the association between the contents of the modification history and its sequence of modifications is held in the final stage. In case of the modification history storage file shown in FIG. 28 for instance, it is possible to write the modification history at random in a blank record of the file, irrespectively of the sequence of addresses.

According to the embodiment shown in FIG. 28, in the case of writing the modification history in the blank record of the file at random, consideration is made to hold the association between the contents of the modification history and the sequence of modifications by simultaneously storing an address (a last record number) of the record subjected to writing of the modification history immediately before the above random writing and an address (a next record number) of the target record for writing of the next modification history.

In FIG. 28, the records practically subjected to writing, that is, the alternations practically made on the molding condition are arranged in the sequence of 1→3→6→4→5→8→7→2 in address from the viewpoint of time series, and this sequence does not agree with the address sequence of 1→2→3→4→5→6→7→8. However, it is possible to reconfigure the modification histories of the records in the sequence of modifications by referring to the address of the record subjected to writing of the modification history immediately before the random writing and the address of the target record for writing of the next modification history.

That is, the modification history subjected to first modification is stored as a modification history of an address 1 representing "absence" of the last record number, the modification history subjected to next modification is stored as a modification history of the third address corresponding to the next record number "3" stored in the column of the modification history subjected to first modification, and the modification history subjected to subsequent modification is stored as a modification history of the sixth address corresponding to the next record number "6" stored in the column of the modification history of the third address, and so on. Further, consideration is made to store "absence" of the next record number in the address of the record of the final modification history for explicit addressing of the final modification history.

As described above, the trace of the last record number and the next record number both stored together with each modification history makes it possible to trace the modification history according to the sequence of practical modifications or the sequence reverse to the sequence of practical modifications.

Further, sorting with reference to the last record number and the next record number, if need be, permits the creation of a modification history storage file for operation by rearranging the modification history contents in the sequence of practical alternations (ascending sequence) according to the address of the modification history storage file as shown in FIG. 29(a), or rearranging the modification history contents in the sequence reverse to the sequence of practical modifications (descending sequence) by trace-back from the latest address of the modification history storage file as shown in FIG. 29(b).

It is possible to cope with the restrictions placed on the record capacity of the modification history storage file as shown in FIG. 4 by using a file in the form of ring buffer as the modification history storage file or by deleting the old modification history for the storage of a new modification history.

Figure 30:
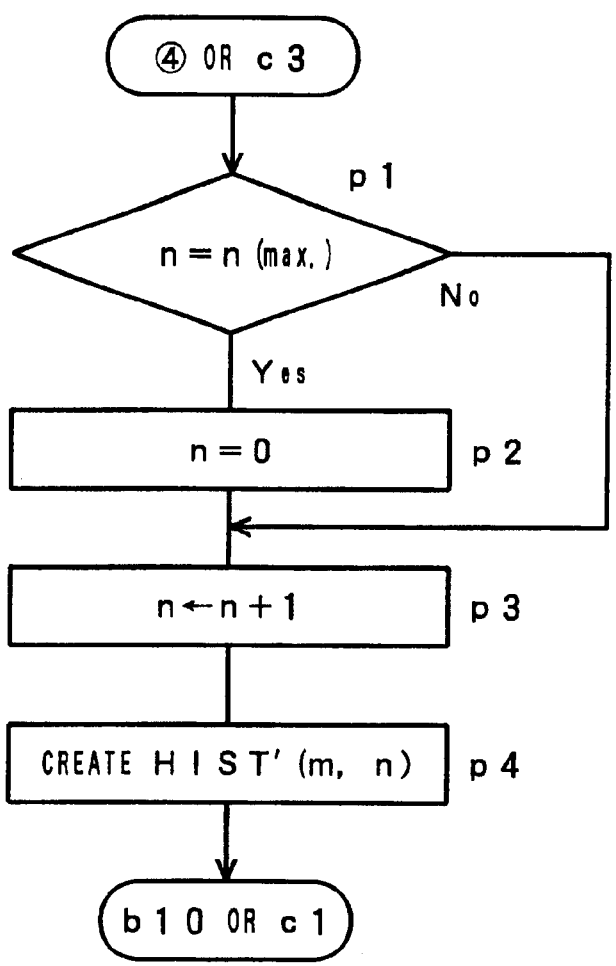
FIG. 30 is a flow chart showing the processing for addition of a new record in the case of placing restrictions on the record capacity of the modification history storage file.

For instance, when the upper limit of a record number n in the modification history storage file as shown in FIG. 4 is given by n (max), the modification history storage file may be used in the form of ring buffer by replacing the processing in Steps b8 and b9 included in the processing for addition of the new record as shown in FIG. 10 with the processing in Steps p1 to p4 as shown in FIG. 30.

Figure 11:
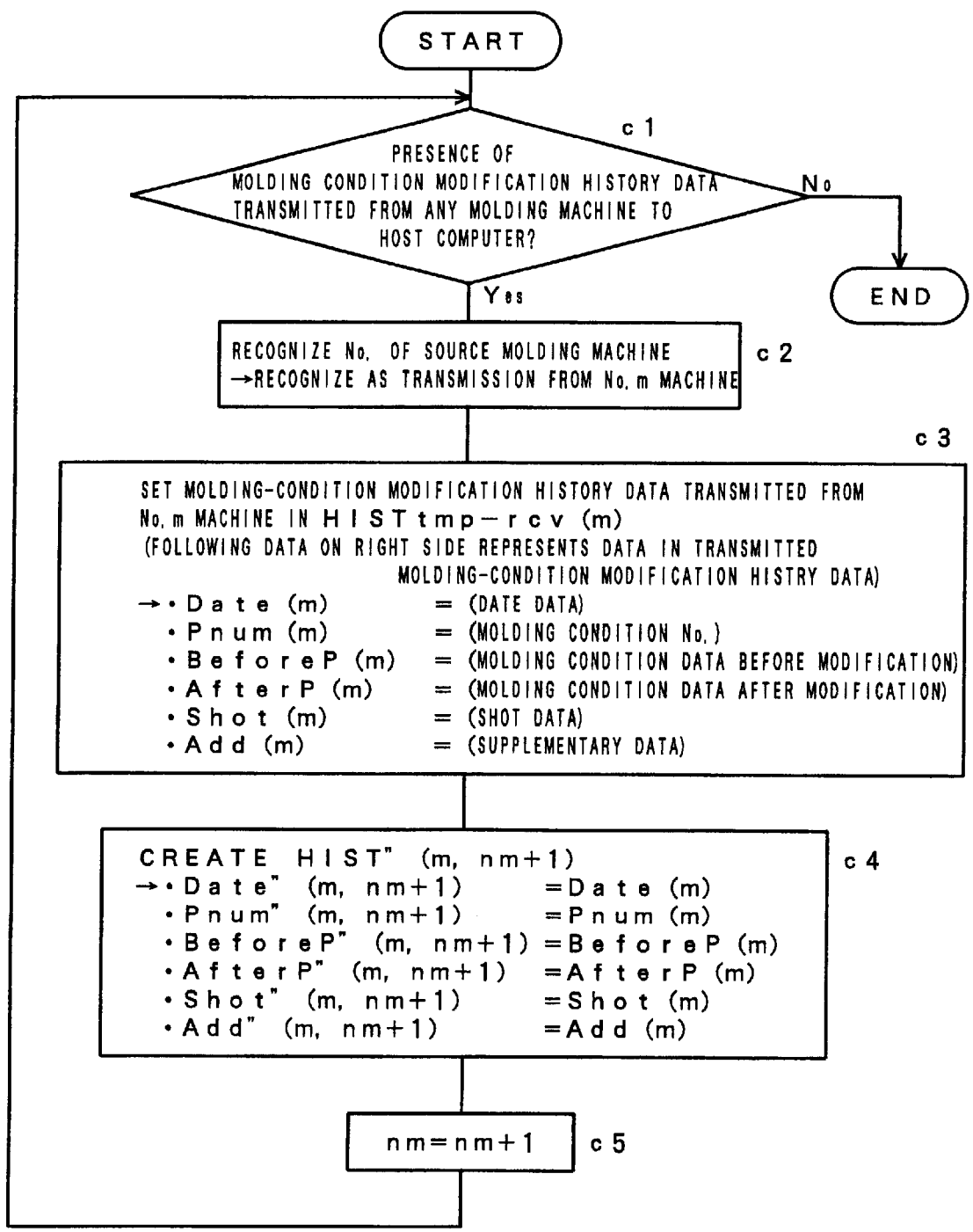
FIG. 11 is a flow chart showing the outline of the processing for collection of information in the case of managing the modification history storage file by batch processing on the side of the host computer.

The processing in the case of managing the modification history storage file on the side of the host computer 1 by batch processing is considered to be similar to the above processing, so long as the processing in Steps p1 to p4 is executed, instead of the processing in Steps c4 and c5 included in the processing for addition of the new record as shown in FIG. 11 by applying the description of the counter n in Steps p1 to p4 to that of the counter nm.

In this case, the CNC device having finished the processing for decision in Step b5 included in the processing for addition of the new record as shown in FIG. 10 or the host computer 1 having finished the processing in Step c3 included in the processing for addition of the new record as shown in FIG. 11 firstly decides whether or not the value of the counter n reaches its limit value n (max) (Step p1). When the counter value does not reach its limit value, the CNC device or the host computer increments the value of the counter n by 1 (Step p3), writes intact the modification history of the molding condition in the record of the modification history storage file shown by the counter n (Step p4) and transfers the processing to Step b10 or c1 included in the processing for addition of the new record.

Further, when it is decided through the processing for decision in Step p1 that the value of the counter n reaches its limit value n (max), and it is ascertained that the modification history is written up to the final record of the modification history storage file, the CNC device or the host computer 1 once initializes the counter n to 0 (Step p2), then increments the value of the counter n by 1 (Step p3) again and then stores the present modification history by overwriting in the record of the modification history storage file corresponding to the value of the counter n, that is, the first record of the modification history storage file.

Consequently, only the modification histories by n (max) times of recent modifications are updated and stored in the modification history storage file at all times, and the precedent modification histories are automatically deleted by overwriting described above.

Further, in the case of needing to delete the old modification history for the storage of the new modification history, consideration is made to partially clear the modification history storage file by designating the range of the target modification history for deletion through the keyboard of the CNC device or the host computer 1.

The above description has been given of the processing in the case of managing a plurality of modification history storage files by batch processing on the side of the host computer 1 on condition that the modification history storage file for each injection molding machine is provided in the substantially independent arrangement in the host computer 1. However, it is not always necessary to arrange the modification history storage file for each injection molding machine independently in the host computer 1.

It may be also possible to store the modification histories for all the injection molding machines synthetically in the single modification history storage file (having one file structure) provided in the host computer 1, so long as the host computer is configured to store the ID code for each CNC device in the single modification history storage file together with the modification history data and executes the processing by identifying a specific injection molding machine which corresponds to a specific modification history with reference to the ID code.

A description will now be given of the processing for automatic recovery of the molding condition with reference to the modification history storage file by backtrack to the past in the case of managing the modification history storage file individually by the injection molding machine unit and the case of managing the modification history storage file for each injection molding machine by batch processing on the side of the host computer 1.

A description will firstly be given of the processing for recovery of the past molding condition and display thereof on a display screen in the case of managing the modification history storage file individually by the injection molding machine unit and also the processing in the case of applying the recovered molding condition intact as the new molding condition to injection molding. The processing for recovery of the molding condition is required for the CNC device on the side of the injection molding machine, is started by the operator through the step of operating the keyboard for the selection of the processing for recovery of the molding condition, and corresponds to the processing shown by #3 to #7 in FIG. 2.

According to the embodiment, the following means are prepared for a means for specifying a target point of time of recovery of the molding condition. That is, there are provided a means for displaying a synopsis of the contents of the modification history storage file on a display screen to directly specify a record address as of the point of time corresponding to the target molding condition for recovery from the synopsis on the display, a means for automatically selecting the record address of the target molding condition for recovery by designating a time of setting modification, a means for automatically selecting the record address of the target molding condition for recovery by designating the total shot number, a means for automatically selecting the record address of the target molding condition for recovery by designating a molding-condition component subjected to setting modification and a means for automatically selecting the record address of the target molding condition for recovery by designating a keyword set up as supplementary data. The operator is permitted to specify the target past point of time of recovery of the molding condition at will by selecting one of the above means as desired (Step d1).

Figure 21:
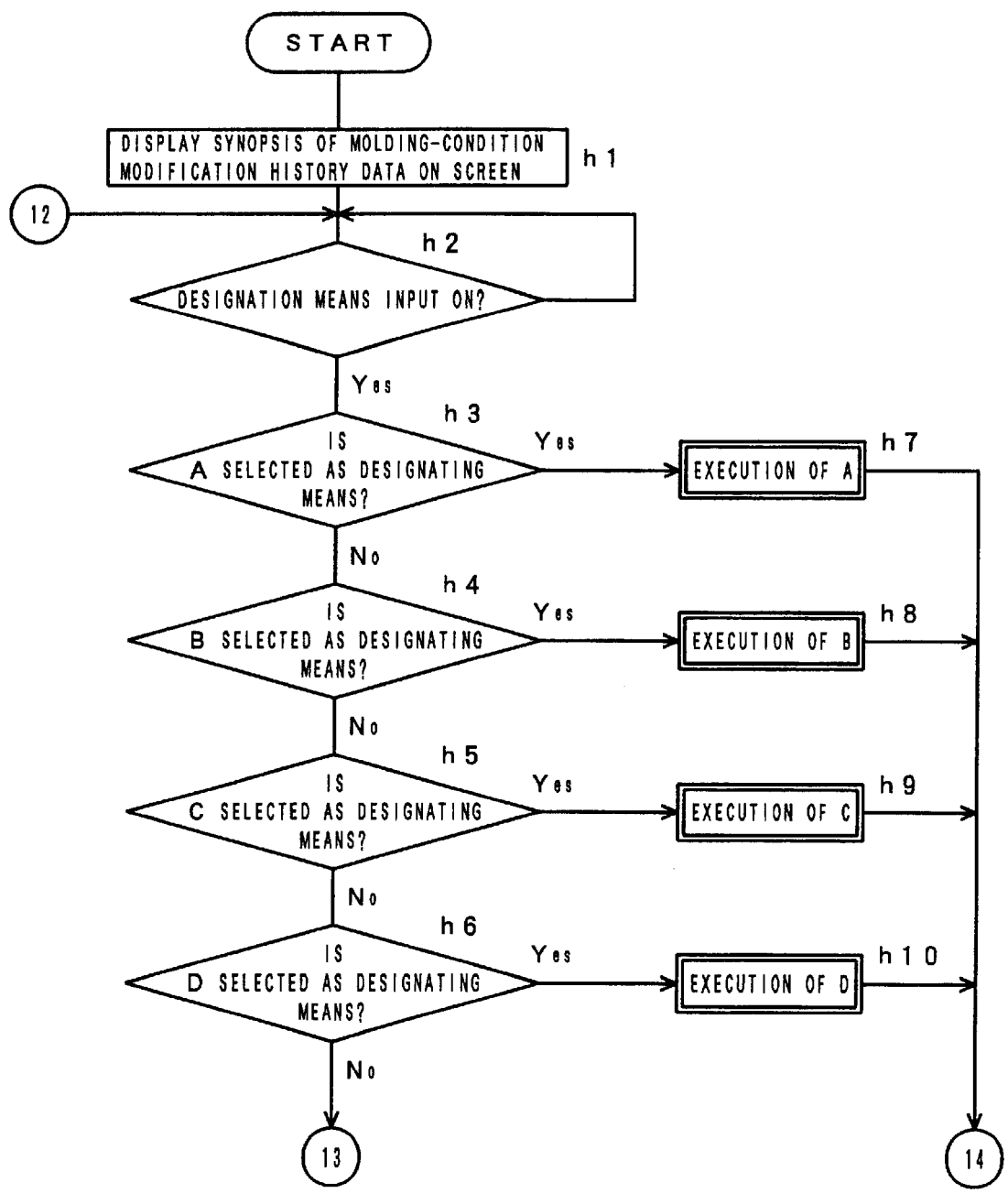
FIG. 21 is a flow chart showing the processing for selection of a recovery means.
Figure 22:
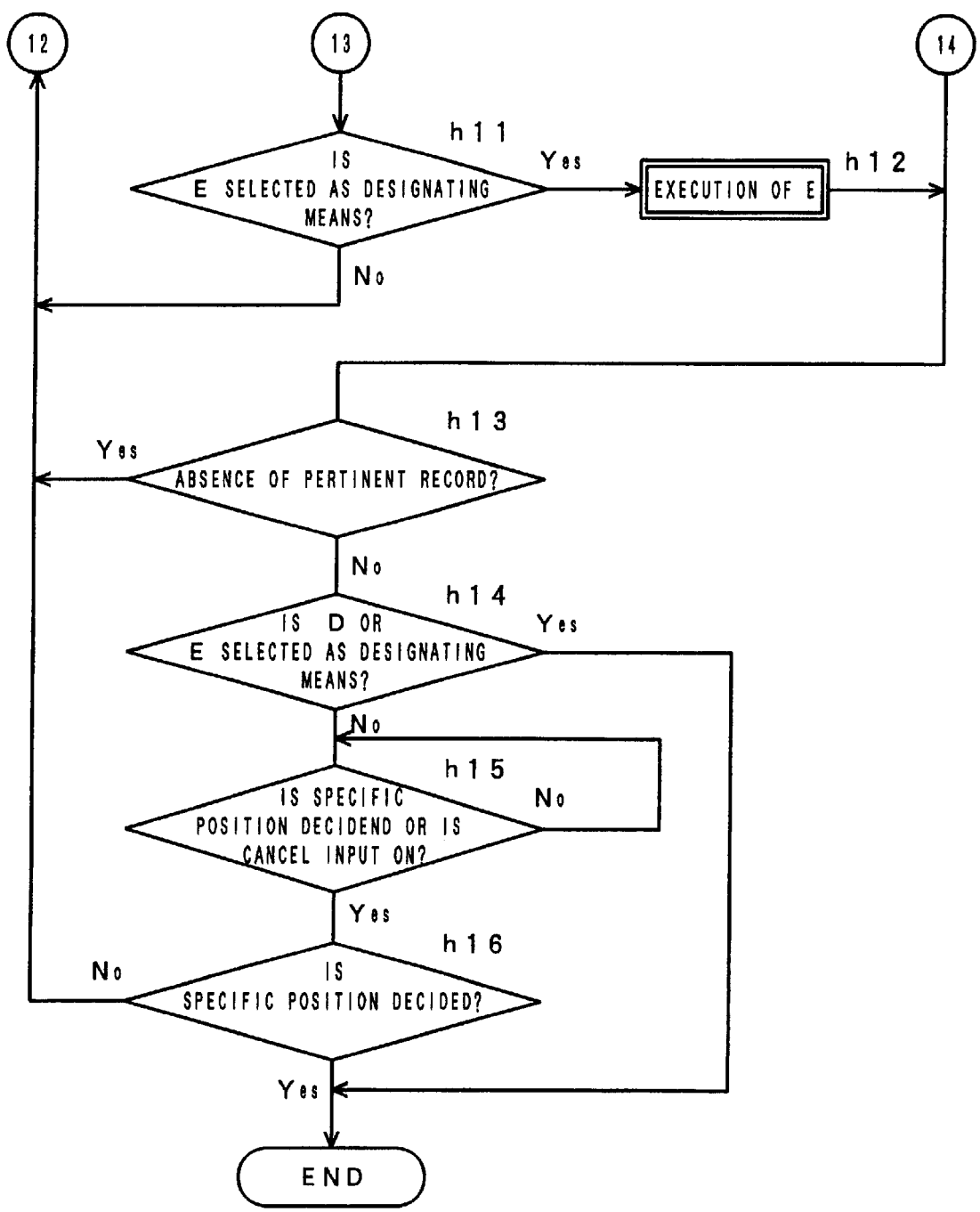
FIG. 22 is a flow chart continued from that shown in FIG. 21 and also showing the processing for selection of a recovery means.

A description will firstly be given of the processing in Step d1 for the execution of each selecting means in detail with reference to flow charts of FIGS. 21 and 22 showing the details of the processing for selection of the recovery means.

After having started the processing for selection of the recovery means shown in FIG. 21, the CNC device firstly displays intact a synopsis of the modification history storage file as shown in FIG. 4 on the display screen of the CNC device (Step h1) and is placed in the standby state until any one of the designating means is selected by the operator through the keyboard operation (Step h2).

Then, when any one of the designating means is selected, the CNC device decides which designating means is selected through the processing for decision in Steps h3 to h6 and h11, and starts the processing according to the selected designating means.

Figure 23:
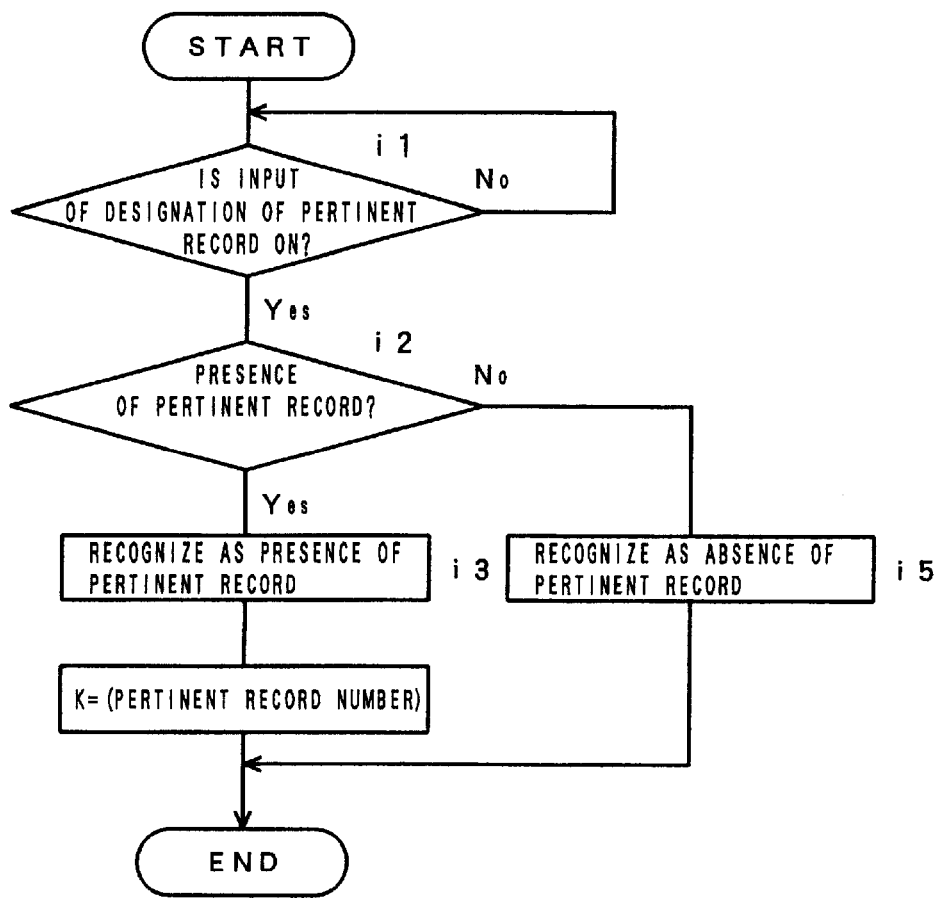
FIG. 23 is a flow chart showing the processing in the case of specifying a target point of time of recovery of the molding condition by directly designating a record address.

When the decision in Step h3 results in true by reason that the means for directly specifying the record address as of the point of time corresponding to the target molding condition for recovery is selected, the CNC device firstly starts the processing in Step h7 as shown in FIG. 23 and is placed in the standby state until the record address of the modification history storage file as of the point of time corresponding to the target molding condition for recovery is directly specified by the operator (Step i1).

Then, when the operator operates the keyboard of the CNC device to input a value of the record address of the modification history storage file as of the point of time corresponding to the target molding condition for recovery, the CNC device detects this input operation through the processing for decision in Step i1 and decides whether or not the same record address as the record address inputted by the operator is present in the modification history storage file (Step i2). When the record address value inputted by the operator is not more than the value of the counter n representing the final record address of the modification history storage file, it is a matter of course that the decision in Step i2 results in true, that is, the same record address as the record address inputted by the operator is considered to be present in the modification history storage file. On the other hand, when the record address value inputted by the operator is higher than the value of the counter n, the decision results in false, and the same record address as the record address inputted by the operator is considered to be absent in the modification history storage file.

When the decision in Step i2 results in false without the presence of the same record address as the record address inputted by the operator in the modification history storage file, it is matter of course that the selection of this record address cannot be made. Thus, the CNC device gives an error message stating the absence of the pertinent record to the display (Step i5) and ends the processing for selection shown in FIG. 23.

On the other hand, when the decision in Step i2 results in true, the same record address as the record address inputted by the operator is considered to be present in the modification history storage file (Step i3), and the CNC device stores the record address value inputted by the operator in the recovery position storage register k (Step i4) and ends the processing for selection shown in FIG. 23.

Figure 24:
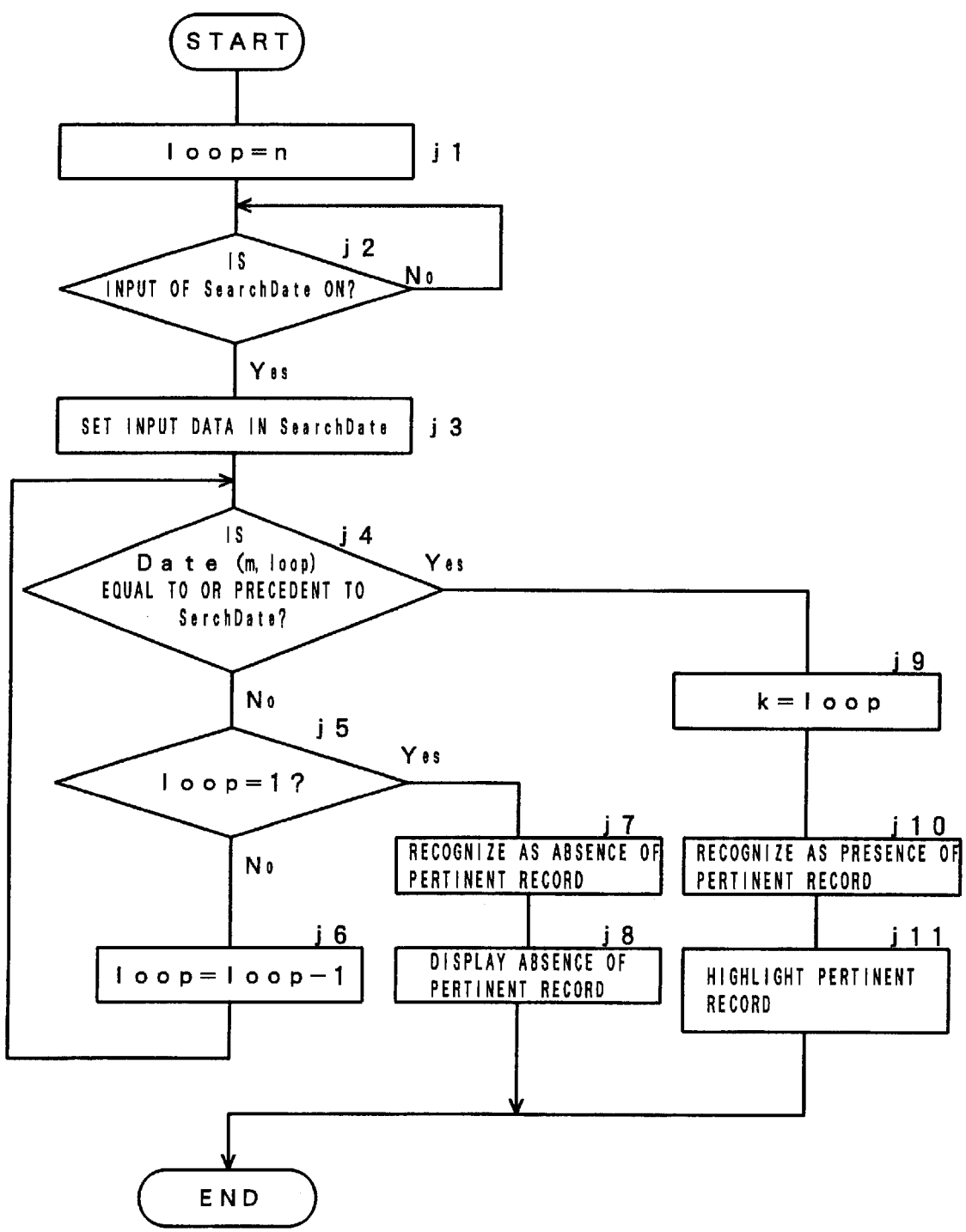
FIG. 24 is a flow chart showing the processing in the case of specifying a target point of time of recovery of the molding condition by designating a time of setting modification.

When the decision in Step h4 of the processing for selection of the recovery means shown in FIG. 21 results in true by reason that the means for automatically selecting the record address as of the point of time corresponding to the target molding condition for recovery by designating the time of setting modification is selected, the CNC device starts the processing in Step h8 as shown in FIG. 24. The CNC device firstly initializes the counter "loop" to a value n of the final record of the modification history storage file (Step j1) and is placed in the standby state until time data for specifying the target molding condition for recovery is inputted by the operator (Step j2).

Then, when the operator operates the keyboard to input the time data, the CNC device detects this input operation through the processing for decision in Step j2 and temporarily stores the time data inputted by the operator in a SearchDate storage register (Step j3).

Subsequently, the CNC device makes access to the record in the modification history storage file corresponding to a current value of the counter "loop" to read date data stored in a field Date (m, loop) for storage of the date of the setting modification, and decides whether the read date is identical with or precedent to the date in the SearchDate storage register (Step j4).

When the value stored in the field Date (m, loop) in the modification history storage file is later than the value in the SearchDate storage register, that is, when the decision in Step j4 results in false, the data stored in the record of the address loop in the modification history storage file is considered to be later than the target molding condition for recovery, and there is a need to recover the molding condition by backtrack to the more precedent point of time.

In this connection, the CNC device decides whether or not the current value of the counter "loop" reaches 1, that is, whether or not a search for the data in the modification history storage file is made by backtrack to the first record (Step j5). When the backtrack to the first record is not made in the search for the data in the modification history storage file, the CNC device decrements the value of the counter "loop" by 1 (Step j6) and executes repeatedly the processing in Steps j14 and j15 in the manner similar to the above to make the search for the record stored with the first date identical with or more precedent to the date stored in the SearchDate storage register. When the decision in Step j4 results in true, the CNC device stores the address of this record, that is, the current value of the counter "loop" in the recovery position storage register k (Step j9). In this case, since the target record address for recovery is considered to be present in the modification history storage file (Step j10), the CNC device highlights the data of the record corresponding to the recovery position storage register k, among the records in the modification history storage file displayed through the processing in Step h1 included in the processing for selection of the recovery means shown in FIG. 21, for notification to the operator (Step j11) and ends the processing for selection shown in FIG. 24.

On the other hand, when the decision in Step j5 results in true without detecting the date identical with or more precedent to the date stored in the SearchDate storage register even though the backtrack to the first record is made in the search for the data in the modification history storage file, the target record address for recovery is considered to be absent in the modification history storage file (Step j7), and the CNC device gives the error message stating the absence of the pertinent record to the display (Step j8) and ends the processing for selection shown in FIG. 24.

The above description has been given of the processing for selection of the record address as of the point of time corresponding to the target molding condition for recovery by designating the time of setting modification. Otherwise, the application of the processing shown in FIGS. 34 and 35 for extracting some candidate conditions for recovery by designating a range of the time of setting modification makes it possible to specify the target molding condition for practical recovery from the extracted candidate conditions.

In this case, the CNC device initializes the counter "loop" to the value n of the final record of the modification history storage file (Step s1), is placed in the standby state until the lower limit (the oldest time) LowSearchDate of the target time of setting modification for searching is inputted by the operator (Step s2), stores the lower limit value (Step s3), is further placed by the standby state until the upper limit (the latest time) HighSearchDate of the target time of setting modification for searching is inputted by the operator (Step s4) and then stores this upper limit value (Step s5).

Subsequently, the CNC device makes access to the record in the modification history storage file corresponding to the current value of the counter "loop" to read the date data stored in the field Date (m, loop) for storage of the date of the setting modification and decides whether or not the read date is within the range from LowSearchDate and HighSearchDate (Step s6).

When the date stored in the field Date (m, loop) in the modification history storage file is not within the range from LowSearchDate and HighSearchDate, this modification history cannot be a candidate for recovery, and there is a need to make a search for other modification histories.

In this connection, the CNC device decides whether or not the current value of the counter "loop" reaches 1, that is, whether or not a search for the data in the modification history storage file is made by backtrack to the first record (Step s13). When the backtrack to the last record is not made in the search for the data in the modification history storage file, the CNC device decrements the value of the counter "loop" by 1 (Step s14) and executes repeatedly the processing in Steps s6 and s13 in the manner similar to the above to make the search for the record stored with the date of the setting modification included between LowSearchDate and HighSearchDate.

However, in this case, some range is allowed in the target time of setting modification for searching. Thus, even when the modification history meeting the requirement is detected through the processing in Step s6, it may well be that other candidates meeting the same requirements as the above are present.

In this connection, the CNC device firstly highlights the record corresponding to the current value of the counter "loop", among the records in the modification history storage file displayed through the processing in Step hi included in the processing for selection of the recovery means shown in FIG. 21, to notify the operator that this highlighted record is one of the candidate records selectable as the target molding condition for recovery (Step s7), and is placed in the standby state until the keyboard is operated by the operator after the decision whether the highlighted record should be selected as the target molding condition for practical recovery or should be skipped over as the molding condition practically serving no recovery (Step s8).

Subsequently, the CNC device decides which of a key for selecting the highlighted record as the target record for recovery or a key for leaving the highlighted record over is pressed by the operator (Step s9).

When the decision in Step s9 results in true by reason that the key for selecting the highlighted record as the target record for recovery is pressed, the CNC device stores the address of the highlighted record, that is, the current value of the counter "loop" in the recovery position storage register k as a record address of the target molding condition for recovery (Step s11). In this case, the target record address for recovery is recognized to be present in the modification history storage file (Step s12)

On the other hand, when the decision in Step s9 results in false by reason that the key for leaving the highlighted record over is pressed, the CNC device releases the record from highlighting to notify the operator that this record is released from the candidate record for selection (Step s10), and decides whether or not the value of the counter "loop" is decremented to 1 (step s13). When the counter value is not decremented to 1, the CNC device decrements the value of the counter "loop" by 1 again, repeatedly executes the processing in the manner similar to the above to detect sequentially the record stored with the date included between LowSearchDate and HighSearchDate by backtrack to the past and repeatedly executes the same processing until one of the detected records is finally selected by the operator as the target record for recovery of the molding condition.

Consequently, since the candidate records for recovery, that is, the records subjected to setting modification within the range of the time of setting modification designated by the operator are highlighted on the display of the CNC device, the operator only needs to take the steps of selecting one of the records at need and then pressing the key for selecting this record as the target record for recovery.

Figure 34:
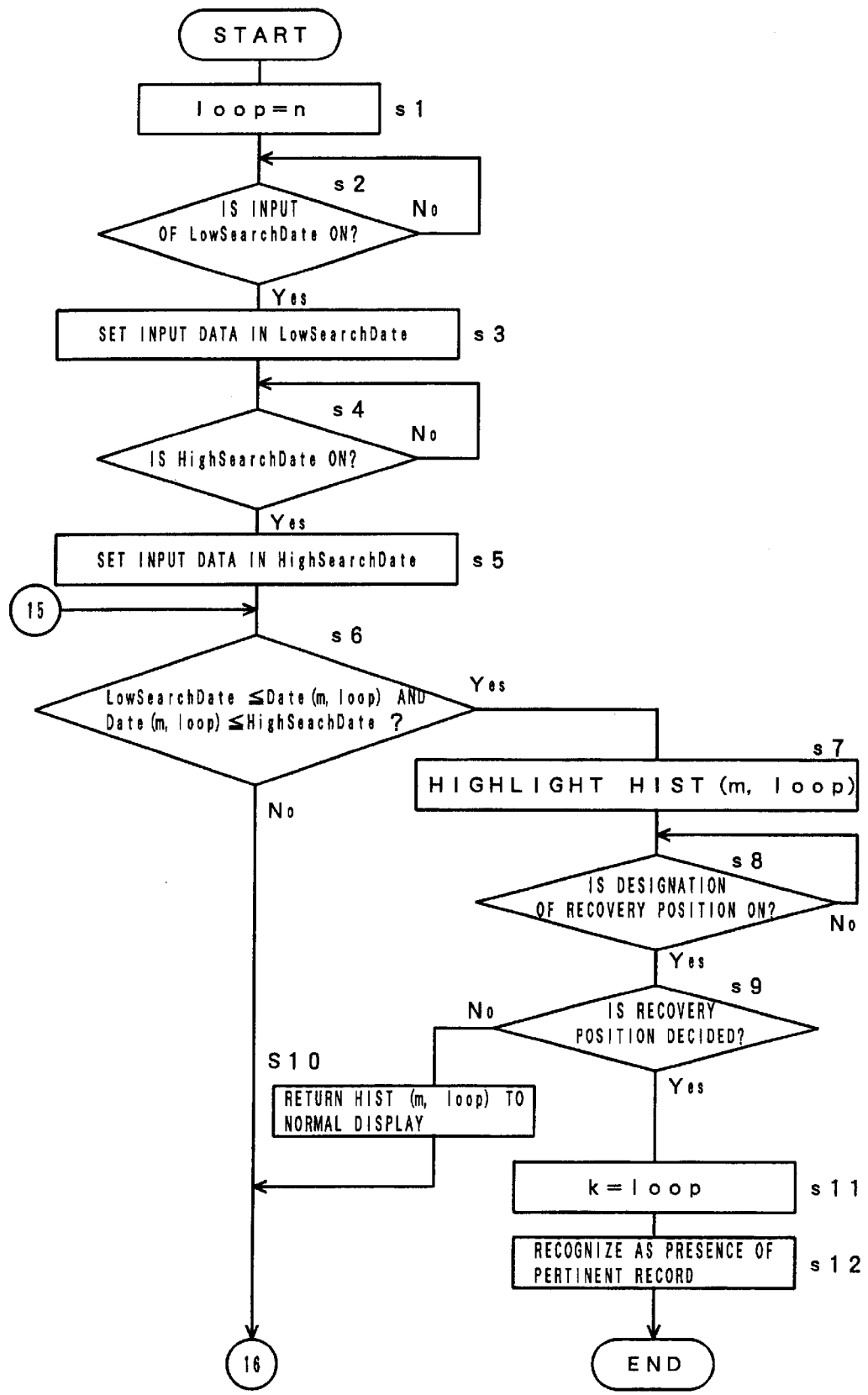
FIG. 34 is a flow chart showing the processing in the case of specifying a target point of time of recovery of the molding condition by designating a range of a time of setting modification.
Figure 35:
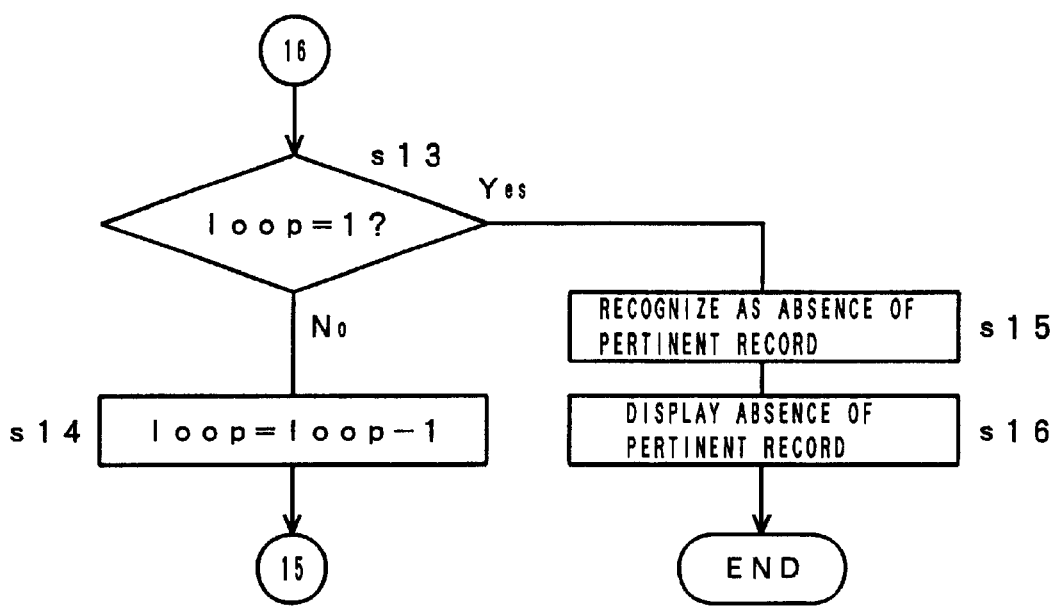
FIG. 35 is a flow chart continued from that shown in FIG. 34 and also showing the processing in the case of specifying a target point of time of recovery of the molding condition by designating a range of a time of setting modification.

Incidentally, when the decision in Step s13 results in true in the course of the repetitive execution of such processing, it is considered that the record stored with the date included between LowSearchDate and HighSearchDate cannot be detected even though the backtrack to the first record is made in the search for the data in the modification history storage file (Step s15), and therefore, the CNC device gives the error message stating the absence of the pertinent record to the display (Step s16) and ends the processing for selection shown in FIGS. 34 and 35.

When the decision in Step h5 in the processing for selection of the recovery means shown in FIG. 21 results in true by reason that the means for automatically selecting the record address as of the point of time corresponding to the target molding condition for recovery by designating the total shot number is selected, the CNC device starts the processing in Step h9 shown in FIG. 25 to firstly initialize the counter "loop" to the value n of the final record of the modification history storage file (Step k1) and is placed in the standby state until shot number data for specifying the target molding condition for recovery is inputted by the operator (Step k2).

Then, when the operator operates the keyboard to input the shot number data, the CNC device detects this input operation through the processing for decision in Step k2 and temporarily stores the shot number data inputted by the operator in a SearchShot storage register (Step k3).

Subsequently, the CNC device makes access to the record in the modification history storage file corresponding to the current value of the counter "loop" to read the shot number data stored in the field Shot (m, loop) for storage of the shot number and decides whether or not the read data value is identical with or smaller than the shot number stored in the SearchShot storage register (Step k4).

When the value stored in the field Shot (m, loop) in the modification history storage file is higher than the value stored in the SearchShot storage register, that is, when the decision in step k4 results in false, the data stored in the record of the address loop in the modification history storage file is considered to be later than the target molding condition for recovery, and there is a need to recover the molding condition by backtrack to the more precedent point of time.

In this connection, the CNC device decides whether or not the current value of the counter "loop" reaches 1, that is, whether or not a search for the data in the modification history storage file is made by backtrack to the first record (Step k5). When the backtrack to the first record is not made in the search for the data in the modification history storage file, the CNC device decrements the value of the counter "loop" by 1 (Step k6) and repeatedly executes the processing in Steps k4 and k5 in the manner similar to the above to make the search for the record stored with the first shot number identical with or smaller than the shot number stored in the SearchShot storage register. When the decision in Step k4 results in true, the CNC device stores the address of this record, that is, the current value of the counter "loop" in the recovery position storage register k (step k9). In this case, since the target record address for recovery is considered to be present in the modification history storage file (Step k10), the CNC device highlights the data of the record corresponding to the recovery position storage register k, among the records in the modification history storage file displayed through the processing in Step h1 included in the processing for selection of the recovery means shown in FIG. 21, for notification to the operator (Step k11) and ends the processing for selection shown in FIG. 25.

On the other hand, when the decision in step k5 results in true without detecting the shot number identical with or smaller than the shot number stored in the SearchShot storage register even through the backtrack to the first record is made in the search for the data in the modification history storage file, the target record address for recovery is considered to be absent in the modification history storage file (Step k7), and the CNC device gives the error message stating the absence of the pertinent record to the display (Step k8) and ends the processing for selection shown in FIG. 25.

The above description has been given of the processing for selection of the record address as of the point of time corresponding to the target molding condition for recovery by designating the total shot number. Otherwise, the application of the processing shown in FIGS. 36 and 37 for extracting some candidate conditions by designating the range of the total shot number also makes it possible to specify the target molding condition for recovery from the extracted candidate conditions.

In this case, the CNC device initializes the counter "loop" to the value n of the final record of the modification history storage file (Step t1), is placed in the standby state until the lower limit LowSearchShot of the target total shot number for searching is inputted by the operator (Step t2), stores this lower limit value (Step t3), is further placed in the standby state until the upper limit HighSearchShot of the target total shot number for searching is inputted by the operator (Step t4) and then stores this upper limit value (Step t5).

Subsequently, the CNC device makes access to the record in the modification history storage file corresponding to the current value of the counter "loop" to read the shot number stored in the field Shot (m, loop) for storage of the total shot number and decides whether or not the shot number is within the range from LowSearchShot and HighSearchShot (Step t6).

When the value stored in the field Shot (m, loop) in the modification history storage file is not within the range from LowSearchShot and HighSearchShot, this modification history is not applied to the candidate history for recovery, and there is a need to make a search for other modification histories.

In this connection, the CNC device decides whether or not the current value of the counter "loop" reaches 1, that is, whether or not a search for the data in the modification history storage file is made by backtrack to the first record (Step t13). When the backtrack to the first record is not made in the search for the data in the modification history storage file, the CNC device decrements the value of the counter "loop" by 1 (Step t14) and executes repeatedly the processing in Steps t6 and t13 in the manner similar to the above to make the search for the record stored with the shot number included between LowSearschShot and HighSearchShot.

In this case, some range is allowed in the target shot number for searching. Thus, even when the modification history meeting the requirement is detected through the processing in Step t6, it may well be that other candidate histories meeting the same requirement as the above are present.

In this connection, the CNC device firstly highlights the record corresponding to the current value of the counter "loop", among the records in the modification history storage file displayed through the processing in Step h1 included in the processing for selection of the recovery means shown in FIG. 21, to notify the operator that this highlighted record is one of the candidate records selectable as the target molding condition for recovery (Step t7), and is placed in the standby state until the keyboard is operated by the operator after the decision whether the highlighted record should be selected as the target molding condition for practical recovery or should be skipped over as the molding condition practically serving no recovery (Step t8).

Subsequently, the CNC device decides which of the key for selecting the highlighted record as the target record for recovery or the key for leaving the highlighted record over is pressed by the operator (Step t9).

When the decision in Step t9 results in true by reason that the key for selecting the highlighted record as the target record for recovery is pressed, the CNC device stores the address of the highlighted record, that is, the current value of the counter "loop" as the record address of the target molding condition for recovery in the recovery position storage register k (Step t11). In this case, the target record address for recovery is recognized to be present in the modification history storage file (Step t12).

On the other hand, when the decision in Step t9 results in false by reason that the key for leaving the highlighted record over is pressed, the CNC device releases the record from highlighting to notify the operator that this record is released from the candidate record for selection (Step t10), and decides whether or not the value of the counter "loop" is decremented to 1 (Step t13). When the value of the counter "loop" is not decremented to 1, the CNC device decrements the value of the counter "loop" by 1 again, repeatedly executes the processing in the manner similar to the above to detect sequentially the record stored with the shot number included between LowSearchShot and HighSearchShot by backtrack to the past record and repeatedly executes the same processing until one of the records is finally selected by the operator as the target record for recovery of the molding condition.

Consequently, since the candidate records for recovery, that is, the records subjected to setting modification within the range of the total shot number designated by the operator are highlighted in sequence on the display of the CNC device, the operator only needs to take the steps of selecting one of the highlighted records at need and then pressing the key for selecting this record as the target record for recovery.

Figure 36:
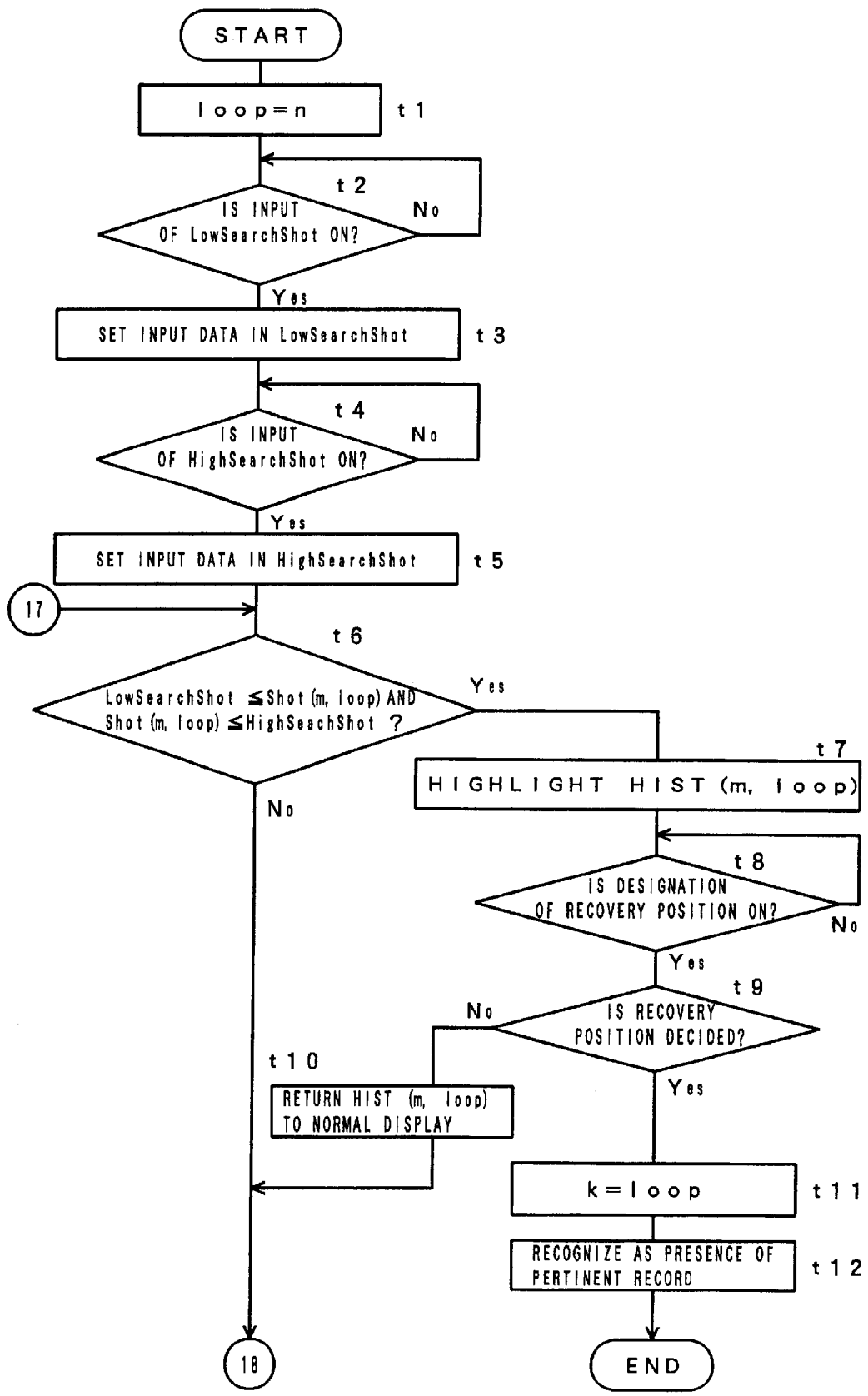
FIG. 36 is a flow chart showing the processing in the case of specifying a target point of time of recovery of the molding condition by designating a range of a total shot number.
Figure 37:
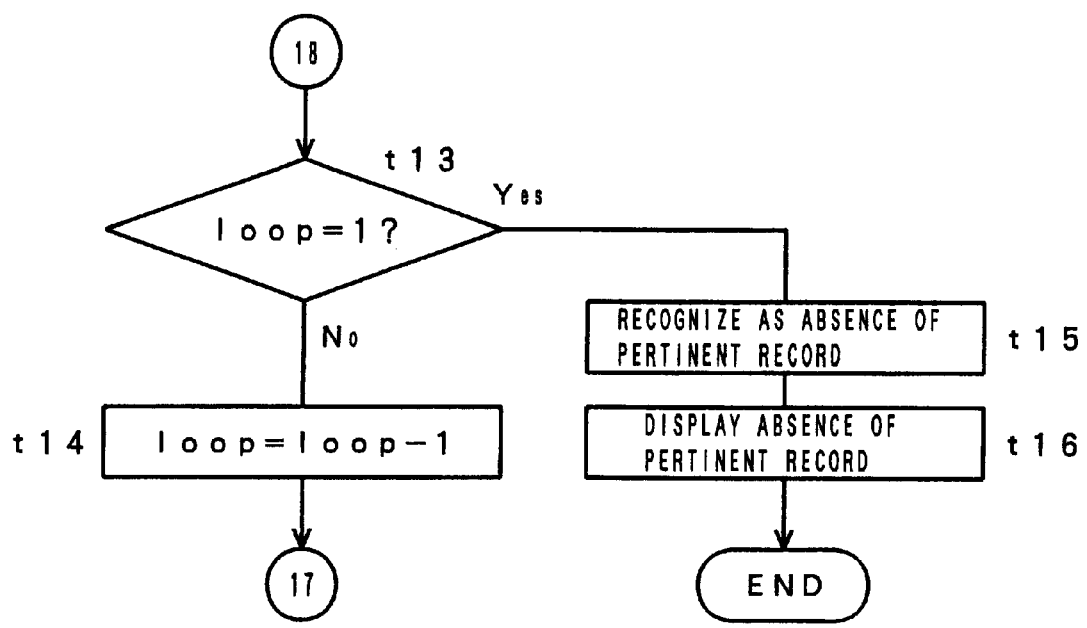
FIG. 37 is a flow chart continued from that shown in FIG. 36 and also showing the processing in the case of specifying a target point of time of recovery of the molding condition by designating a range of a total shot number.

Incidentally, when the decision in Step t13 results in true in the course of the repetitive execution of the above processing, it is considered that the record stored with the shot number included between LowSearchShot and HighSearchShot cannot be detected even though the backtrack to the first record is made in the search for the data in the modification history storage file (Step t15), and the CNC device gives the error message stating the absence of the pertinent record to the display (Step t16) and ends the processing for selection shown in FIGS. 36 and 37.

Figure 26:
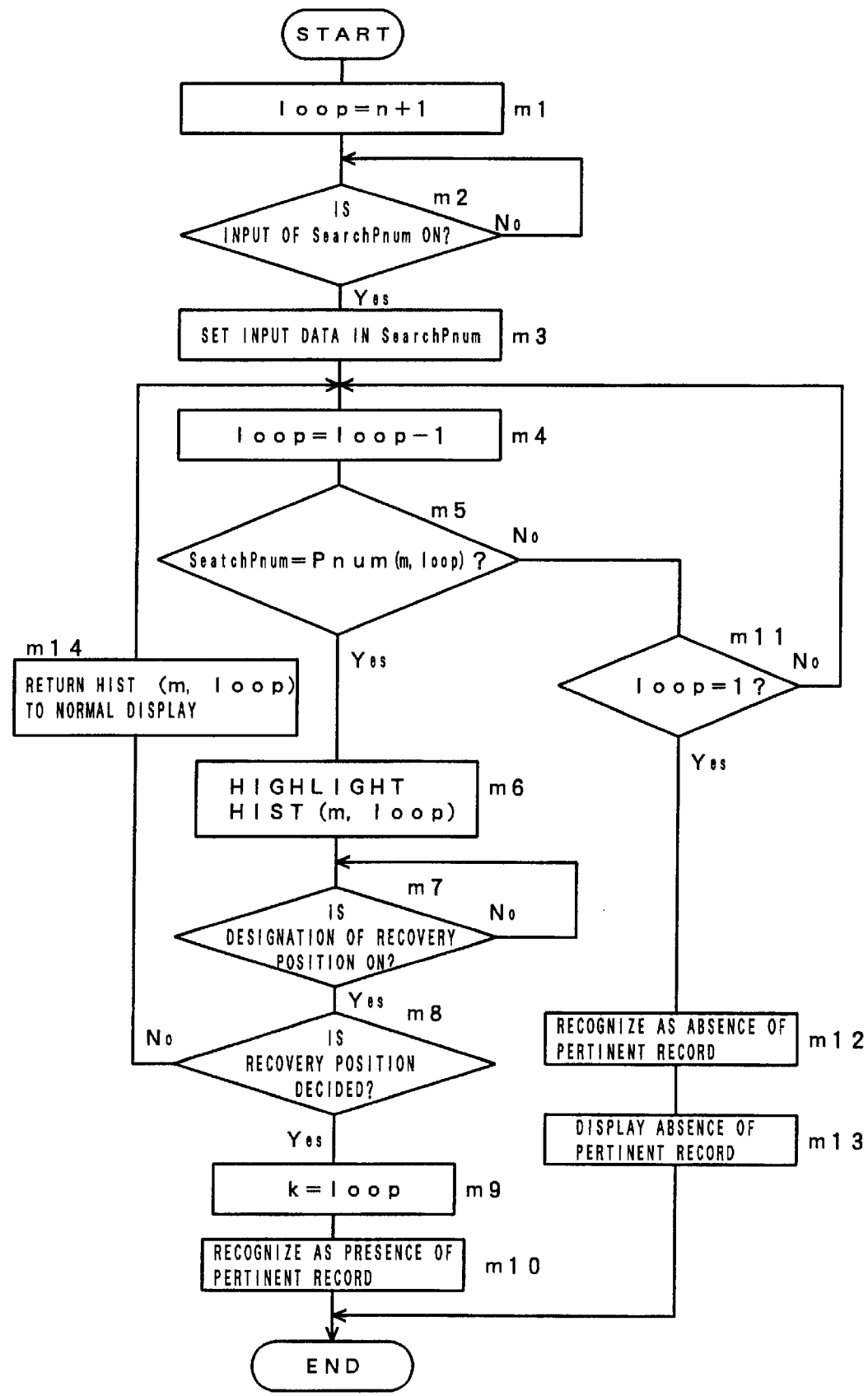
FIG. 26 is a flow chart showing the processing in the case of specifying a target point of time of recovery of the molding condition by designating a molding-condition component subjected to setting modification.

When the decision in Step h6 in the processing for selection of the recovery means shown in FIG. 21 results in true by reason that the means for automatically selecting the record address as of the point of time corresponding to the target molding condition for recovery by designating the molding-condition component subjected to setting modification is selected, the CNC device starts the processing in Step h10 as shown in FIG. 26 to firstly initialize the counter "loop" to the value higher by 1 than the value n of the final record in the modification history storage file (Step m1), and is placed in the standby state until the value for designating the component of the molding condition is inputted by the operator (Step m2).

As described above, 1 of the value for designating the component means that there is a need for the processing to detect the record as of setting modification of the injection stage number, as the target record for recovery of the molding condition, while 2 of the value for designating the component means that there is a need for the processing to detect the record as of setting modification of the injection speed in the first injection stage, as the target record for recovery of the molding condition, and so on, for instance.

When the operator operates the keyboard to input the number for designating the component, the CNC device detects this input operation through the processing for decision in Step m2 and temporarily stores the value inputted by the operator in the SearchPnum storage register (Step m3), Subsequently, the CNC device decrements the current value of the counter "loop" by 1 to make an initial value of the counter "loop" equal to the value n of the final record in the modification history storage file (Step m4), makes access to the record in the modification history storage file corresponding to the current value of the counter "loop" to read the component number stored in a field Pnum (m, loop) for storage of the number of the component subjected to setting modification, and decides whether or not the read value agrees with the value in the SearchPnum storage register (Step m5).

When the decision in Step m5 results in false by reason that the component number stored in Pnum (m, loop) does not agree with the value in the SearchPnum storage register, it is considered that the component subjected to modification on its set value in this record is different from the component designated by the operator. Thus, this record is not applied to the target record for recovery of the molding condition.

In this case, the CNC device decides whether or not the current value of the counter "loop" reaches 1, that is, whether or not a search for the data in the modification history storage file is made by backtrack to the first record (Step m11). When the backtrack to the first record is not made in the search for the data in the modification history storage file, the CNC device decrements the value of the counter "loop" by 1 (Step m4) and repeatedly executes the processing in Steps m5, m11 and m4 in the manner similar to the above to make the search for the record stored with the component number corresponding to the component number stored in the SearchPnum storage register.

When the decision in Step m11 results in true without detecting the record stored with the component number corresponding to the value in the SearchPnum storage register even though the backtrack to the first record is made in the search for of the data in the modification history storage file, the target record address for recovery is considered to be absent in the modification history storage file (Step m12), and the CNC device gives the error message stating the absence of the pertinent record to the display (Step m13) and ends the processing for selection shown in FIG. 26.

On the other hand, when the decision in Step m5 results in true by reason that the record stored with the component number corresponding to the component number stored in the SearchPnum storage register is detected in the course of the repetitive execution of the processing in Steps m4, m5 and m11, it is considered that modification is made on the component corresponding to the SearchPnum value designated by the operator in the record of the modification history storage file corresponding to the current value of the counter "loop".

In this case, the CNC device highlights the data of the record corresponding to the current value of the counter "loop", among the records in the modification history storage file displayed through the processing in Step h1 included in the processing for selection of the recovery means shown in FIG. 21, to notify the operator that this highlighted record is one of the candidate records selectable as the target molding condition for recovery (Step m6), and is placed in the standby state until the keyboard is operated by the operator after the decision whether the highlighted record should be selected as the target molding condition for practical recovery or should be skipped over as the molding condition practically serving no recovery (Step m7).

There are a plurality of candidate record addresses for recovery in the case of needing to specify the record address of the molding condition by designating the modified component of the molding condition, differently from the processing to select the record address of the molding condition by directly specifying the record address or designating the time of setting modification or the total shot number. Thus, the operator needs to specify the record address of the target molding condition for practical recovery among the candidate record addresses by operator's judgment. For instance, even if modification was made on the injection stage number several times in the past, it is considered that only one of the modified set values of the injection stage number needs to be applied to the component of the target molding condition for practical recovery.

Subsequently, the CNC device decides which of the key for selecting the highlighted record as the target record for recovery or the key for leaving the highlighted record over is pressed by the operator (Step m8).

When the decision in Step m8 results in true by reason that the key for selecting the highlighted record as the target record for recovery is operated, the CNC device stores the address of the highlighted record, that is, the current value of the counter "loop" in the recovery position storage register k as the record address of the target molding condition for recovery (Step m9). In this case, the target record address for recovery is recognized to be present in the modification history storage file (Step m10).

On the other hand, when the decision in Step m8 results in false by reason that the key for leaving the highlighted record over is operated, the CNC device releases the molding condition data corresponding to the current value of the counter "loop" from highlighting (Step m14), decrements the value of the counter "loop" by 1, repeatedly executes the processing in the manner similar to the above to detect sequentially the record stored with the component number corresponding to the value stored in the SearchPnum storage register by backtrack to the past record and repeatedly executes the same processing until one of the records is finally selected by the operator as the target record for recovery of the molding condition.

Consequently, since the candidate records for recovery, that is, the records subjected to setting modification of the component designated by the operator are highlighted in sequence on the display of the CNC device, the operator only needs to take the steps of selecting one of the highlighted records at need and then pressing the key for selecting this record as the target record for recovery.

Figure 27:
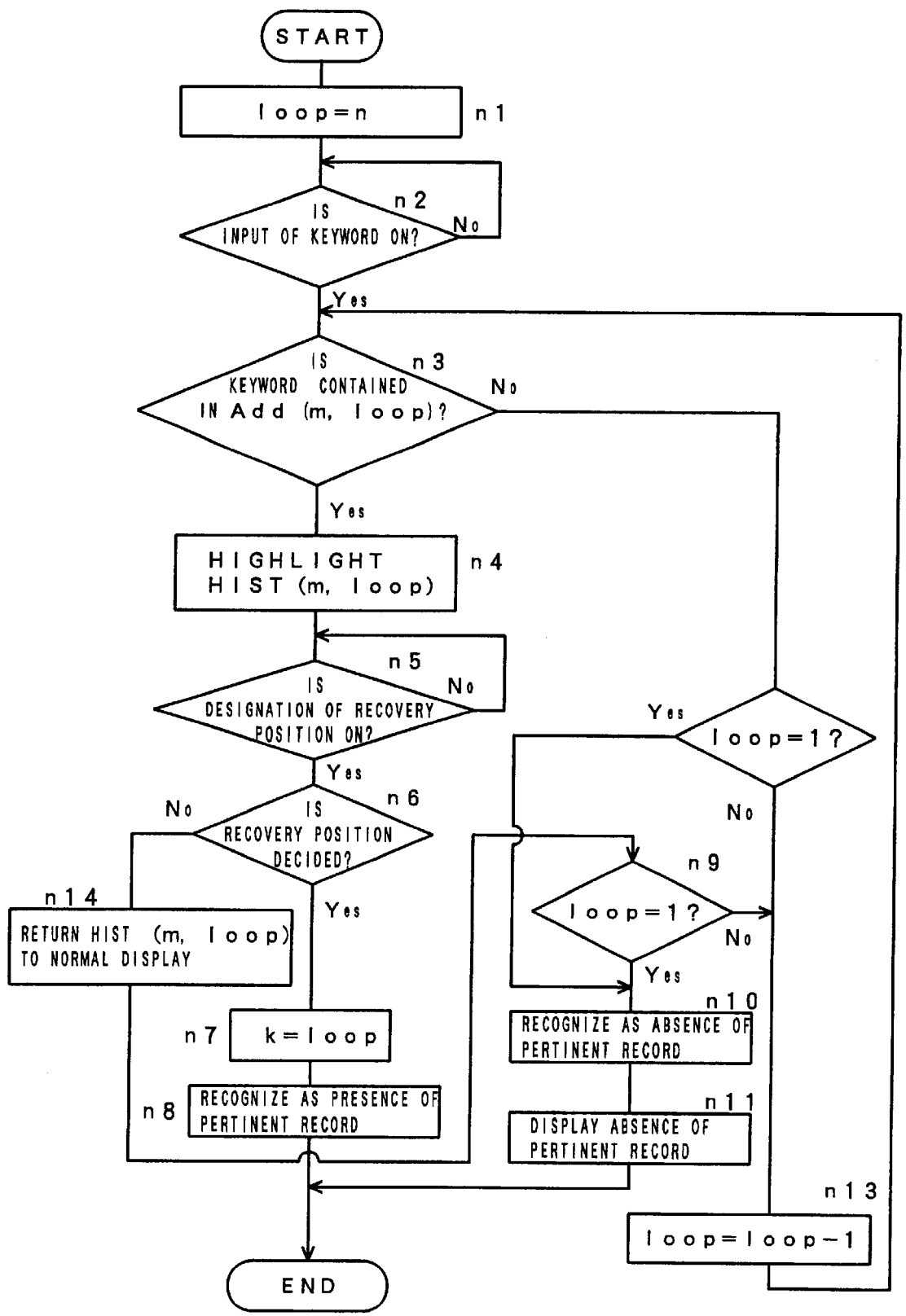
FIG. 27 is a flow chart showing the processing in the case of specifying a target point of time of recovery of the molding condition by designating a keyword set up as supplementary data.

When the decision in Step h11 in the processing for selection of the recovery means shown in FIG. 21 results in true by reason that the means for automatically selecting the record address as of the point of time corresponding to the target molding condition for recovery by designating the keyword set up as supplementary data is selected, the CNC device starts the processing in Step h12 as shown in FIG. 27 to firstly initialize the counter "loop" to a value n of the final record in the modification history storage file (Step h1) and is placed in the standby state until the target keyword for searching is inputted by the operator (Step n2).

Incidentally, the keyword in this case is considered to be a comment such as "occurrence of defective products" and "molding condition requiring care" or the like stored in the non-volatile memory in advance or an arbitrary comment itself stored by the operator as supplementary data or a part of character strings forming the comment.

When the operator operates the keyboard to input the keyword, the CNC device detects this input operation to store the keyword, makes access to the record in the modification history storage file corresponding to the current value of the counter "loop" to read the supplementary data stored in the field Add (m, loop) for storage of the supplementary data and decides whether or not the same character strings as the keyword are contained in the supplementary data (Step n3).

When the decision in Step n3 results in false by reason that the same character strings as the keyword are not contained in the field Add (m, loop) of the record, this record is not applied to choices designated by the operator, and the CNC device decides whether or not the current value of the counter "loop" reaches 1, that is, whether or not a search for the data in the modification history storage file is made by backtrack to the first record (Step n12). When the backtrack to the first record is not made in the search for the data in the modification history storage file, the CNC device decrements the value of the counter "loop" by 1 (Step n13) and repeatedly executes the processing in Steps n3, n12 and n13 in the manner similar to the above to make the search for the record containing the same character strings as the keyword in the field Add (m, loop).

When the decision in step n12 results in true without detecting the record containing the same character strings as the keyword in the field Add (m, loop) even though the backtrack to the first record is made in the search for the data in the modification history storage file, the target record address for recovery is considered to be absent in the modification history storage file (Step n10), and the CNC device gives the error message stating the absence of the pertinent record to the display (Step n11) and ends the processing for selection shown in FIG. 27.

On the other hand, when the decision in Step n3 results in true by reason that the record containing the same character strings as the keyword in the field Add (m, loop) is detected in the course of the repetitive execution of the processing in Steps n3, 12 and n13, the detected record is regarded as the record having the supplementary data meeting the keyword designated by the operator, and the CNC device highlights the data of the record corresponding to the current value of the counter "loop", among the records in the modification history storage file displayed through the processing in Step h1 included in the processing for selection of the recovery means shown in FIG. 21 to notify the operator that the highlighted data is one of the candidate records selectable as the target molding condition for recovery (Step n4), and is placed in the standby state until the keyboard is operated by the operator after the decision whether the highlighted record should be selected as the target molding condition for recovery or should be skipped over as the molding condition practically serving no recovery (Step n5).

There are a plurality of candidate record addresses for recovery in the case of needing to select the record address of the molding condition by designating the keyword, similarly to the processing to specify the record address of the molding condition by designating the modified component of the molding condition. Thus, the operator needs to specify the record address of the target molding condition for practical recovery among the candidate record addresses by operator's judgment.

Subsequently, the CNC device decides which of the key for selecting the highlighted record as the target record for recovery or the key for leaving the highlighted record over is pressed by the operator (Step n6).

When the decision in Step n6 results in true by reason that the key for selecting the highlighted record as the target record for recovery is operated, the CNC device stores the address of the highlighted record, that is, the current value of the counter "loop" in the recovery position storage register k as the record address of the target molding condition for recovery (Step n7). In this case, the target record address for recovery is recognized to be present in the modification history storage file (Step n8).

When the decision in Step n6 results in false by reason that the key for leaving the highlighted record over is operated, the CNC device releases the molding condition data corresponding to the current value of the counter "loop" from highlighting (Step n14) and decides whether or not the current value of the counter "loop" reaches 1, that is, whether or not a search for the data in the modification history storage file is made by backtrack to the first record (Step n9). When the backtrack to the first record is not made in the search for the data in the modification history storage file, the CNC device decrements the value of the counter "loop" by 1, repeatedly executes the processing in the manner similar to the above to detect sequentially the record having the supplementary data containing the keyword by backtrack to the past record and repeatedly executes the same processing until one of the detected records is finally selected by the operator as the target record for recovery of the molding condition.

On the other hand, when the decision in Step n9 results in true without detecting the record containing the same character strings as the keyword in the field Add (m, loop) even though the backtrack to the first record is made in the search for the data in the modification history storage file, the target record address for recovery is considered to be absent in the modification history storage file (Step n10), and the CNC device gives the error message stating the absence of the pertinent record to the display (Step n11) and ends the processing for selection shown in FIG. 27.

Consequently, since the candidate records for recovery, that is, the records stored with the supplementary data containing the keyword designated by the operator in the field Add (m, loop) are highlighted on the display of the CNC device, the operator only needs to take the steps of selecting one of the highlighted records at need and then pressing the key for selecting this record as the target record for recovery.

Further, when an appropriate data base is configured in advance to cause data stored in the data base to be stored in the supplementary data storage field of the modification history storage file as a keyword at need, it becomes possible to specify the recovery position record address by the use of a keyword according to a more extensive method.

A description will now be given of the processing to specify the recovery position record address by making use of the data base composed of three data files, i.e., a schedule data file, a mold file and a resin file, for instance.

Incidentally, the schedule data file contains a production schedule number A, a production start schedule and a production end schedule together with a number B of a mold available for the schedule and a number C of a resin available for the schedule in association with one another, as shown in FIG. 40. The mold file contains the mold number B, a name D of the mold and the number of products made by one shot of the mold together with a standard molding cycle E of the mold and the manufacture date of the mold in association with one another, as shown in FIG. 41. The resin file contains the resin number C, a resin grade F and a supplier of the resin together with a resin name and a resin color G in association with one another, as shown in FIG. 42.

The operation of specifying the recovery position record address by using the schedule number A, the mold number B, the resin number C, the mold name D, the molding cycle E and the resin grade F or the resin color G as keywords requires the processing in Steps v1 and v2 as shown in FIG.

43, instead of the processing in Step n3 included in the processing for searching with the keyword as shown in FIG. 27.

Incidentally, the keywords such as the schedule number A, the mold number B, the resin number C, the resin name D, the molding cycle E, the resin grade F and the resin color G are assumed to be stored in advance in the supplementary data storage field of the modification history storage file through the processing in Steps b6 or b8 as described in FIGS. 9 and 10 relating to the processing for addition of the new record.

A description will now be given of the processing to specify the recovery position record address using the data base with reference to FIGS. 27 and 43.

When the means for automatically selecting the record address as of the point of time corresponding to the target molding condition for recovery by designating the keyword is selected, the CNC device firstly initializes the counter "loop" to the value n of the final record in the modification history storage file (Step n1) and is placed in the standby state until the target keyword for searching is inputted by the operator (Step n2).

Incidentally, the keyword in this case is considered to be a comment such as "occurrence of defective products" and "molding condition requiring care" stored in the non-volatile memory in advance or an arbitrary comment stored as supplementary data by the operator or the keywords such as the schedule number A, the mold number B, the resin number C, the mold name D, the molding cycle E, the resin grade F and the resin color G.

Figure 43:
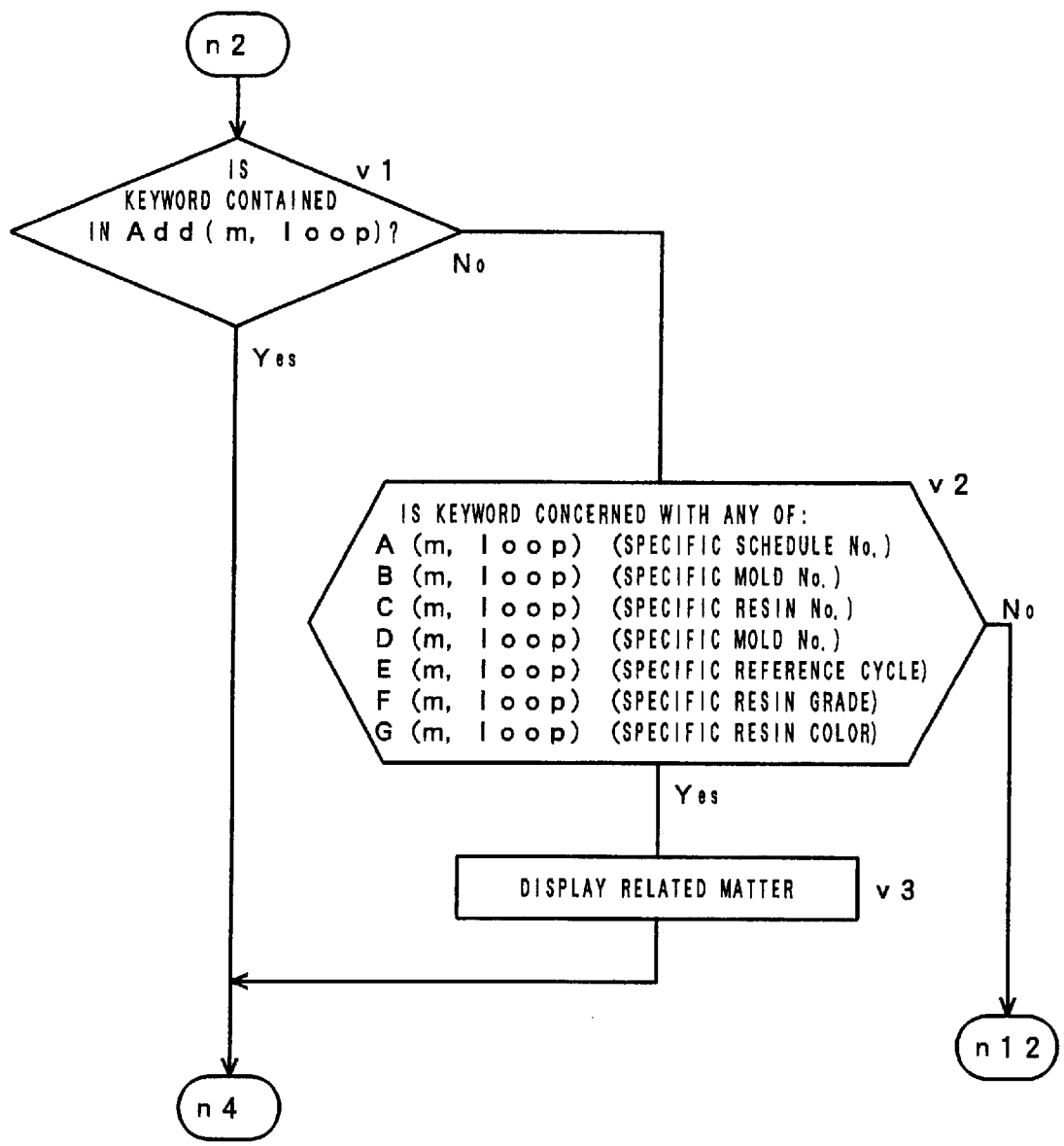
FIG. 43 is a flow chart showing an essential part of the processing in the case of specifying a target point of time of recovery of the molding condition by designating, by means of data base, a keyword set up as supplementary data.

When the operator operates the keyboard to input the keyword, the CNC device detects this input operation to store the keyword, makes access to the record in the modification history storage file corresponding to the current value of the counter "loop" to read supplementary data stored in the field Add (m, loop) for storage of the supplementary data and decides whether or not the same character strings as the keyword are contained in the supplementary data (Step v1 in FIG. 43).

In this case, even though the same character strings as the keyword inputted through the processing in Step n2 are not contained in field Add (m, loop), of the record, it may well be that the data corresponding to the keyword inputted by the operator through the processing in Step n2 is detected from the keywords in the data base in correlation to the contents of the field Add (m, loop) by searching the data file as shown in FIGS. 40 to 42 with reference to the keywords in the data base stored in the field Add (m, loop), differently from the case of making a comparison in identity or not between the keyword and the character strings of supplementary data composed of fixed comments or arbitrary comments.

When it becomes apparent that the keyword in Step n2 does not directly agree with the character strings of the supplementary data in the field Add (m, loop) by reason that the decision in Step v1 results in false, the CNC device further decides which of the schedule number A, the mold number B, the resin number C, the mold name D, the molding cycle E, the resin grade F and the resin color G is applied to the keyword inputted in Step n2, that is, what kind of data stored in any data base composed of three data files described above is applied to the keyword (Step v2 in FIG. 43).

When none of the schedule number A, the mold number B, the resin number C, the mold name D, the molding cycle E, the resin grade F and the resin color G is applied to the keyword inputted in Step n2, it is considered that the keyword inputted in Step n2 is not applicable to the keyword which permits searching through the data base. Also, since the decision in Step v1 has already resulted in false in this stage, it is a matter of course that the contents of the keyword inputted by the operator through the processing in Step n2 do not agree with the contents of the character strings in the field Add (m, loop), even if the inputted keyword includes the fixed comment such as "occurrence of defective products" and "molding condition requiring care" or other arbitrary comments.

Accordingly, when the decision both in Steps v1 and v2 results in false, the CNC device decides that the record in the field Add(m, loop) is not applicable to the choices designated by the operator.

In this case, the CNC device decides whether or not the current value of the counter "loop" reaches 1, that is, whether or not a search for the data in the modification history storage file is made by backtrack to the first record (Step n12). When the backtrack to the first record is not made in the search for the data in the modification history storage file, the CNC device decrements the value of the counter "loop" by 1 (Step n13) and repeatedly executes the processing in Steps v1, v2, v12 and n13 in the manner similar to the above to make the search for the record having the field Add (m, loop) containing the same character strings as the keyword inputted by the operator.

That is, a change of the keyword itself inputted by the operator through the processing of Step 2 does not occur. Thus, when the subsequent decision in Step v2 results once in false, it is considered that the decision in Step v2 in the repetitive processing in Steps v1, v2, n12 and n13 results in false at all times. If data of the field Add (m, loop) containing the keyword inputted by the operator is detected in the course of the repetitive processing with false as the result of the decision in Step v2, its record needs to be detected as the record stored with the supplementary data containing the same character strings as the keyword inputted by the operator through the processing for decision in Step v1, as an inevitable consequence.

When the decision in Step v1 results in true by reason that the record containing the same character strings as the keyword in the field Add (m, loop) is detected in the course of the repetitive execution of the processing in Steps v1, v2, n12 and n13, this record is regarded as a record having the supplementary data meeting the keyword designated by the operator, and the CNC device highlights the data of the record corresponding to the current value of the counter "loop", among the records in the modification history storage file displayed through the processing in Step h1 included in the processing for selection of the recovery means shown in FIG. 21, to notify the operator that the highlighted record is one of the candidate records selectable as the target molding condition for recovery (Step n4), and is placed in the standby state until the keyboard is operated by the operator after decision whether the highlighted record should be selected as the target molding condition for practical recovery or should be skipped over as the molding condition practically serving no recovery (Step n5). The subsequent processing is similar to that having been already described with reference to FIG. 27.

On the other hand, when the decision in Step v1 results in false, while the decision in Step v2 results in true, the keyword inputted in Step n2 is regarded as one of the schedule number A, the mold number B, the resin number C, the mold name D, the molding cycle E, the resin grade F and the resin color G, that is, supposed to be applied as the keyword of a type which permits searching through the data base.

Thus, as long as the data of one of the schedule number A, the mold number B, the resin number C, the mold name D, the molding cycle E, the resin grade F and the resin color G or the like is stored as the supplementary data in the field Add (m, loop), the CNC device searches all the data bases as shown in FIGS. 40 to 42 with reference to the stored data and detects all the keywords correlating to the data stored in the field Add (m, loop). When one of the detected keywords only agrees with the keyword inputted in Step n2, the CNC device decides that the record in the field Add (m, loop) is equivalent to the record having the supplementary data meeting the keyword designated by the operator (Step v2), displays the synopsis of the detected keywords to the display screen (Step v3) and highlights the data of the record corresponding to the current value of the counter "loop", among the records in the modification history storage file displayed through the processing in Step hi included in the processing for selection of the recovery means shown in FIG. 21, to notify the operator that the highlighted record is one of the candidate records selectable as the target molding condition for recovery (Step n4). The processing on and after Step n5 is as described the above.

On the other hand, when it is decided that none of the data of the schedule number A, the mold number B, the resin number C, the mold name D, the molding cycle E, the resin grade F, the resin color G is stored as the keyword for search of the data base in the field Add (m, loop) read through the processing in Step v1 (Step v2), the CNC device transfers the processing to Step n12 similarly to the above for the repetitive execution of the processing.

For instance, when it is assumed that the keyword inputted through the processing in Step n2 by the operator is "schedule number 25", and "schedule number 25" has been stored in the supplementary data in the field Add (m, loop) inputted through the processing in Step v1 on this occasion, the decision in Step v1 results in true, and this record may be selected as one of the candidate records of the molding condition available for recovery, as a matter of course.

However, according to the present embodiment using the data base for processing the keyword, the record directly stored with "schedule number 25" itself as the supplementary data in the field Add (m, loop) is not always selected as the candidate record of the molding condition available for recovery.

If each of the schedule data file, the mold file and the resin file is placed in the condition as shown in FIGS. 40 to 42, all the records stored with any of "mold number 15" and "resin number 23" correlating to "schedule number 25" in the schedule data file shown in FIG. 40, "mold name GEAR-PART1" and "molding cycle 27" correlating to "mold number 15" in the mold file shown in FIG. 41 and "resin grade GRADE-023" correlating to "resin number 23" and "resin color YELLOW" correlating to "resin grade GRADE-023" in the resin file shown in FIG. 42 as the supplementary data in the field Add (m, loop) are extracted as the candidate records of the molding condition available for recovery.

If one of the schedule number A, the mold number B, the mold name D or like important components for specifying the molding operation remains in operator's memory, it is possible to specify the record of the desired molding operation with this component as the keyword, and it is extremely convenient for the case where the operator has an uncertain memory.

Further, since the storage of one keyword in the supplementary data storage field permits the searching for various data correlating to this keyword, it is effective in saving of the memory capacity of the modification history storage file.

When the extremely uncertain data such as the resin number C and the resin color G is inputted by the operator as the keyword through the processing in Step n2, it is a matter of course that many kinds of modification histories relating to the molding operation having no relation to the modification history practically desired by the operator are detected in some cases. However, according to the present embodiment as described above, the synopsis of the keywords detected in relation to the record of the desired modification history, that is, the schedule number A, the mold number B, the resin number C, the mold name D, the molding cycle E, the resin grade F and the resin color G or the like are displayed en bloc on the display screen, and as a result, it is possible to prevent the operator from making an error in final selection.

As described above, the processing on and after Step n5 enables the operator to select the record extracted as the candidate records, as the target molding condition for practical recovery, or to start the next search by skipping over the record as the molding condition practically serving no recovery.

Incidentally, when the decision in Step n12 results in true without detecting the field Add (m, loop) containing the same character strings as the keyword inputted by the operator even though the backtrack to the first record is made in the search for the data in the modification history storage file, nor detecting the data correlating to the keyword inputted by the operator from the keyword of the data base correlating to the contents of the field Add (m, loop), the target record address for recovery is considered to be absent in the modification history storage file (Step n10), and the CNC device gives the error message stating the absence of the pertinent record to the display (Step n11) and ends the processing for specifying the recover position on the basis of the keyword.

The above description has been given of the means for specifying the record address as of the point of time corresponding to the target molding condition for recovery by taking some cases. Further, a combination of some designating means described above also makes it possible to specify the record address of the target molding condition for recovery.

A description will now be given of a means for specifying the record address on the basis of an effective combination by taking some specific cases.

A combination of the range of the time of setting modification with the keyword, when designated, makes it possible to specify the record address of the target molding condition for recovery.

The processing in this case requires the steps of inputting and storing the keyword through the processing in Step n2 shown in FIG. 27, executing the same processing as Steps s2 to s5 shown in FIG. 34 to cause the CNC device to store the lower limit LowSearchDate and the upper limit HighSearchDate of the target time of setting modification for searching, then executing the same processing for decision as Step s6 shown in FIG. 34 only when the decision in Step n3 results in true, and advancing the processing to Step n4 when the same decision as that in Step s6 results in true, or to Step n12 when the same decision as that in Step s6 results in false.

As a result, only the modification history data simultaneously meeting the requirements of both the keyword designated by the operator and the range of the time of setting modification designated by the operator is highlighted in sequence through the processing in Step n4, and the operator only needs to take the step of selecting the data as of the desired point of time from the highlighted data as the target data for recovery.

A combination of the range of the time of setting modification with the name of the molding-condition component subjected to setting modification, when designated, makes it also possible to specify the record address of the target molding condition for recovery. The processing in this case requires the steps of inputting and storing the name of the molding-condition component through the processing in Step m3 shown in FIG. 26, executing the same processing as Steps s2 to s5 shown in FIG. 34 to cause the CNC device to execute the processing in Steps m4 and m5 after the storage of the lower limit LowSearchDate and the upper limit HighSearchDate of the target time of setting modification for searching, executing the same processing for decision as Step s6 shown in FIG. 34 only when the decision in Step m5 results in true, and advancing the processing to Step m6 when the same decision as that in Step s6 results in true, or to Step m11 when the same decision as that in Step s6 results in false.

Since only the modification history data simultaneously meeting the requirements of both the molding-condition component name designated by the operator and the range of the time of setting modification designated by the operator is highlighted in sequence through the processing in Step m6, the operator only needs to take the step of selecting data as of the desired point of time from the highlighted data as the target data for recovery.

The processing to determine the record address of the target molding condition for recovery by designating a combination of the range of the production shot number with the keyword requires the steps of inputting and storing the keyword through the processing in Step n2 shown in FIG. 27, executing the same processing as Steps t2 to t5 shown in FIG. 36 to cause the CNC device to store the lower limit LowSearchShot and the upper limit HighSearchShot of the target range of the shot number for searching, executing the same processing for decision as Step t6 shown in FIG. 36 only when the decision in Step n3 results in true, and advancing the processing to Step n4 when the same decision as that in Step t6 is results in true, or to Step n12 when the same decision as that in Step t6 results in false.

As a result, since only the modification history data simultaneously meeting the requirements of both the keyword designated by the operator and the range of the production shot number designated by the operator is highlighted in sequence through the processing in Step n4, the operator only needs to take the step of selecting the data as of the desired point of time from the highlighted data as the target data for recovery.

Further, the processing to specify the record address of the target molding condition for recovery by designating a combination of the range of the production shot number with the molding-condition component subjected to setting modification, when designated, requires the steps of inputting and storing the component name of the molding condition through the processing in Step m3 shown in FIG. 26, executing the same processing as Steps t2 to t5 shown in FIG. 36 to cause the CNC device to execute the processing in Steps m4 and m5 after storage of the lower limit LowSearchShot and the upper limit HighSearchShot of the target production shot number for searching, executing the same processing for decision as Step t6 shown in FIG. 36 only when the decision in Step m5 results in true, and advancing the processing to Step m6 when the same decision as that in Step t6 results in true, or to Step m11 when the same decision as that in Step t6 results in false.

Since only the modification history data simultaneously meeting the requirements of both the molding-condition component name designated by the operator and the range of the production shot number designated by the operator is highlighted in sequence through the processing in Step m6, the operator only needs to take the step of selecting the data as of the desired point of time from the highlighted data as the target data for recovery.

Figure 38:
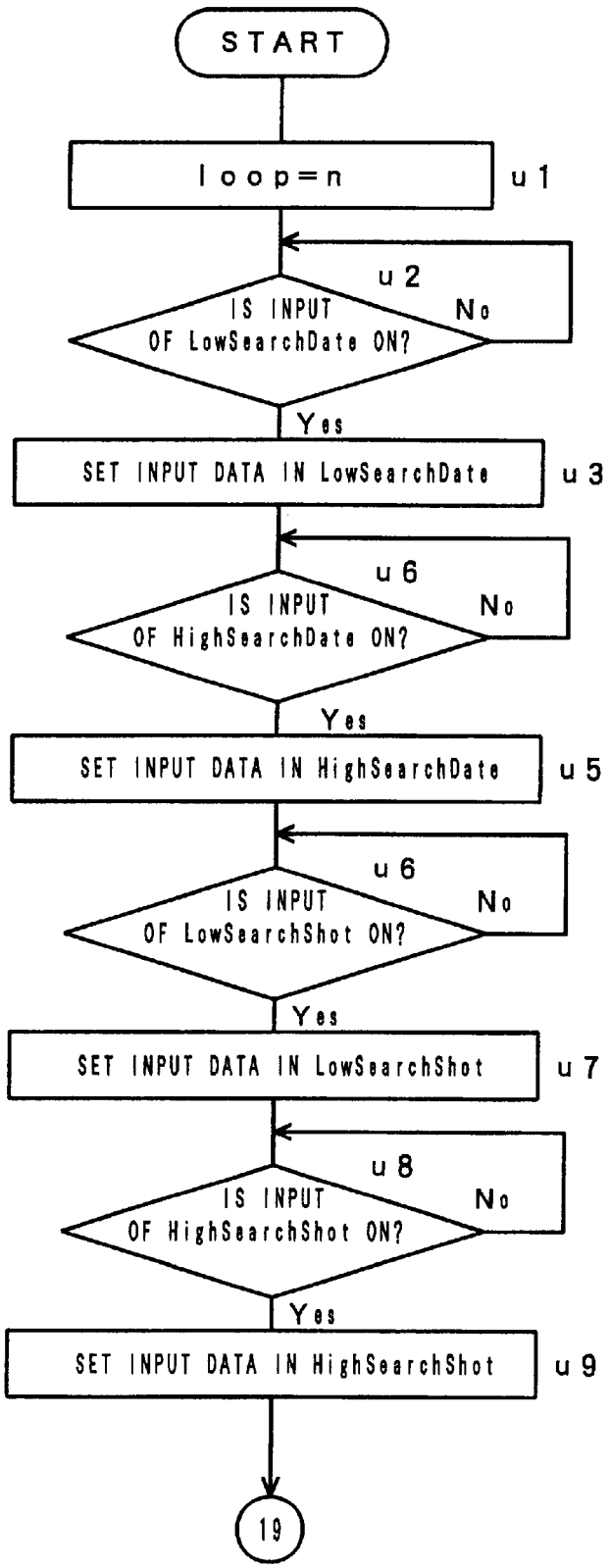
FIG. 38 is a flow chart showing the processing in the case of specifying a target point of time of recovery of the molding condition by a combination of the range of the total shot number with the range of the time of setting modification.
Figure 39:
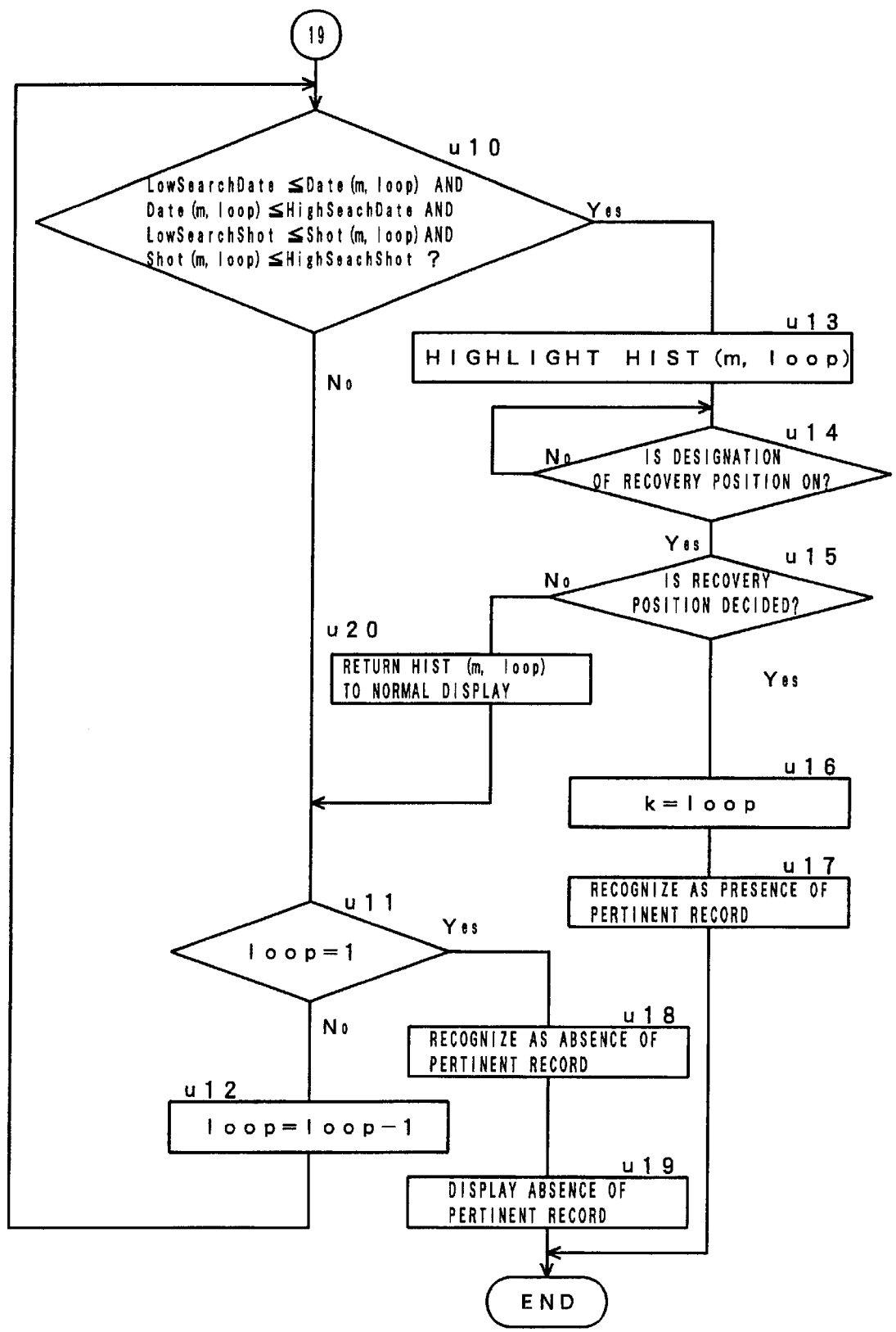
FIG. 39 is a flow chart continued from that shown in FIG. 38 and also showing the processing in the case of specifying a target point of time of recovery of the molding condition by a combination of the range of the total shot number with the range of the time of setting modification.

Further, the processing as shown in FIGS. 38 and 39 is applied to the case of needing to determine the record address of the target molding condition for recovery by designating a combination of the range of the time of setting modification with the range of the production shot number.

In the case of needing to specify the target record address for recovery by the combination of the range of the time of setting modification with the range of the production shot number, the CNC device firstly initializes the counter "loop" to the value n of the final record in the modification history storage file (Step u1), is placed in the standby state until the lower limit LowSearchDate and the upper limit HighSearchDate of the target time of setting modification for searching and the lowerlimit LowSearchShot and the upper limit HighSearchShot of the target production shot number for searching are respectively inputted by the operator, and stores these values (Steps u2 to u9).

Then, the CNC device makes access to the record in the modification history storage file corresponding to the current value of the counter "loop" to read the date data stored in the field Date (m, loop) for storage of the date of the setting modification and the shot number data stored in the field Shot (m, loop) for storage of the shot number and decides whether or not the date in the field Date (m, loop) is within the range from LowSearchDate to HighSearchD ate and the production shot number in the field Shot (m, loop) is within the range from LowSearchShot to HighSearchShot (Step u10).

When both two requirements are not satisfied simultaneously, that is, when the decision in Step u10 results in false, it is considered that the data stored in the record of the address loop in the modification history storage file is not applicable to the candidate molding condition for recovery, and there is a need to search the modification history storage file by backtrack to the more precedent point of time.

In this connection, the CNC device decides whether or not the current value of the counter "loop" reaches 1, that is, whether or not a search for the data in the modification history storage file is made by backtrack to the first record (Step u11). When the backtrack to the first record is not made in the search for the data in the modification history storage file, the CNC device decrements the value of the counter "loop" by 1 (Step u12) and repeatedly executes the processing in Steps u10 and u11 in the manner similar to the above to make the search for the record stored with the date of the setting modification included between LowSearchDate and HighSearchDate and also the production shot number included between LowSearcShot and HighSearchShot.

When the record meeting both two requirements is detected, the CNC device firstly highlights the data corresponding to the current value of the counter "loop" to notify the operator that the highlighted data is one of the candidate records selectable as the target molding condition for recovery (Step u13), and is placed in the standby state until the keyboard is operated by the operator after the decision whether the highlighted record should be selected as the target molding condition for recovery or should be skipped over as the molding condition practically serving no recovery (Step u14).

Subsequently, the CNC device decides which of the key for selecting the highlighted record as the target record for recovery or the key for leaving the highlighted record over is pressed by the operator (Step u15).

When the decision in Step u15 results in true by reason that the key for selecting the highlighted record as the target record for recovery is operated, the CNC device stores the address of the highlighted record, that is, the current value of the counter "loop" as the record address of the target molding condition for recovery in the recovery position storage register k (Step u16). In this case, the target record address for recovery is recognized to be present in the modification history storage file (Step u17).

On the other hand, when the decision in Step u15 results in false by reason that the key for leaving the highlighted record over is operated, the CNC device releases the record from highlighting to notify the operator that this record is released from the candidate record for selection (Step u20), and decides whether or not the value of the counter "loop" is decremented to 1 (Step u11). When the value of the counter is not decremented to 1, the CNC device decrements the value of the counter "loop" by 1 again, repeatedly executes the similar processing to the above to detect sequentially the record stored with the date of the setting modification included between lowSearchDate and HighSearchDate and also the product shot number included between LowSearchShot and HighSearchShot by backtrack to the past record and repeatedly executes the same processing until one of the records is finally selected by the operator as the target record for recovery of the molding condition.

Consequently, since only the candidate records for recovery, that is, the records subjected to setting modification within the range of the production shot number designated by the operator and also within the range of the time as of setting modification designated by the operator are highlighted in sequence on the display of the CNC device, the operator only needs to take the steps of selecting one of the highlighted records at need and then pressing the key for selecting this record as the target record for recovery.

Incidentally, when the decision in Step u11 results in true in the course of the repetitive execution of the above processing, it is considered that the record stored with the data simultaneously meeting both two requirements described above cannot be detected even though the backtrack to the first record is made in the search for the data in the modification history storage file (Step u18), and the CNC device gives the error message stating the absence of the pertinent record to the display (Step u19) and ends the processing for selection shown in FIGS. 38 and 39.

As described above, one of the means for directly specifying the record address as of the point of time corresponding to the When the decision in Step h13 results in true without the presence of the target molding condition for recovery in the modification history storage file, it is considered that the selection of the record address of the target molding condition for recovery is not made, or is inexecutable due to an inappropriate request for selection from the operator, and the CNC device returns the processing to Step h2 to repeatedly execute the similar processing to the above and causes the operator to select the record address corresponding to the molding condition as of the target point of time of recovery according to one of the means described above.

On the other hand, when the decision in Step h13 results in false by reason that the target molding condition for recovery is present in the modification history storage file, the CNC device further decides whether the record address of the molding condition as of the target point of time of recovery has been already selected through the means for designating a component or a keyword, or any other means (Step h14).

When the record address of the molding condition as of the target point of time of recovery has been selected through the means for designating the component or the keyword, it is considered that some candidate records for selection have been already highlighted through the processing shown in FIG. 26 or 27, and the desired record address has been already selected by the operator from the highlighted records according to the operator's intention.

Accordingly, in this case, there is no need to re-execute the target molding condition for recovery from the synopsis on the display (Step h7 in FIG. 23), the means for automatically selecting the record address of the target molding condition for recovery by designating the time of setting modification (Step h8 shown in FIG. 24), the means for automatically selecting the record address of the target molding condition for recovery by designating the total shot number (Step h9 shown in FIG. 25), the means for automatically selecting the record address of the target molding condition for recovery by designating the molding-condition component subjected to setting modification (Step h10 shown in FIG. 26), the means for automatically selecting the record address of the target molding condition for recovery by designating the keyword set up as supplementary data (Step h12 shown in FIG. 27) and the designating means based on the combination of these means described above is selected by the operator, and whether or not the target molding condition for recovery is present in the modification history storage file is decided by the CNC device. The presence of the target molding condition for recovery permits to specify the record address k as of the point of time corresponding to the target molding condition for recovery.

Subsequently, the CNC device decides whether or not the target molding condition for recovery is present in the modification history storage file, that is, whether or not the processing in Step is shown in FIG. 23, that in Step j7 shown in FIG. 24, that in Step k7 shown in FIG. 25, that in Step m12 shown in FIG. 26 or that in Step n10 shown in FIG. 27 is executed (Step h13). selection of the record address, and the CNC device holds intact the record address stored in the recovery position storage register k as the record address of the molding condition as of the target point of time of recovery and ends the processing for selection shown in FIGS. 21 and 22.

When the decision in Step h14 results in false, that is, when the record is selected according to one of the means for directly specifying the record address from the synopsis of the display, the means for specifying the record address as of the target point of time of recovery by designating the time of setting modification and the means for specifying the record address as of the target point of time of recovery by designating the total shot number, the CNC device is placed in the standby state until the keyboard is operated by the operator after the decision whether this record should be selected as the target molding condition for recovery or should be skipped over as the molding condition practically serving no recovery (Step h15), and thereafter, decides which of the key for selecting the pertinent record as the target record for recovery or the key for leaving this pertinent record over is pressed by the operator (Step h16). The above processing is for permitting the operator to have an opportunity of retrial in record selection.

When the decision in Step h16 results in true by reason that the key for selecting the pertinent record as the target record for recovery is operated, the CNC device holds intact the record address stored in the recovery position storage register k as the record address of the molding condition as of the target point of time of recovery and ends the processing for selection shown in FIGS. 21 and 22.

On the other hand, when the decision in Step h16 results in false by reason that the key for leaving the pertinent record over is operated, it is considered that a request for retrial is issued from the operator, and the CNC device returns the processing to Step h2 to repeatedly execute the similar processing to the above and causes the operator to select the record address corresponding to the molding condition as of the target point of time of recovery according to one of the means described above again.

Figure 12:
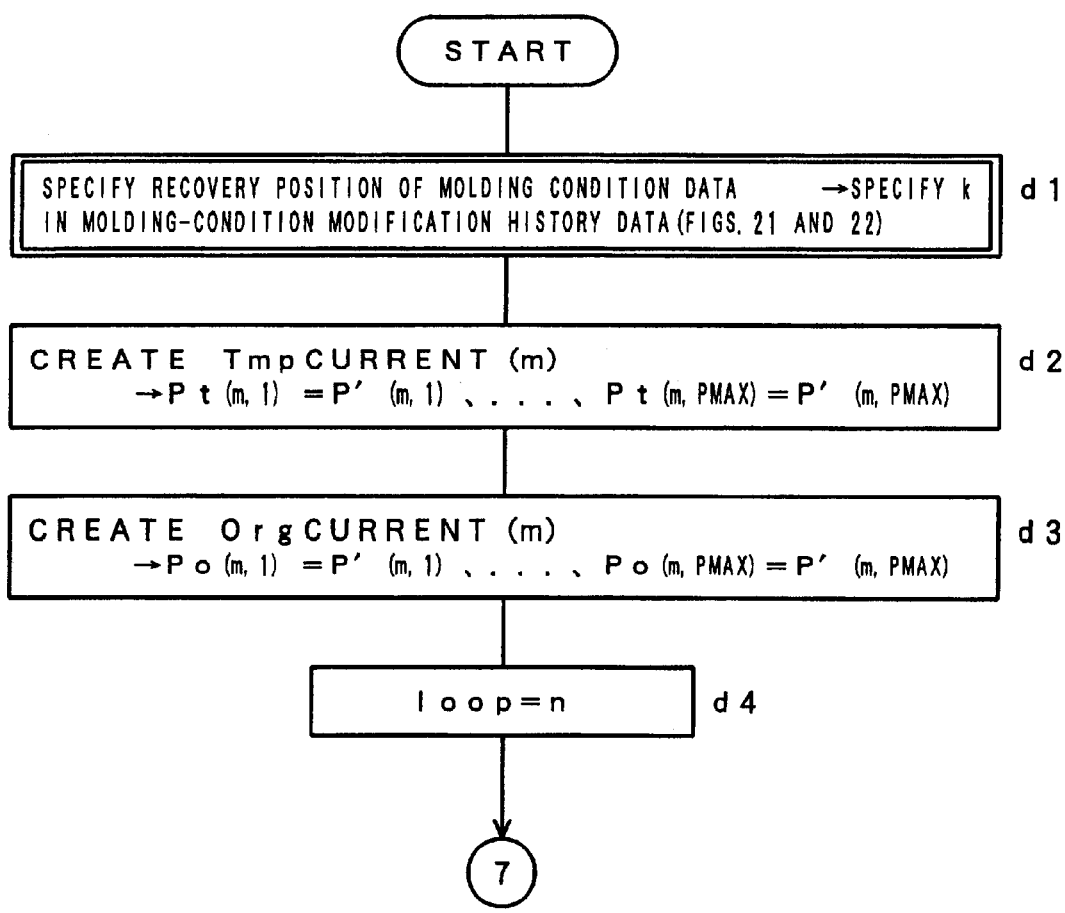
FIG. 12 is a flow chart showing the outline of the processing for recovery of the molding condition in the case of managing the modification history storage file individually by the CNC device provided for each injection molding machine.

As described above, when the record address of the molding condition as of the target point of time of recovery is stored in the recovery position storage register k to complete the operation in Step d1 included in the processing for recovery of the molding condition shown in FIG. 12, the CNC device executes the processing to create a temporary file TmpCURRENT (m) stored with all the current molding conditions as initial values.

The temporary file TmpCURRENT (m) for No. m injection molding machine is substantially similar in configuration to the current data storage file and is composed of fields from Pt (m, 1) for storage of a set value of the molding condition in a component No. 1 to Pt (m,PMAX) for storage of a set value of the molding condition in the last component No. PMAX. The temporary file TmpCURRENT (m) is created by copying respectively all the set values of the fields P'(m, 1) to P'(m, PMAX) in the current data storage file into the fields Pt (m, 1) to Pt (m, PMAX) in the temporary file TmpCURRENT (m) (Step d2).

Further, the CNC device creates a file OrgCURRENT (m) as a backup file for holding all the current molding conditions by saving, in addition to the temporaty file TmpCURRENT (m) described above. For that reason, a recovery to the original molding condition is sometimes desired when molding based on the molding condition recovered through the processing later described does not work out. The backup file OrgCURRENT (m) is also similar in configuration to the current data storage file and is composed of fields from Po (m, 1) for storage of a set value of the molding condition in the component No. 1 to Po (m, PMAX) for storage of a set value of the molding condition in the last component No. Pmax. The backup file OrgCURRENT (m) is created by copying respectively all the set values of the fields P'(m, 1) to P'(m, PMAX) of the current data storage file into the fields Po (m, 1) to Po (m, PMAX) of the backup file OrgCURRENT (m), similarly to the above (Step d3).

After having created the temporary file TmpCURRENT (m) and the backup file OrgCURRENT (m), the CNC device subsequently initializes the counter "loop" to the value n of the final record in the modification history storage file (Step d4).

Subsequently, the CNC device reads a value of the data field Pnum (m, loop) in the loop(-)th record in the modification history storage file, that is, the value Pnum (m, loop) of the molding-condition component number subjected to modification on its set value by the loop(-)th modification in No. m injection molding machine, according to the current value of the counter "loop". Then, the CNC device makes access to the Pnum(m, loop)(-)th data field in the temporary file TmpCURRENT (m), that is, the data field Pt (m, Pnum (m, loop)) in the temporary file TmpCURRENT (m) stored with the set value of the same component as the molding-condition component subjected to modification on its set value by the loop(-)th modification in No. m injection molding machine, on the basis of the value of the data field Pnum (m, loop) described above, and replaces the contents of the data field Pt(m,Pnum (m, loop)) with the set value BeforeP(m, loop) of the last pertinent component as of modification on its set value by the loop(-)th modification in No. m injection molding machine to put the contents of the molding-condition set value in the temporary file TmpCURRENT (m) back to the precedent state only by one record portion.

For instance, assuming that a value of 1 representing that the target component for modification on its set value is the injection stage number is written in the data field Pnum (m, n) in the modification history storage file as shown in FIG. 4, a value of 4 is written as the set value of the last injection stage number in BeforeP(m, n), and the same value of 5 as the set injection stage number in the current data storage file is set in the first data field of the temporary file TmpCURRENT (m), that is, the data field Pt (m, 1) for storage of the set value of the injection stage number serving as the molding condition of the component No. 1, the following operation may be executed through the processing in Step d5 at the point of loop=n. That is, a value of BeforeP (m, loop)=BeforeP (m, N)=4 is stored in the field Pt (m, Pnum (m, loop))=Pt (m, Pnum (m, n))=Pt (m, 1) of the temporary file TmpCURRENT (m), that is, the field for storage of the set value of the injection stage number corresponding to the component No. 1, the set value in the field for the injection stage number corresponding to the component No. 1 among the set values of the molding condition of each field in the temporary file TmpCUURENT (m) is changed from 5 to 4, and as a result, the contents of the temporary file TmpCURRENT (m) are replaced with the set value of the molding condition in the precedent state by one record portion.

Subsequently, the CNC device decides whether or not the current value of the counter "loop" is decremented to a value of the recovery position storage register k, that is, whether or not the molding condition in the temporary file TmpCURRENT (m) is put back to the past state by backtrack to the position of the record address k designated by the operator in the search of the modification history storage file (Step d6). When the current value of the counter "loop" is not decremented to the value of the recovery position storage register k, the CNC device decrements the current value of the counter "loop" by 1 (Step d7) and repeatedly executes the processing in Steps d5 to d7 in the manner similar to the above to sequentially put the contents of the molding condition in the temporary file TmpCURRENT (m) back to the past state in units of one record portion at a time under the limitation to the set value of the component subjected to modification on its set value by the last modification.

When the decision in Step d6 results in true by reason that the current value of the counter "loop" finally reaches the value of the recovery position storage register k, all the contents of the set values of each molding condition in the fields Pt (m, 1) to Pt (m, PMAX) in the temporary file TmpCURRENT (m) are supposed to be put back to the same set values as the last molding condition as of modification on the set value by the k(-)th modification.

Subsequently, the CNC device stores each of the set values of the molding condition recovered in the fields Pt (m, 1) to Pt (m, PMAX) of the temporary file TmpCURRENT (m) as the last molding condition as of the k(-)th modification in the data fields Pr' (m, 1, k) to Pr' (m, PMAX, k) of the recovery data file RECOVERY' (m, k) for No. m injection molding machine. Further, since the recovery of the molding condition is merely regarded as one of the modes of setting modification, the CNC device stores each of the current time Date (m, k), the current value Shot (m, k) of the shot counter and the supplementary data Add (m, k) in a field Dater' (m, k) for storage of the date of the setting modification, a field Shotr' (m, k) for storage of the shot number as of setting modification and a field Addr' (m, k) for storage of supplementary data as of setting modification in the recovery data storage file RECOVERY (m, k). Then, the CNC device completes the creation of the recovery data storage file Recovery' (m, k).

Incidentally, the data required to be stored in the field for storage of the supplementary data is considered to be the comment such as "occurrence of defective products and "molding condition requiring care" or the character strings set up by the operator, and in this case, the input of the comment "recovered molding condition" or the like is required.

Subsequently, the CNC device displays a synopsis of the data stored in each field of the recovery data storage file RECOVERY' (m, k), that is, all the molding conditions Pr' (m, 1, k) to Pr' (m, PMAX, k) having been applied immediately before the k(−)th modification, the time Dater' (m, k), the shot number Shotr' (m, k) and the comment Addr' (m, k) as described above on the display screen (Step d9), and the operator is permitted to refer to these data at need.

Differently from "a method for storage and display of the modification history of set value" as shown in Japanese Patent Application Laid-open No. 62-197262, since all the past molding conditions as of the designated point may be referred to at a look, and it is extremely easy to grasp the data.

After having been referred to the display, the operator operates a reference end key when only reference to these data is required, or operates a setting execution key when the recovered molding condition would be applied intact to the future molding operation.

Figure 13:
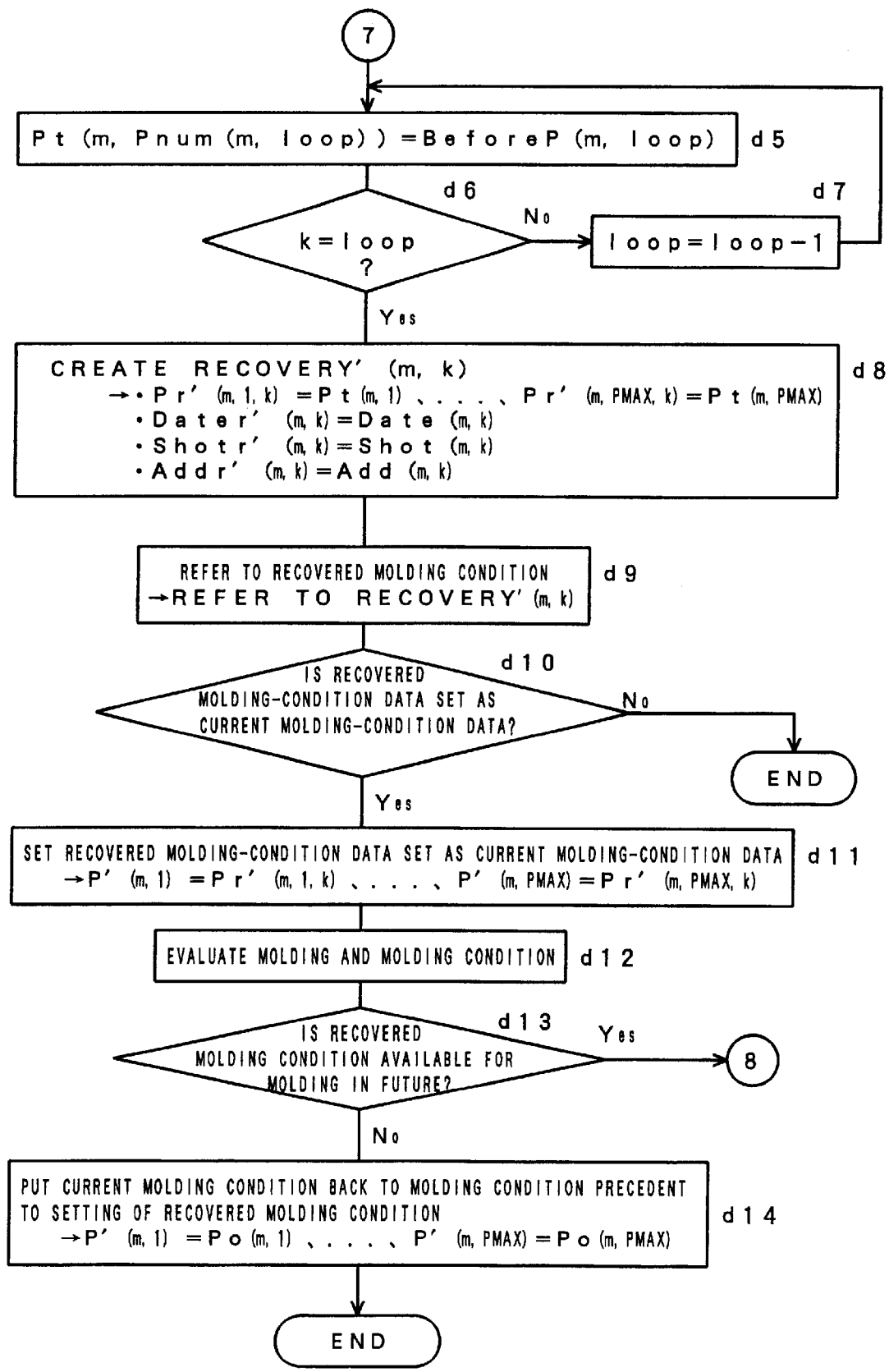
FIG. 13 is a flow chart continued from that shown in FIG. 12 and also showing the outline of the processing for recovery of the molding condition in the case of managing the modification history storage file individually by the CNC device provided for each injection molding machine.
Figure 14:
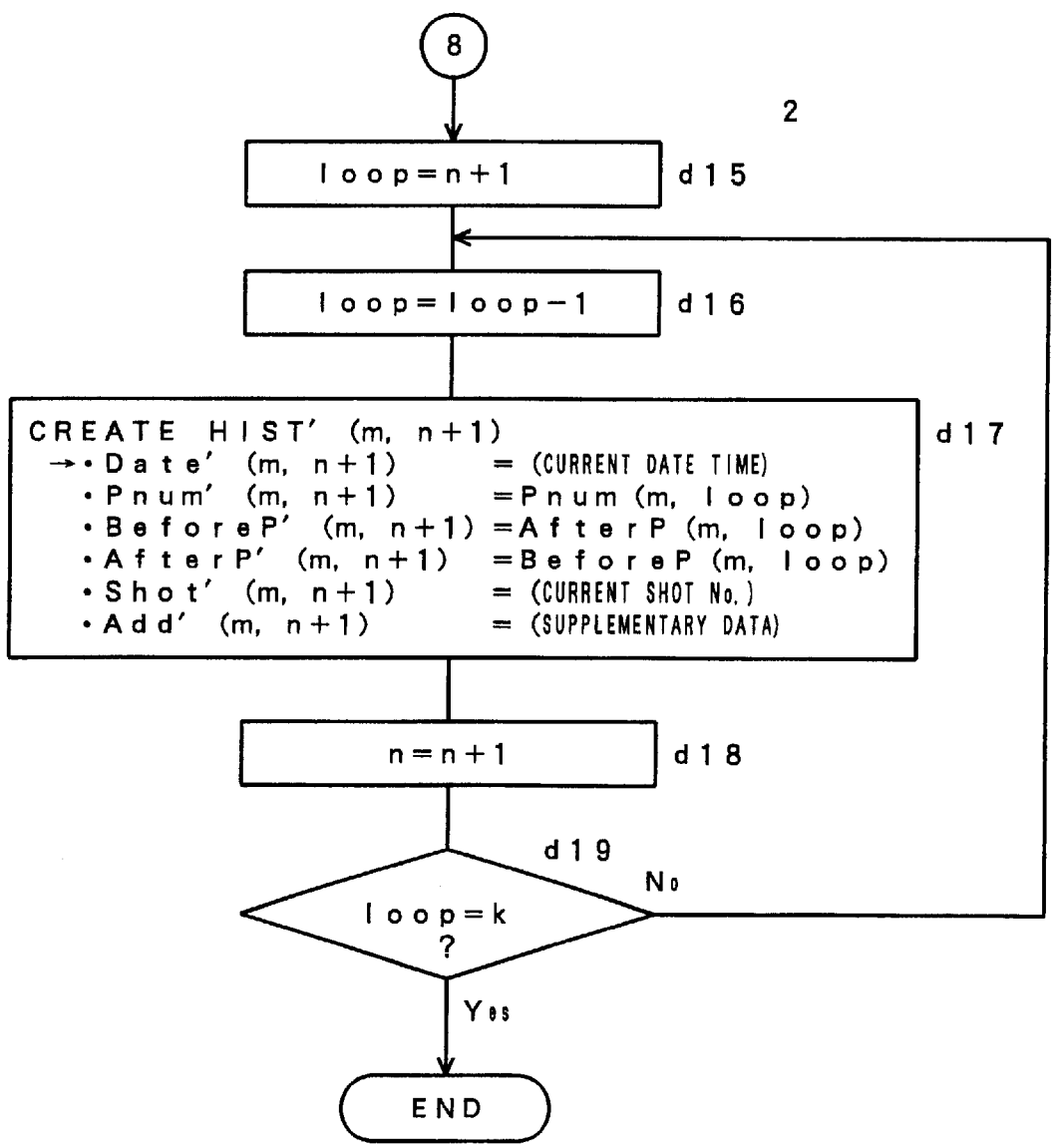
FIG. 14 is a flow chart continued from that shown in FIG. 13 and also showing the outline of the processing for recovery of the molding condition in the case of managing the modification history storage file individually by the CNC device provided for each injection molding machine.

The CNC device detects these key operation through the processing for decision in Step d10 and ends intact the processing for recovery of the molding condition shown in FIGS. 12 to 14 when the reference end key is operated.

On the other hand, when the setting execution key is operated, the CNC device sets the contents of the fields Pr' (m, 1, k) to Pr' (m, PMAX, k) of the recovery data storage file RECOVERY' (m, k) in each of the molding-condition storage fields P' (m, 1) to P' (m, PMAX) of the current data storage file CURRENT' (m) and stores the molding condition recovered through the above processing, i.e., the last molding condition as of the k(−)th modification as the future molding condition (Step d11).

Then, the operator actuates the injection molding machine for a while according to the recovered molding condition to check the workmanship of products (Step d12), and operates a recovery condition applying key when the operator is satisfied with the molding, or operates a recovery condition release key when the molding does not work out and the operator makes a decision that it is necessary to put the molding condition back to the precedent state.

The CNC device detects these key operation through the processing for decision in Step d13. When the recovery condition release key is operated, the CNC device sets the contents of the molding-condition storage fields Po (m, 1) to Po (m, PMAX) of the backup file OrgCURRENT (m) in the molding-condition storage fields P' (m, 1) to P' (m, PMAX) of the current data storage file CURRENT '(m), puts all the current molding conditions back to the state precedent to the processing for recovery of the molding condition (Step d15) and ends the processing for recovery of the molding condition shown in FIGS. 12 to 14.

On the other hand, when the operation of the recovery condition applying key is detected through the processing for decision in Step d13, the CNC device initializes the counter "loop" to a value higher by 1 than the current value n of the final record in the modification history storage file (Step d15) and starts the processing to optimize the modification history storage file.

The processing for optimization is for writing the records in the range from the k(−)th record (as of time of recovery) to the n(−)th record in the modification history storage file up to this point of time in reversed time series to the tail of the final record in the modification history storage file.

According to this processing, the modification history of the n(−)th record counted from the first record in the modification history storage file is added for storage to the address of n+1 with respect to the current value n of the final record in the modification history storage file, the modification history of the n−1 (−)th record counted from the first record in the modification history storage file is added to the address of n+2 with respect to the current value n of the final record in the modification history storage file, and at last, the modification history of the k(−)th record counted from the first record in the modification history storage file is added for storage to the address of n+(n−(k−1)) with respect to the current value n of the final record in the modification history storage file.

That is, when the past molding condition is set to start the molding, all the molding condition storage fields P' (m, 1) to P' (m, PMAX) in the current data storage file CURRENT' (m) are rewritten by batch processing, and therefore, a large change in set value occurs over the whole molding-condition components between the molding condition expected from now on and the molding condition having been applied until now. When the molding condition expected from now on, that is, the recovered molding condition is once written intact as one of the modification histories in the address of n+1 of the modification history storage file, it may well be that a remarkably discontinuous change in set value occurs in each field. Thus, the processing for optimization is required for a prevention of this drawback by inserting the modification histories positioned between the molding condition having been applied until now and the molding condition expected from now on into therebetween in reversed time-series, resulting in an interpolation of an unnatural gap relating to the modification histories.

Further, this embodiment only requires to store the modified set value of one component in each record of the modification history storage file. Thus, when the set values of a plurality of components are rewritten simultaneously through the processing for recovery of the molding condition, the processing to store these set values intact in the modification history storage file may cause failures in the case of needing to execute the processing for recovery of the molding condition in the future by making the backtrack to the precedent molding condition in excess of the molding condition recovered in the past. However, such a problem may be eliminated as long as the modification history storage file is subjected to optimization to create an interpolation record.

After having started the processing for optimization of the modification history storage file, the CNC device firstly decrements a current value of the counter "loop" by 1 to make an initial value of the counter equal to a current value n of the final record in the modification history storage file (Step d16), makes access to the modification history storage file as shown in FIG. 4 to create a new record HIST' (m, n+1) at the tail of the record HIST' (m, n) forming the presently-available final record in the modification history storage file and executes the following processing (Step d17).

(a) Set a present time read from a timer built in the CNC device in a field Date' (m, n+1) for storage of the date of the setting modification in the record HIST' (m, n+1).

(b) Set a number of the molding-condition component stored in the data field Pnum (m, loop) of the loop(-)th record in the modification history storage file in a field Pnum' (m, n+1) for storage of the number of the component subjected to setting modification in the same record.

(c) Set a value in the data field AfterP(m, loop) of the loop(-)th record in the modification history storage file in a field BeforeP' (m, n+1) for storage of the set value precedent to setting modification in the same record.

(d) Set a value in the data field BeforeP (m, Loop) of the loop(-)th record in the modification history storage file in a field AfterP' (m, n+1) for storage of the set value subjected to setting modification in the same record.

(e) Set a current value of the shot counter of the CNC device in a field Shot' (m, n+1) for storage of the shot number as of setting modification in the same record.

(f) Set supplementary data in an supplementary data storage field Add' (m, n+1) in the same record.

The supplementary data set up in this case is considered to be equal to that described in Step d8.

For the reversion of time series as described above, the processing in Step d17 requires the steps of storing the value of the field MterP (m, loop) for storage of the set value subjected to setting modification, instead of the value of the field BeforeP (m, loop) for storage of the set value precedent to setting modification, in the field BeforeP' (m, n+1) for storage of the set value precedent to setting modification, and storing the value of the field BeforeP (m, loop) for storage of the set value precedent to setting modification, instead of the value of the field AfterP (m, loop) for storage of the set value subjected to setting modification, in the field AfterP' (m, n+1) for storage of the set value subjected to setting modification.

Subsequently, the CNC device increments the value of the counter n representing the address of the final record in the modification history storage file by 1 to update and store the address of the final record in the modification history storage file (Step d18) and decides whether or not the current value of the counter "loop" is decremented to the value of the recovery position storage register k, that is, whether or not all the processing to add the n(-)th to k(-)th modification history records counted from the first record to the tail of the modification history storage file is completed (Step d19). When not completed, the CNC device repeatedly executes the processing in Steps d16 to d19 in the manner similar to the above.

During the above processing, the value of the counter "loop" is decremented one by one, while the value of the counter n is incremented one by one, and as a result, the n(-)th to k(-)th modification history records are stored at the tail of the modification history storage file in the backtrack manner on the basis of the value of the counter n prior to the start of optimization for the modification history storage file, as described above.

When all the target modification history records for addition to the modification history storage file are finally written in the modification history storage file by reason that the decision in Step d19 results in true, the CNC device ends the processing for recovery of the molding condition shown in FIGS. 12 to 14.

Incidentally, the molding condition expected from now on, that is, the recovered molding condition is equivalent to the k(-)th record in the modification history storage file, and as a result, is stored in the n+(n−(k−1))(−)th record on the basis of the counter Value n prior to the start of optimization for the modification history storage file.

Further, when the re-execution of the processing for recovery of the molding condition is required in the future, these interpolation records are recovered in the backtrack manner, and as a result, it becomes also possible to recover the molding condition precedent to the address n on the basis of the value of the counter n prior to the start of optimization for the modification history storage file on this occasion. On the other hand, in the case of no optimization for the modification history storage file, it is impossible to make backtrack from the molding condition of the address n+1 to the molding condition of the address n on the basis of the value of the counter n prior to the start of optimization for the modification history storage file, and therefore, the recovery for the molding condition precedent to the address n is inexecutable.

Figure 15:
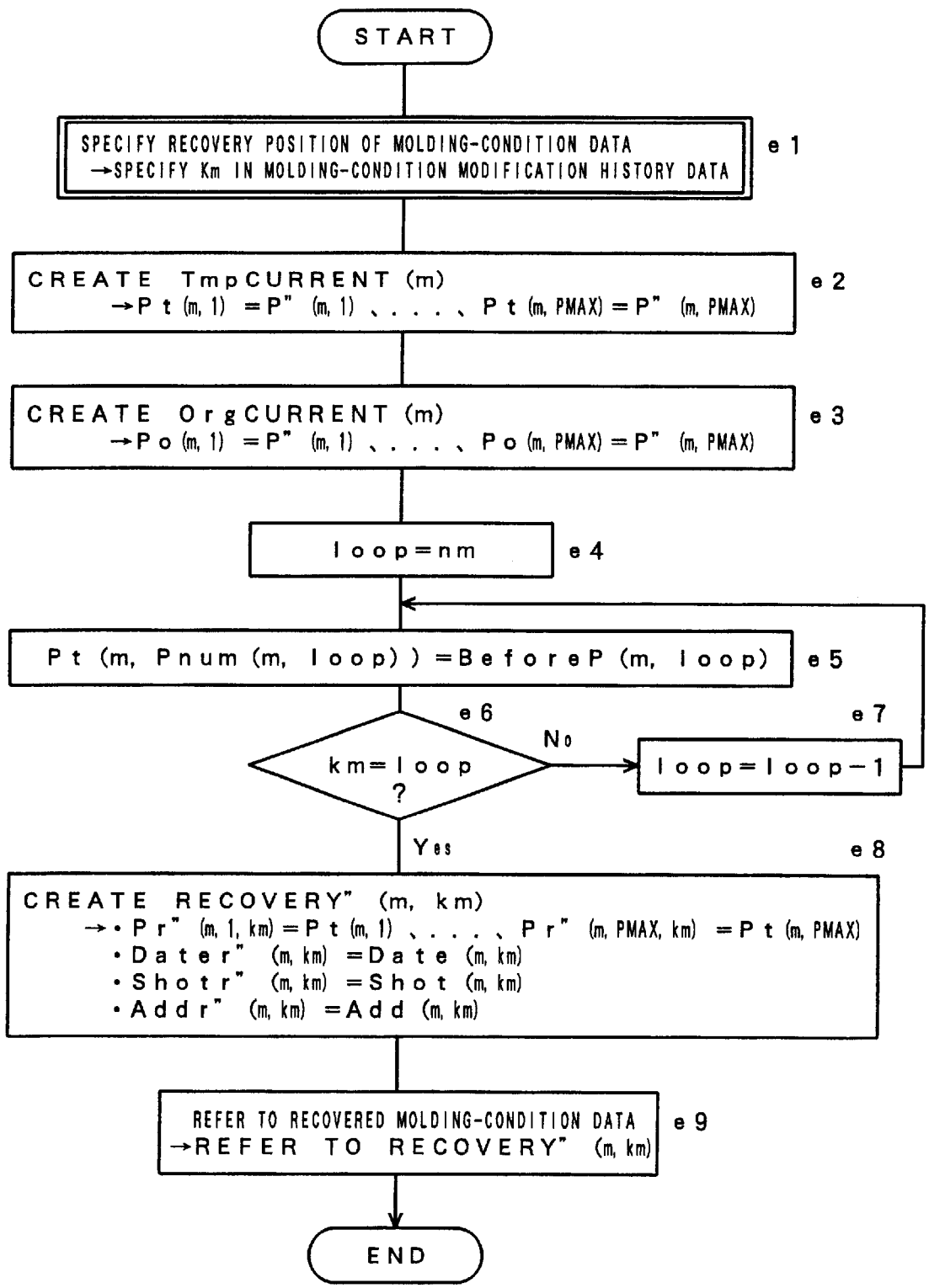
FIG. 15 is a flow chart showing the outline of the processing for recovery of the molding condition in the case of managing the modification history storage file of each injection molding machine by batch processing on the side of the host computer.

A description will now be given of the processing for recovery of the past molding condition and also display thereof on the display screen in the case of managing the modification history storage file for each injection molding machine by batch processing on the side of the host computer 1 with reference to FIG. 15. This processing for recovery of the molding condition is executed on the side of the host computer 1, is started by the operator by the step of operating the keyboard on the side of the host computer 1 for selection of the processing for recovery of the molding condition and corresponds to the processing shown by #3 to #6 in FIG. 3.

According to this embodiment, similarly to the processing for recovery of the molding condition on the side of the CNC device as described above, each of the means for displaying a synopsis of the contents of the modification history storage file on the display screen to directly specify the record address as of the point of time corresponding to the target molding condition for recovery from the synopsis on the display, the means for automatically selecting the record address of the target molding condition for recovery by designating the time of setting modification, the means for automatically selecting the record address of the target molding condition for recovery by designating the total shot number, the means for automatically selecting the record address of the target molding condition for recovery by designating the molding-condition component subjected to setting modification, the means for automatically selecting the record address of the target molding condition for recovery by designating the keyboard set up as the supplementary data and the means for automatically selecting the record address of the target molding condition for recovery by designating the range of the time of setting modification, the range of the shot number or a combination of these designating means are prepared for the means for specifying the target point of time of recovery of the molding condition. The operator is permitted to specify the target past point of time of recovery at will by selecting one of the above means as desired.

The processing for selection of the recovery means on the side of the host cmputer1 as shown in Step e1 is substantially similar to the processing in FIGS. 21 to 27 described above. However, since a plurality of modification history storage files for injection molding machines are present in the memory of the host computer 1 in the case of managing the modification history storage file by batch processing on the side of the host computer 1, consideration is made to manage the address of the final record in each modification history storage file by the counter n provided on each file basis, and also to provide a recovery position storage register km for storage of the position of a target record for recovery on each modification history storage file basis.

The processing (Step d1) for selection of the recovery means on the side of the CNC device is also considered to be exactly similar to the processing (Step e1) for selection of the recovery means on the side of the host computer 1 only by applying the description of the counter n and the recovery position storage register k shown in FIGS. 21 to 27 to that of the counter nm and the recover position storage register km, and therefore, a description of the processing action relating to Step e1 will here be omitted. Incidentally, a description of the following embodiment will be given on the assumption that selection of the modification history storage file for No. m injection molding machine is made for the recovery of the molding condition.

When the record address of the molding condition as of the target point of time of recovery is stored in the recovery position storage register km through the processing in Step e1, the host computer 1 executes the processing to create a temporary file TmpCURRENT (m) for storage of all the present molding conditions of No. m injection molding machine as initial values.

The temporary file TmpCURRENT (m) for No. m injection molding machine is substantially similar in configuration to the current data storage file for No. m injection molding machine, and is composed of fields from Pt (m, 1) for storage of the set value of the molding condition in the component No. 1 to Pt (m, PMAX) for storage of the set value of the molding condition in the component No. PMAX. The temporary file TmpCURRENT (m) is created by copying all the set values of the fields P" (m, 1) to P" (m, PMAX) in the current data storage file for No. m injection molding machine into the fields Pt(m, 1) to Pt (m, PMAX) of the temporary file TmpCURRENT (m) (Step e2).

Further, the host computer 1 creates a file OrgCURRENT (m) as a backup file for holding all the present molding conditions of No. m injection molding machine by saving, in addition to the temporary file TmpCURRENT (m). The backup file OrgCURRENT (m) is also similar in configuration to the current data storage file for No. m injection molding machine and is composed of fields from Po (m, 1) for storage of the set value of the molding condition in the component No. 1 to Po (m, PMAX) for storage of the set value of the molding condition in the component No. PMAX. The backup file OrgCURRENT (m) is created by copying all the set values of the fields P" (m, 1) to P" (m, PMAX) of the current data storage file into the fields Po (m, 1) to Po (m, PMAX) in the backup file OrgCURRENT (m), similarly to the above (Step e3).

After having created the temporary file TmpCURRENT (m) and the backup file OrgCURRENT (m), the host computer 1 subsequently initializes the counter "loop" to a value n of the final record in the modification history storage file for No. m injection molding machine.

Subsequently, the host computer 1 reads a value of the data field Pnum (m, loop) of the loop(−)th record in the modification history storage file for No. m injection molding machine, that is, a value of Pnum (m, loop) of the number of the molding-condition component subjected to modification on its set value by the loop(−)th modification in No. m injection molding machine, on the basis of the current value of the counter "loop". Then, the host computer makes access to the Pnum (m, loop)(−)th data field in the temporary file TmpCURRENT (m), that is, the data field Pt (m, Pnum (m, loop)) in the temporary file TmpCURRENT (m) stored with the set value of the same component as the molding-condition component subjected to modification on its set value by the loop(−)th modification in No. m injection molding machine, on the basis of the value of Pnum (m, loop) described above, and replaces the contents of the data field Pt (m, Pnum(m, loop)) with the set value BeforeP (m, loop) of the last component as of modification on its set value by the loop(−)th modification in No. m injection molding machine to put the contents of the set value of the molding condition in the temporary file TmpCURRENT (m) back to the precedent state by one record portion.

Subsequently, the host computer 1 decides whether or not the current value of the counter "loop" is decremented to the value in the recovery position storage register km, that is, whether or not the molding condition in the temporary file TmpCURRENT (m) is put back to the past state by backtrack to the position of the record address km designated by the operator in the search of the modification history storage file (Step e6). When the current value of the counter "loop" is not decremented to the value in the recovery position storage register km, the host computer 1 decrements the current value of the counter "loop" by 1 (Step e7) and repeatedly executes the processing in Steps e5 to e7 in the manner similar to the above to put the contents of the molding condition in the temporary file TmpCURRENT (m) back to the past state in sequence in units of one record portion at a time under the restriction on the set value of the component subjected to modification on its set value by the last modification.

When the decision in Step e6 results in true by reason that the current value of the counter "loop" finally reaches the value of the recovery position storage register km, all the contents of the set values of the molding conditions in the fields Pt (m, 1) to Pt (m, PMAX) of the temporary file TmpCURRENT (m) are supposed to be put back to the same set values as the last molding condition as of modification on its set value by the k(−)th modification in No. m injection molding machine.

Subsequently, the host computer 1 stores each of the last molding-condition set values as of the k(−)th modification, as the molding condition recovered in the fields Pt (m, 1) to Pt (m, PMAX) of the temporary file TmpCURRENT (m), in each of the data fields Pr" (m, 1, km) to Pr" (m, PMAX, km) in the recovery data storage file RECOVERY' (m, Km). Further, the host computer 1 stores each of the current time Date (m, km), the current value Shot (m, km) of the shot counter for No. m injection molding machine and the supplementary data Add (m, km) in each of the field Dater" (m, km) for storage of the date of the setting modification, the field Shotr" (m, km) for storage of the shot number as of setting modification and the field Addr" (m, km) for storage of supplementary data as of setting modification in the recovery data storage file RECOVERY" (m, km). The host computer completes the recovery data storage file RECOVERY "(m, km) in this manner (Step e8).

As the data required to be stored in the field for storage of the supplementary data, input of the comment such as "recovered molding condition" or the like is required in this case.

Subsequently, the host computer 1 displays the data stored in each field of the recovery data storage file RECOVERY" (m, km), that is, a synopsis of all the molding conditions Pr" (m, 1, km) to Pr" (m, PMAX, km) having been applied immediately before the k(−)th modification, the time dater" (m, km), the shot number shotr" (m, km) and the comment Addr" (m, km) on the display screen of the CNC device for notification to the operator (Step e9), and ends intact the processing for recovery of the molding condition shown in FIG. 15.

Differently from "the method for storage and display of the modification history of set values" as shown in Japanese Patent Application Laid-open No. 62-197262, all the molding conditions having been applied at the designated point of time may be referred to at a look, and therefore, it is extremely easy to grasp the data. Further, since the management of the modification history storage files for all the injection molding machines is made on the side of the host computer 1, the modification history of the molding condition for every injection molding machine may be referred to only by altering the value of an index m for specifying the target injection molding machine for reference to modification history, resulting in convenience for reference.

Figure 16:
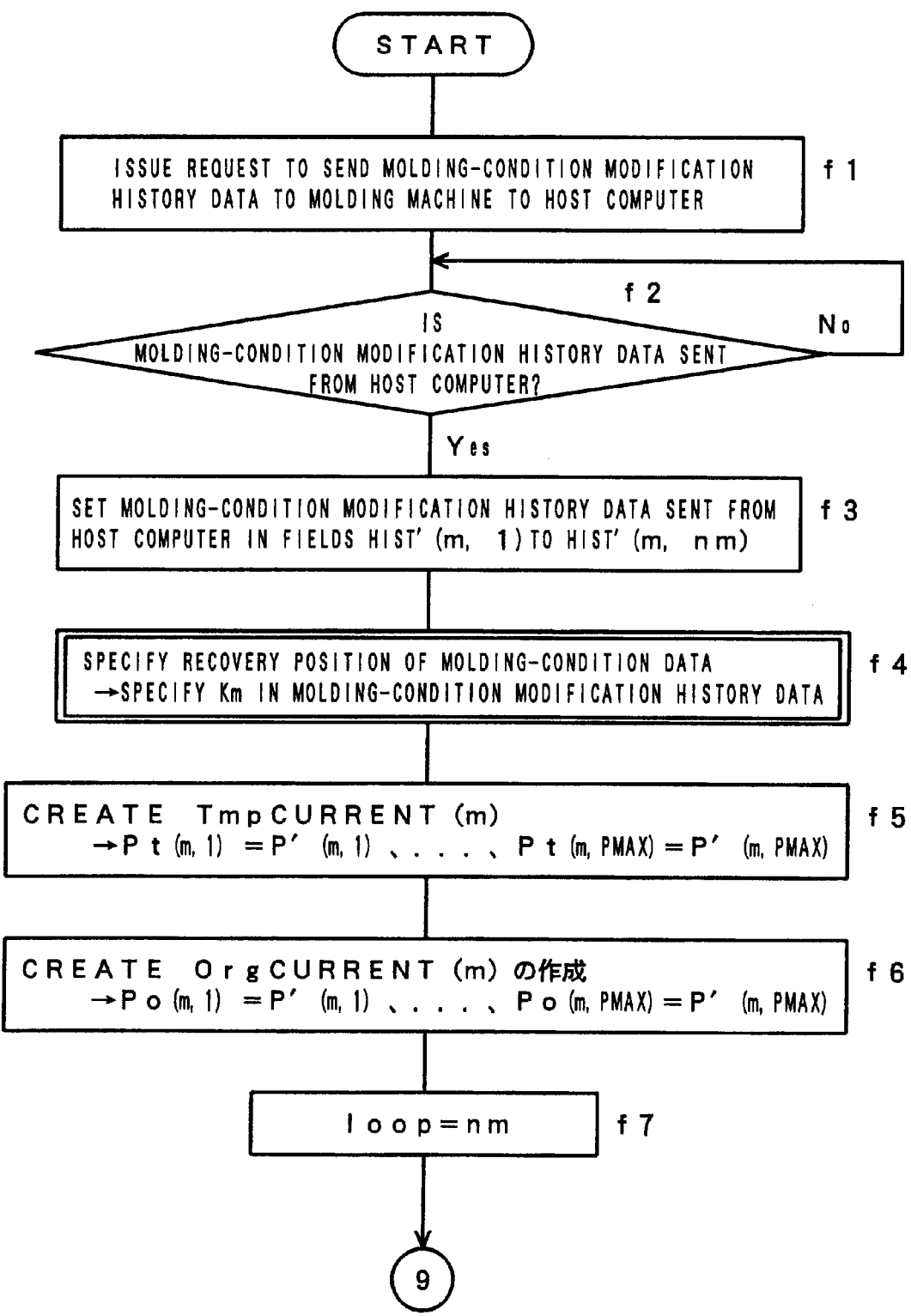
FIG. 16 is a flow chart showing the outline of the processing on the side of the CNC device in the case of executing the processing for recovery of the molding condition by managing the modification history storage file of each injection molding machine by batch processing on the side of the host computer, while making the transfer of data to the CNC device.
Figure 17:
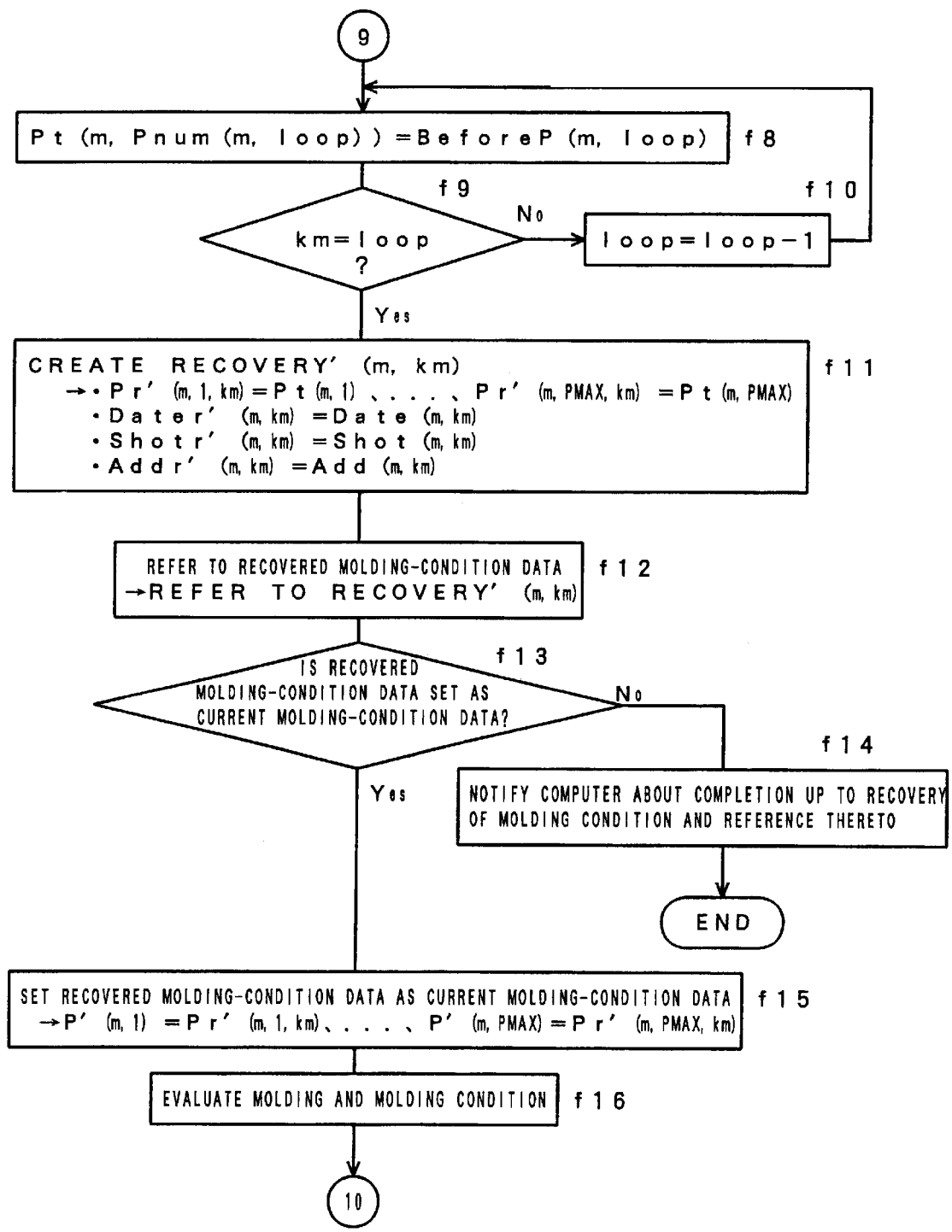
FIG. 17 is a flow chart continued from that shown in FIG. 16 and also showing the outline of the processing on the side of the CNC device in the case of executing the processing for recovery of the molding condition by managing the modification history storage file of each injection molding machine by batch processing on the side of the host computer, while making the transfer of data to the CNC device.
Figure 18:
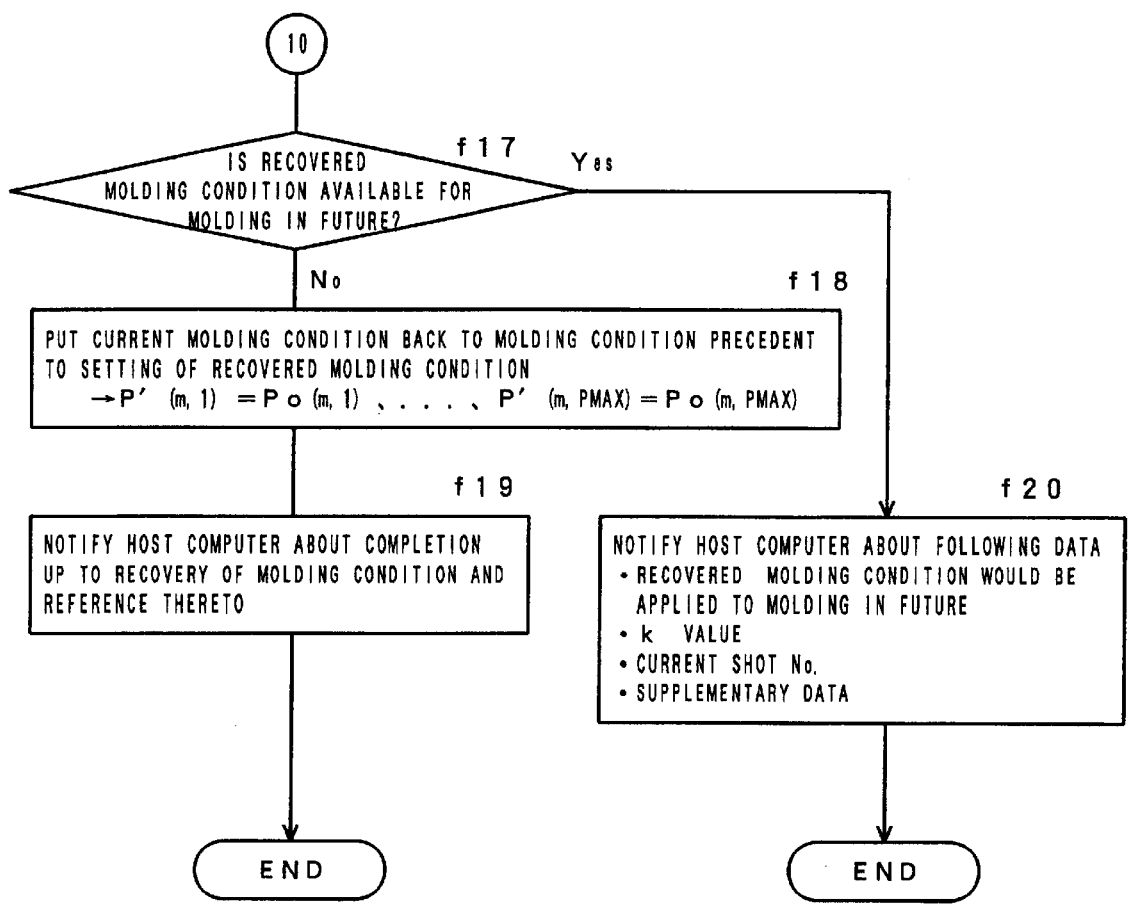
FIG. 18 is a flow chart continued from that shown in FIG. 17 and also showing the outline of the processing on the side of the CNC device in the case of executing the processing for recovery of the molding condition by managing the modification history storage file of each injection molding machine by batch processing on the side of the host computer, while making the transfer of data to the CNC device.
Figure 19:
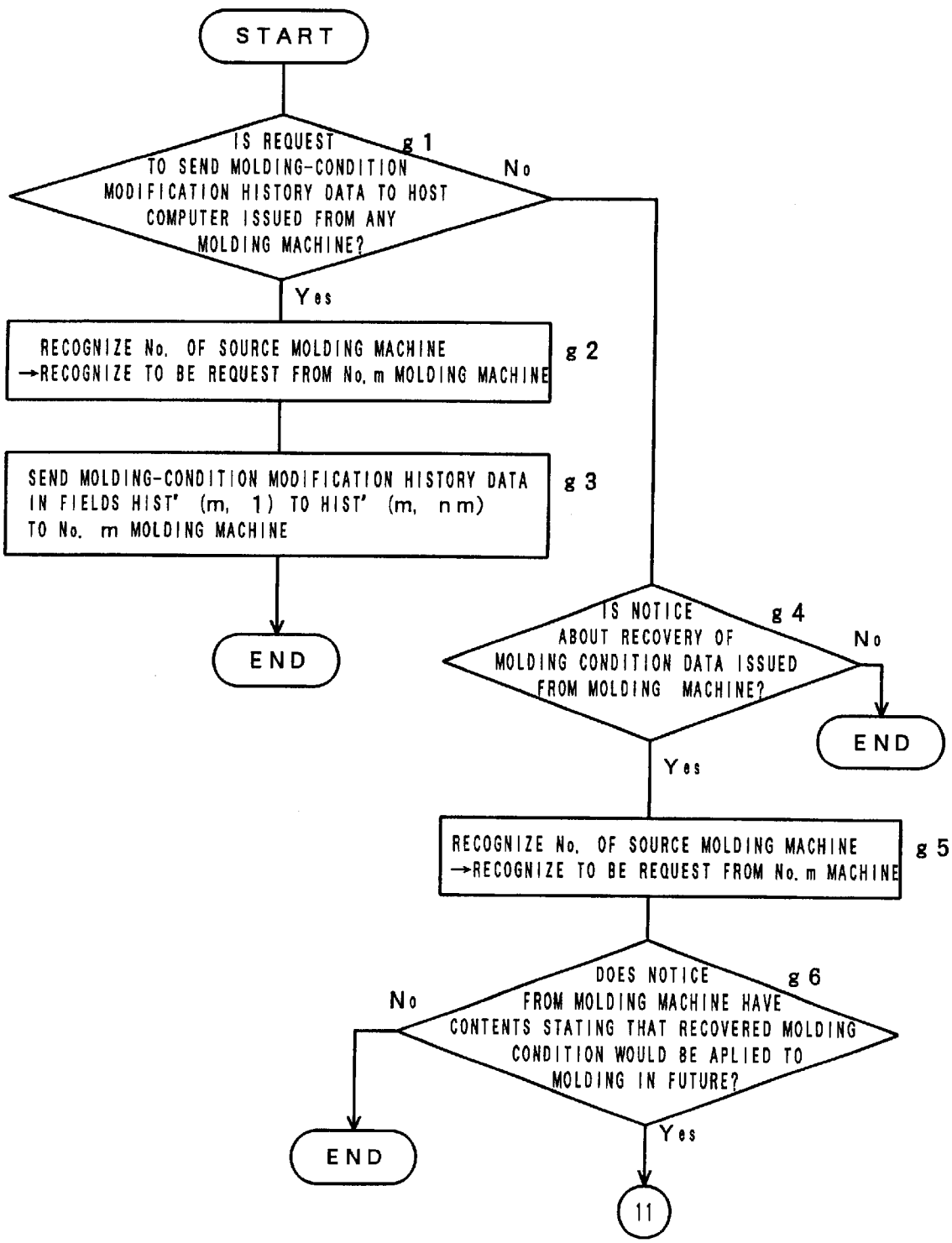
FIG. 19 is a flow chart showing the outline of the processing on the side of the host computer in the case of executing the processing for recovery of the molding condition by managing the modification history storage file of each injection molding machine by batch processing on the side of the host computer, while making the transfer of data to the CNC device.
Figure 20:
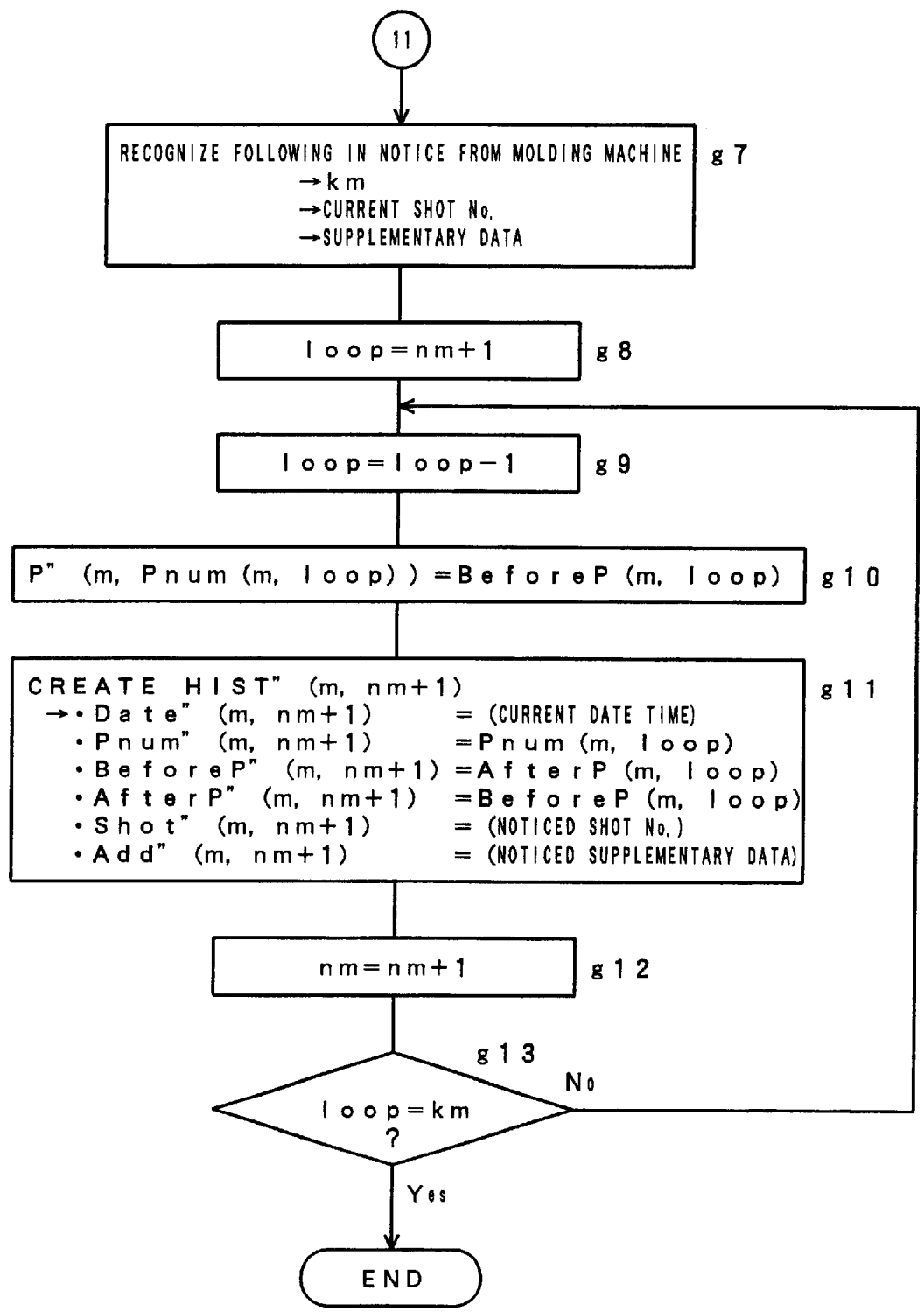
FIG. 20 is a flow chart continued from that shown in FIG. 19 and also showing the outline of the processing on the side of the host computer in the case of executing the processing for recovery of the molding condition by managing the modification history storage file of each injection molding machine by batch processing on the side of the host computer, while making the transfer of data to the CNC device.

A description will now be given of the processing for recovery of the past molding condition, display thereof on the display screen and setting of the recovered molding condition for each injection molding machine in the case of managing the modification history storage file for each injection molding machine by batch processing on the side of the host computer 1 with reference to FIGS. 16 to 20. This processing for recovery of the molding condition is executed by the operator through the step of operating the keyboard of the CNC device for selection of the processing for recovery of the molding condition, while making a communication between the CNC device of the injection molding machine and the host computer 1 mutually through the data transmission line 2 and corresponds to the processing shown by #3 to #7 in FIG. 3. The processing on the side of the CNC device of each injection molding machine is shown in FIGS. 16 to 18, while the processing on the side of the host computer 1 is shown in FIGS. 19 and 20. In this case, a description will be given of the processing by taking the case of operating the CNC device of No. m injection molding machine, for instance.

After having detected ON operation of the key for selection of the processing for recovery of the molding condition, the CNC device firstly outputs a request signal for transfer of the modification history storage file to the host computer 1 (Step f1) and is placed in the standby state until data is inputted (Step f2).

On the other hand, after having detected the transfer request signal from the CNC device of No. m injection molding machine through the processing for decision in Step g1 included in the background processing executed repeatedly every predetermined cycle as shown in FIGS. 19 and 20, the host computer 1 specifies the source injection molding machine of the transfer request signal on the basis of the value m of the ID code contained in the transfer request signal (Step g2) and transfers all the records of the addresses 1 to nm in the modification history storage file for No. m injection molding machine, that is, all the data of the records HIST" (m, 1) to HIST" (m, nm), to the CNC device of No. m injection molding machine (Step g3).

After having detected the reception of the modification history storage file through the processing for decision in Step f2, the CNC device stores all the data HIST" (m, 1) to HIST" (m, nm) transferred from the host computer 1 as HIST'(m, 1) to HIST' (m, nm) of its own modification history storage file and thereafter executes the processing on this file.

Accordingly, the processing from Step f4 to f11 relating to the selection of the record and the recovery of the molding condition corresponding to the point of the target molding condition for recovery is considered to be exactly similar to the processing in Steps dl to d8 on the side of the CNC device shown in FIGS. 12 to 14 by applying the description of the recovery position storage register km and the counter nm to that of the recovery position storage register k and the counter n. Thus, the redundant description will be here omitted.

After having completed the recovery data storage file RECOVERY' (m, km) in the manner similar to the above, the CNC device displays a synopsis of the data stored in each field of the recovery data storage file RECOVERY' (m, km), that is, all the molding conditions Pr' (m, 1, km) to Pr'(m, PMAX, km) having been applied immediately before the k(−)th modification in No. m injection molding machine, the time Dater' (m, km), the shot number Shotr' (m, km) and the comment Addr' (m, km) on the display screen (Step f12), and the operator is permitted to refer to these data at need.

Then, after having referred to the display, the operator operates the reference end key when the reference to these data is only required, or operates the setting execution key when the recovered molding condition would be applied intact to the future molding.

The CNC device detects these key operations through the processing for decision in Step f13. When the reference end key is operated, the CNC device outputs a reference end signal representing the completion of only the recovery of the molding condition and the reference to the data to the host computer 1 (Step f14) and ends intact the processing for recovery of the molding condition shown in FIGS. 16 to 18.

The host computer 1 detects the reference end signal outputted from the CNC device of No. m injection molding machine through the processing for decision in Step g4 included in the background processing shown in FIGS. 19 and 20, specifies the source injection molding machine of the reference end signal on the basis of the value m of the ID code contained in the reference end signal (Step g5) and decides whether the contents of communication relate to the end of the reference or the requirement for the practical use of the recovered molding condition for the molding (Step g6). In this case, since the reference end signal is outputted and there is no change in the modification history of the new setting on the molding condition for No. m injection molding machine, and the operation relating to the modification history storage file for No. m injection molding machine is not required. Accordingly, the host computer 1 ends intact the processing in the pertinent cycle.

On the other hand, when the operation of the setting execution key is detected through the processing for decision in Step f13, the CNC device sets the contents of each of the fields Pr' (m, 1, km) to Pr' (m, PMAX, km) of the recovery data storage file RECOVERY' (m, km) in each of the molding condition storage fields P'(m, 1) to P'(m, PMAX) of the current data storage file CURRENT'(m), and stores the last molding condition as of the km(−)th modification resulting from the recovery through the above processing, as the future molding condition (Step f15).

Then, the operator actuates the injection molding machine for a while according to the recovered molding condition to check the workmanship of products (Step f16), and operates the recovery condition applying key when the operator is satisfied with the molding operation, or operates the recovery condition release key when the molding operation does not work out and the operator makes a decision that it is necessary to put the molding condition back to the precedent state.

The CNC device detects these key operations through the processing for decision in Step f17. When the recovery condition release key is operated, the CNC device sets the contents of each of the molding condition storage fields Po (m, 1) to Po (m, PMAX) of the backup file OrgCURRENT (m) in each of the molding condition storage fields P' (m, 1) to P' (m, PMAX) of the current data storage file CURRENT' (m), puts all the current molding conditions back to the state precedent to the execution of the processing for recovery of the molding condition (Step f18), outputs the reference end signal representing the completion of only the recovery of the molding condition and the reference to the data to the host computer 1 (Step f19) and ends intact the processing for recovery of the molding condition shown in FIGS. 16 to 18.

The host computer 1 detects the reference end signal outputted from the CNC device of No. m injection molding machine through the processing for decision in Step g4 included in the background processing shown in FIGS. 19 and 20 and specifies the source injection molding machine of the reference end signal on the basis of the value m of the ID code contained in the reference end signal (Step g5). Then, the host computer decides whether the contents of communication relate to the end of the reference or the requirement for the practical use of the recovered molding condition for the molding (Step g6). In this case, since the reference end signal is outputted and there is no change in the modification history of the new setting on the molding condition for No. m injection molding machine, the host computers ends intact the processing in the pertinent cycle.

On the other hand, when the operation of the recovery condition applying key is detected through the processing for decision in Step f17, the CNC device outputs the recovery data application signal representing the requirement for the practical use of the recovered molding condition for the molding to the host computer 1, transmits an address value km of the modification history storage file corresponding to the point of time of the recovered molding condition, the current value of the shot counter and the supplementary data set up by the operator through the processing for recovery of the molding condition on this occasion, i.e., the supplementary data such as "recovered molding condition" to the host computer 1 (Step f20) and ends the processing for recovery of the molding condition shown in FIGS. 16 to 18.

The host computer 1 detects the recovery data application signal outputted from the CNC device of No. m injection molding machine through the processing for decision in Step g4 included in the background processing shown in FIGS. 19 and 20 and specifies the source injection molding machine of the recovery data application signal on the basis of the value m of the ID code contained in the recovery data application signal (Step g5). Then, the host computer decides whether the contents of communication relate to the end of the reference or the requirement for the practical use of the recovered molding condition for the molding (Step g6). In this case, the recovery data application signal is outputted, and it is considered that there is a change in the modification history of the new setting on the molding condition for No. m injection molding machine.

In this connection, the host computer 1 refers to the data transferred from the CNC device of No. m injection molding machine, that is, the address value km of the modification history storage file, the current value of the shot counter and the supplementary data set up by the operator through the processing on the side of the CNC device for recovery of the molding condition on t his occasion (Step g7) and further initializes the counter "loop" to a value higher by 1 than the current value nm of the final record in the modification history storage file for No. m injection molding machine. Then, the host computer sets the same condition as the condition recovered on the side of the CNC device in the current data storage file CURRENT" (m) for No. m injection molding machine on the side of the host computer 1 and starts the processing to store the modification history of the new setting in the modification history storage file for No. m injection molding machine.

The host computer 1 firstly decrements the current value of the counter "loop" by 1 to make its initial value equal to the current value nm of the final record in the modification history storage file for No. m injection molding machine (Step g9) and reads the value of the data field Pnum (m, loop) in the loop(-)th record in the modification history storage file for No. m injection molding machine, that is, the value Pnum (m, loop) as the number of the molding-condition component subjected to modification on its set value by the loop(-)th modification in No. m injection molding machine, on the basis of the current value of the counter "loop". Then, the host computer makes access to the Pnum (m, loop)(-)th data field of the current data storage file CURRENT" (m) for No. m injection molding machine as shown in FIG. 5, that is, the data field P" (m, Pnum (m, loop)) of the current data storage file CURRENT" (m) stored with the set value of the same component as the molding-condition component subjected to modification on its set value by the loop(-)th modification in No. m injection molding machine, on the basis of the value of Pnum (m, loop) described above and replaces the contents of the data field P" (m, Pnum(m, loop)) with the set value BeforeP(m, loop) of the last molding-condition component as of modification on its set value by the loop(-)th modification in No. m injection molding machine to put the contents of the molding-condition set value in the current data storage file CURRENT (m) for No. m injection molding machine back to the precedent state by one record portion.

Subsequently, the host computer 1 makes access to the modification history storage file for No. m injection molding machine to create a new record HIST" (m, nm+1) at the tail of the record HIST" (m, nm) forming the presently-available final record in the modification history storage file and executes the following processing (Step g11).

(a) Set a current time read from a timer built in the host computer 1 in a field Date" (m, nm+1) for storage of the date of the setting modification in the record HIST" (m, nm+1).

(b) Set a number of the molding-condition component stored in the data field Pnum (m, loop) in the loop(-)th record of the modification history storage file in a field Pnum" (m, nm+1) for storage of the component number subjected to setting modification in the same record.

(c) Set a value of the data field AfterP(m, loop) in the loop(-)th record of the modification history storage file in a field BeforeP" (m, nm+1) for storage of the set value precedent to setting modification in the same record.

(d) Set a value of the data field BeforeP(m, loop) in the loop(-)th record of the modification history storage file in a field AfterP" (m, nm+1) for storage of the set value subjected to setting modification in the same record.

(e) Set a current value of the shot counter recognized through the processing in Step g7 in a field Shot" (m, nm+1) for storage of the shot number as of setting modification in the same record.

(f) Set supplementary data recognized through the processing in Step g7 in an supplementary data storage field Add" (m, nm+1) in the same record.

Subsequently, the host computer 1 increments the value of the counter nm representing the final record address of the modification history storage file for No. m injection molding machine by 1 to update and record the final record address of the modification history storage file for No. m injection molding machine (Step g12) and decides whether or not the current value of the counter "loop" is decremented to the value of the recovery position storage register km (Step g13). When not decremented, the host computer repeatedly executes the processing in Steps g9 to g13 in the manner similar to the above.

When the decision in Step g13 results in true by reason that the current value of the counter "loop" finally reaches the value of the recovery position storage register km, all the contents of each molding-condition set value in the fields P" (m, 1) to P" (m, PMAX) of the current data storage file CURRENT" (m) for No. m injection molding machine are put back to the last molding condition as of modification on its set value by the km(−)th setting modification, that is, the same set value as the recovered molding condition set again for No. m injection molding machine through the processing on the side of the CNC device, while all the target modification history records for addition to the modification history storage file on the side of the host computer 1 are written into the modification history storage file for No. m injection molding machine on the side of the host computer 1, and the processing for recovery of the molding condition shown in FIGS. 16 to 18 comes to an end.

That is, the processing in Steps g8, g9, g10 and g13 on the side of the host computer 1 is for setting the same set value as the recovered molding condition set up for No. m injection molding machine through the processing on the side of the CNC device in the current data storage file CURRENT" (m) on the side of the host computer 1, and is similar in its substantial processing contents to the processing in Steps f7 to f10 required for creation of the recovery data storage file RECOVERY' (m, km) on the side of the CNC device. Further, the processing in Steps g8, g9, g11, g12 and g13 on the side of the host computer 1 is for storing the recovery molding condition set in the current data storage file CURRENT' (m) on the side of the CNC device in the modification history storage file for No. m injection molding machine through the processing on the side of the host computer 1 as the new setting modification history, and is similar in its substantial processing contents to the processing in Steps d15 to d19 required for individual management of the modification history storage file only by the CNC device of each injection molding machine.

The above description has been given of the processing to automatically recover the molding condition with reference to the modification history storage file by backtrack from the latest modification history to the past in sequence. On the contrary, it is also possible to automatically recover the molding condition with reference to the modification history storage file by trace from the oldest modification history toward the latest one in sequence.

To attain the above operation, it is only sufficient to execute the processing for recovery of the molding condition shown in FIGS. 12 to 14 in consideration of the point of preserving data FIRSTP(m, 1) to FIRSTP(m, PMAX) of each item of the firstly-applied molding condition for the application to initial data of the temporary file TmpCURRENT (m), instead of using the current values of data P'(m, 1) to P' (m, PMAX) of the presently-available current data storage file as the initial data of the temporary file TmpCURRENT(m), and also the point of advancing the contents of this TmpCURRENT (m), that is, the data of the firstly-applied molding condition FIRSTP(m) as the new molding condition one by one on the basis of the modification history in the modification history storage file.

That is, the execution of Pt (m, 1)=FIRSTP (m, 1), . . . , Pt (m, PMAX)=FIRSTP (m, PMAX) is only required, instead of the processing in Step d2 in FIG. 12, for setting data FIRSTP (m, 1) to FIRSTP (m, PMAX) of each item of the firstly-applied molding condition in the temporary file TmpCURRENT (m), and the execution of Pt (m, Pnum(m, loop))=(After (m, loop) is only required, instead of the processing in Step d5, for making the trace of the modification history storage file from the oldest modification history toward the latest one in sequence together with the application of loop=1 in place of the processing in Step d4 and that of loop=loop+1 in place of the processing in Step d7.

However, when the upper limit of the record number of the modification history storage file is given by n(max), that is, when the file in the form of ring buffer is used as the modification history storage file, or when there is a need for configuration to clear a part of the modification history storage file for storage of the new modification history, overwriting or partial deletion is required for the modification history storage file, and therefore, there is not practically much point in leaving intact the data of each item of the firstly-applied actual molding condition over as FIRSTP(m, 1) to FIRSTP (m, PMAX).

For that reason, a discontinuous portion in the modification history is caused by overwriting or deletion for the modification history storage file, and as a result, the recovery of the molding condition by making the trace of the modification history on the basis of the firstly-applied molding condition is made inexecutable.

Accordingly, it is necessary to cope with the above case through the processing for giving up the recovery of the molding condition relating to a portion subjected to overwriting or deletion or its precedent portion, while updating and storing the oldest molding condition left in the overwriting or deletion stage as FIRSTP (m, 1) to FIRSTP (m, PMAX), and then executing the recovery of only the molding condition relating to a portion on and after the portion subjected to overwriting or deletion, that is, a portion where the modification history remains.

Figure 31:
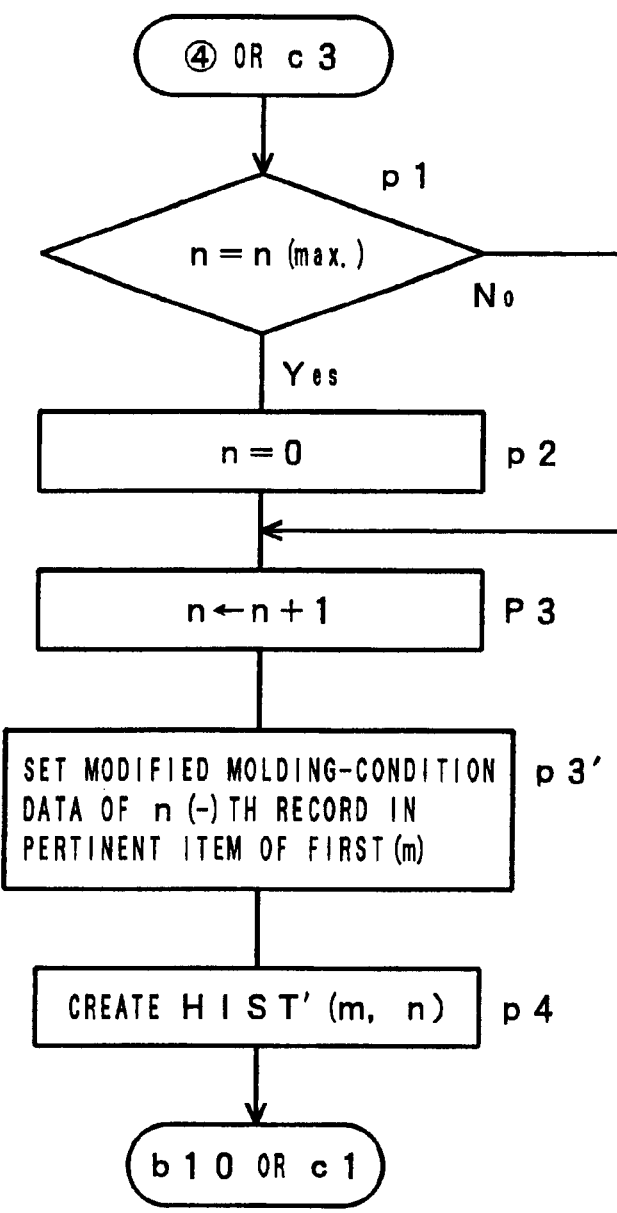
FIG. 31 is a flow chart showing the processing for addition of a new record in the case of placing restrictions on the record capacity of the modification history storage file.

To attain the above operation, it is sufficient to only execute the processing for addition of the new record shown in FIG. 31, instead of the processing for addition of the new record shown in FIG. 30.

That is, before overwriting is made on the n(−)th record through the processing in Step p4 shown in FIG. 30, consideration is made to only apply a group of associated item data of the molding condition FIRST (m) preserved at that point of time to the molding condition FIRST (m) serving as an updated initial value (processing in Step p3' shown in FIG. 31) by replacing the modification history stored in the n(−) record at that point of time, that is, the data of the molding condition items of the target oldest modification history for overwriting or deletion by the processing in Step p4 with the associated item data of the molding condition FIRSTP(m) preserved at that point of time. In the processing on and after the above processing, the molding condition FIRST (m) updated through the processing in Step p3' is regarded as the oldest molding condition capable of recovery at that point of time.

However, the target molding condition FIRST (m) for updating of data in Step p3' does not always agree with the firstly-applied actual molding condition FIRST (m).

Since the processing in Step p3' is required every the addition of the new record, the contents of FIRST (m) are always equivalent to the molding condition made in consideration of all the modification histories covering from the modification history of the firstly-applied actual molding condition to the target modification history for overwriting on this occasion.

A description will now be given of the processing in the case of the n(max)+1(−)th modification made on condition that the upper limit of the record number in the modification history storage file is given by n(max), for instance.

That is, this processing is required in the case where the CNC device having put the value of the counter n back to 1 through the processing in Steps p1 to p3 shown in FIG. 31 is just ready to delete the data at the address 1 of the modification history storage file for storage of the modification history relating to the n(max)+1(–)th modification in the data field at the address 1 on condition that the firstly-applied actual molding condition is stored intact in FIRST (m), the first modification history is stored in the address 1 of the modification history storage file, the second modification history is stored in the address 2 of the modification history storage file, and the n(max)(–)th modification history is stored in the address n(max) of the modification history storage file.

In this case, the CNC device executes the processing in Step p3' on the basis of the current value 1 of the counter n to create the molding condition FIRST (m) serving as the updated initial value by replacing one molding-condition data stored at present in the address 1 of the modification history storage file, that is, the data of the molding-condition item subjected to modification on its value by the first modification, with the associated item data of the molding condition FIRST (m) associated with the stored one molding condition data described above.

That is, the contents of the molding condition FIRST (m) precedent to the replacement made through the processing in Step p3' are exactly the same as the firstly-applied actual molding condition itself, and the contents of the molding condition FIRST (m) after the replacement made through the processing in Step p3' agree with the molding condition having been subjected to modification on its set value by the first modification.

Further, the processing in Step p3' required for the n(max)+2(–)th modification causes the creation of the molding condition FIRST (m) serving as the updated initial value by replacing one molding condition data stored at present in the address 2 of the modification history storage file, that is, the data of the molding condition item subjected to modification on its set value by the second modification, with the associated item data of the molding condition FIRST (m) associated with the one stored molding condition data described above, on the basis of the current value 2 of the counter n. However, the contents of the molding condition FIRST (m) precedent to the replacement are equivalent to the molding condition having been subjected to modification on its set value by the first modification, and, as a matter of course, do not agree with the contents of the firstly-applied actual molding condition FIRST (m).

The contents of the molding condition FIRST (m) after the replacement made through the processing in Step p3' agree with the molding condition having been subjected to modification on its set value by the second modification, that is, the molding condition made in consideration of the modification history of the first modification stored in the address 1 and the modification history of the second modification stored in the address 2, and this molding condition FIRST (m) is regarded as the oldest molding condition capable of recovery at that point of time.

That is, when the upper limit of the record number of the modification history storage file is given by n(max), it may be said that backtrack to the past molding condition in excess of n(max) (the record number of the modification history storage file) is made inexecutable on the basis of the molding condition practically applied at that point of time, that is, the molding condition stored in the current data storage file CURRENT (m).

When the target modification history section for deletion is designated by the operator to delete the modification history from the modification history storage file, the processing taking the place of Steps d2, d4, d7 and d5 described above is required for the target section for deletion to create and preserve the oldest molding condition FIRST (m) in the deletion stage. In this case, it is a matter of course that the initial value of the counter "loop" in the processing taking the place of Step d4 is equivalent to the first address value of the target modification history for deletion, and the target value for comparison of loop in the processing taking the place of Step d6 is equivalent to the final address of the target modification history for deletion.

As described above, the automatic recovery of the molding condition is executable with reference to the modification history storage file by making the backtrack from the latest modification history to the past in sequence or alternatively, with reference to the modification history storage file by making the trace from the oldest modification history toward the latest one in sequence. It may be also possible to cause the operator to designate the recovery means by alternative judgment on condition that both the programs are stored in the CNC device or the host computer 1 in advance, if necessary.

Although the description has been given of the processing in the case of specifying the recovery position for recovering the molding condition immediately after the above specification, the undo processing for recovering the molding condition by making the backtrack from the present modification history to the past in units of one history portion at a time by stages is also available for each of the embodiments described above.

Figure 32:
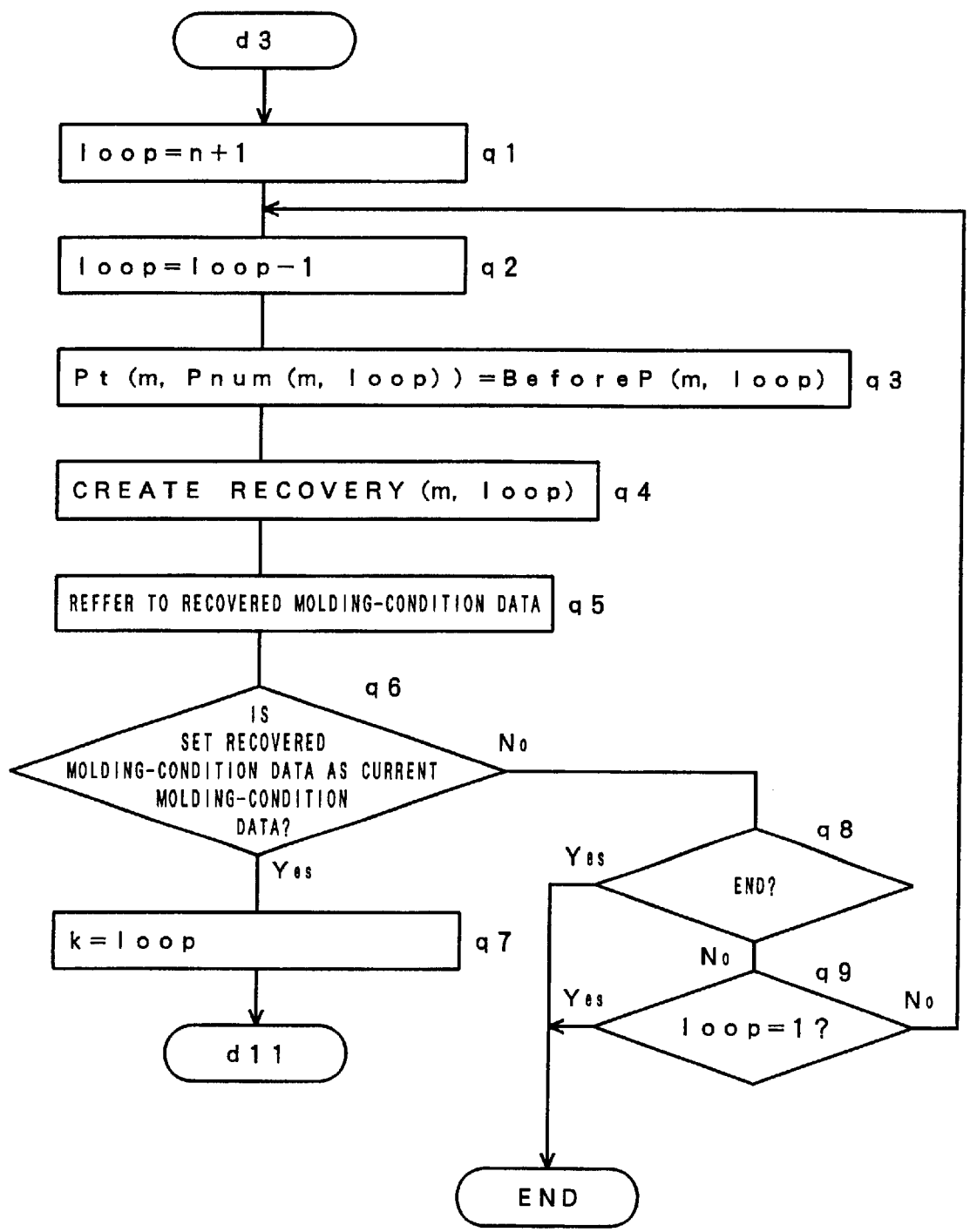
FIG. 32 is a flow chart showing the outline of the processing required for the execution of undo processing.

For instance, only the processing in Steps q1 to q9 shown in FIG. 32, instead of the processing in Steps d4 to d10 included in the processing for recovery of the molding condition shown in FIGS. 12 to 14, may be required for the application of an undo function to the processing to automatically recover the molding condition with reference to the modification history storage file by making the backtrack from the latest modification history to the past in sequence.

In this case, there is no need for the processing for specifying the recovery position, that is, the processing in Step dl included in the processing for recovery of the molding condition shown in FIG. 12.

After having created the temporary file TmpCURRENT (m) and the backup file OrgCURRENT (m) through the processing in Steps d2 and d3, the CNC device subsequently initializes the counter "loop" to a value higher by 1 than the value n of the final record in the modification history storage file (Step q1), and subtracts 1 from the value of the counter "loop" to put the value of the counter "loop" back to the value n of the final record in the modification history storage file (Step q2).

Then, the CNC device reads the value of the data field Pnum (m, loop) in the loop(–)th record in the modification history storage file, that is, the value of Pnum (m, loop) of the number of the molding-condition component subjected to modification on its set value by the loop(–)th modification in No. m injection molding machine on the basis of the current value of the counter "loop", further makes access to the Pnum(m, loop)(–)th data field of the temporary file TmpCURRENT (m), that is, the data field Pt (m, Pnum (m, loop)) of the temporary file TmpCURRENT (m) stored with the set value of the same component as the molding-condition component subjected to modification on its set value by the loop(–)th modification in No. m injection molding machine, on the basis of the value Pnum (m, loop)

described above to replace the contents of the data field. Pt (m, Pnum (m, loop)) with the set value of BeforeP (m, loop) of the last component as of modification on its set value by the loop(-)th modification in No. m injection molding machine and puts the contents of the set value of the molding condition in the temporary file TmpCURRENT (m) back to the precedent state by one record portion (Step q3).

Subsequently, the CNC device inputs the data of each field of the temporary file TmpCURRENT (m) in the data field of the recovery data storage file RECOVERY (m, loop) for No. m injection molding machine, similarly to the processing in step d8 described above (Step q4) and displays a synopsis of the data stored in the fields of the recovery data storage file RECOVERY (m, loop), that is, the molding condition resulting from the backtrack to the past modification history by one record portion from the present point of time on the display screen (Step q5), and the operator is permitted to refer to the displayed data at need.

Then, after having referred to the display, the operator operates the reference end key when only the reference to the data is required, or operates the setting execution key when the recovered molding condition would be applied intact to the future molding.

The CNC device detects these key operations through the processing for decision in Step q6. When the reference end key is operated, the CNC device is placed in the standby state until an undo end key or an undo re-execution key is operated, and decides which key is operated (Step q8). When the undo end key is operated, the CNC device gives up the undo processing and ends intact the processing for recovery of the molding condition.

On the other hand, when the undo re-execution key is operated, the CNC device decides whether or not the value of the counter "loop" is decremented to 1, that is, whether or not the undo processing is executed by backtrack to the oldest modification history in the modification history storage file (Step q9).

When the value of the counter "loop" is not decremented to 1, the undo processing is executable by further backtrack to the past modification history, and the CNC device returns the processing to Step q2 to decrement the value of the counter "loop" by 1, then displays the molding condition resulting from the backtrack to the past modification history by one record portion in the manner similar to the above (Steps q3 to q5), and is placed in the standby state until the reference end key or the setting execution key is pressed by the operator (Step q6).

Further, when the decision in Step q9 results in true by reason that the value of the counter "loop" is decremented to 1, the undo processing by backtrack to the past any more is inexecutable, and the CNC device gives up the undo processing and ends intact the processing for recovery of the molding condition.

On the other hand, when the operation of the setting execution key is detected through the processing for decision in Step q6, it is considered that the molding condition on the display is already selected as the target molding condition for recovery in this stage, and the CNC device sets the current value of the counter "loop" in the recovery position storage register k (Step q7) and executes the processing on and after Step d11 included in the processing for recovery of the molding condition to set the data of each field of the recovery data storage file RECOVERY (m, k) in each data field of the current data storage file CURRENT' (m) for the application to the future molding condition.

The undo processing, if executed as described above, is convenient by reason that the target molding condition for recovery may be selected through the backtrack to the past molding condition one by one, while the molding conditions may be practically checked by eye.

This undo processing is executable even in the case of automatically recovering the molding condition with reference to the modification history storage file by making the trace from the oldest modification history toward the latest one in sequence, although an increase in time required for processing is caused.

Figure 33:
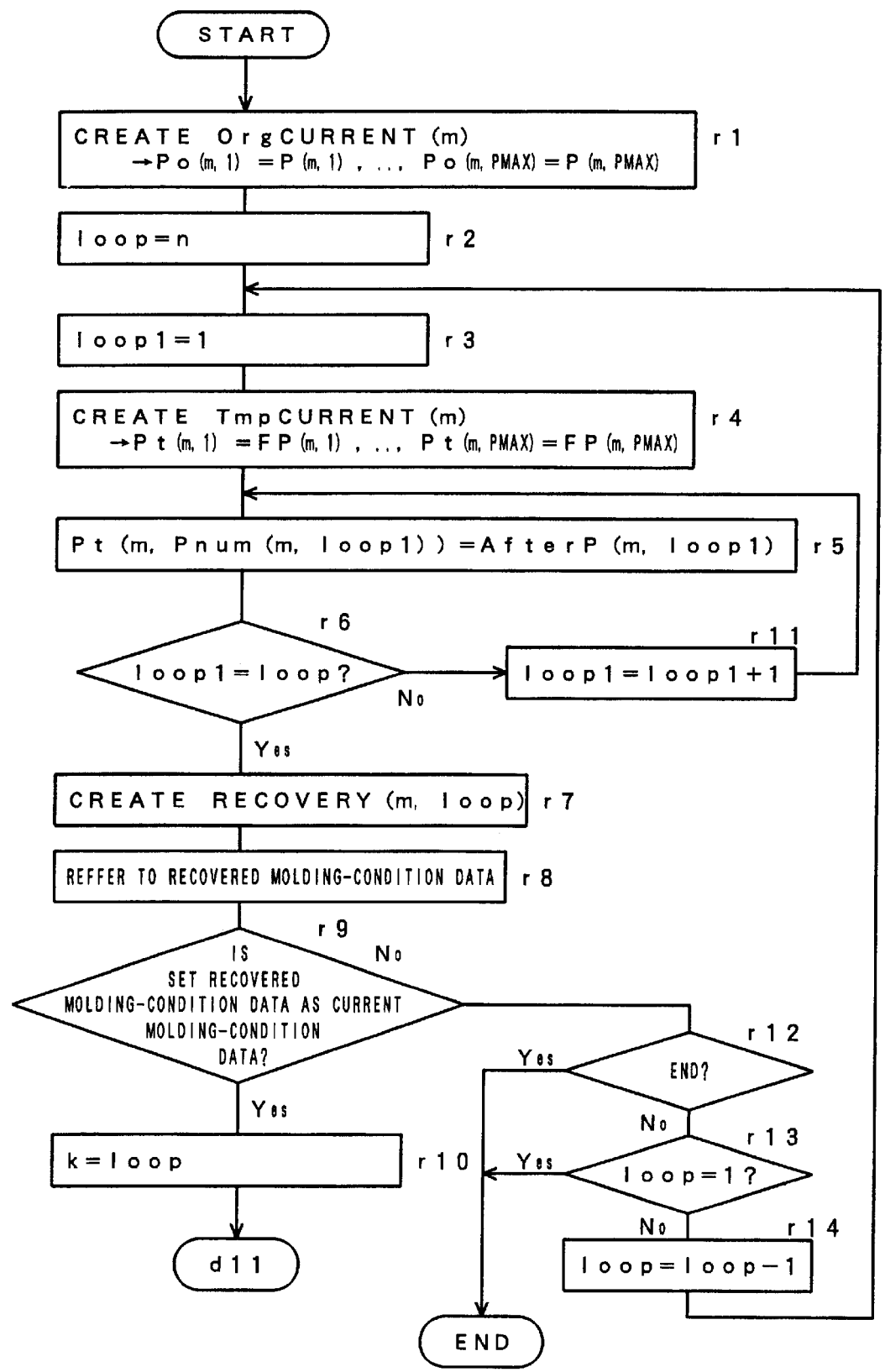
FIG. 33 is a flow chart showing the outline of the processing required for the execution of undo processing.

The processing in Steps r1 to r14 shown in FIG. 33, instead of the processing in Steps d1 to d10 included in the processing for recovery of the molding condition shown in FIGS. 12 to 14, is only sufficient for the execution of the undo processing.

After having created the backup file OrgCURRENT (m) through the processing in Step r1, the CNC device firstly initializes the counter "loop" to the value n of the final record in the modification history storage file (Step r2) and sets a value 1 representing the head address of the modification history storage file to the counter "loop" 1 (Step r3).

Subsequently, the CNC device creates the temporary file TmpCURRENT (m) in the manner similar to the processing in Step d2. However, in this case, each of data FIRSTP (m, 1) to FIRSTP (m, PMAX) of the molding condition items of the oldest molding condition preserved at that point of time, instead of the data of the current data storage file at that point of time, is read in each field of TmpCURRENT current (m) (Step r4).

Subsequently, the CNC device updates each of the molding-condition condition data contained in TmpCURRENT (m) in sequence through the trace of the modification history storage file from the oldest modification history (loop 1=1) toward the latest one (loop 1+1) in sequence by repeatedly executing the processing in Step r5 for Pt (m, Pnum (m, loop1))=AfterP(m, loop1) and the processing in Step r11 for incrementing the value of the counter "loop" 1 by 1 until the decision in step r6 results in true by reason that reaching of loop 1=loop is attained. Consequently, the CNC device permits the recovery of the molding condition as of the loop(-)th modification in TmpCURRENT (m).

Since the value of the counter "loop" as of the first execution of the undo processing is n, the molding condition as of the n(-)th modification, that is, the molding condition precedent by one record to the current data as of the first execution of the undo processing is recovered in TmpCURRENT (m), and this data is assumed to be inputted in the recovery data storage file RECOVERY (m, loop) (Step r7).

Since the processing in Steps r7 to r10 is similar to that in Steps q4 to q7, its description will be here omitted.

When the operation of the undo re-execution key is detected through the processing for decision in Step r12, the CNC device decides whether or not the value of the counter "loop" is decremented to 1, that is, whether or not the undo processing is executed by backtrack to the oldest modification history in the modification history storage file (Step r13). When the value of the counter "loop" is not decremented to 1, the undo processing is executable by further backtrack to the past, and the CNC device decrements the value of the counter "loop" by 1 (Step r14), initializes the counter "loop" 1 to 1 again (Step r3) and repeatedly executes the processing similar to the above. Then, the CNC device recovers the precedent molding condition by one record portion in TmpCURRENT (m), and as a result, sets this data in the recovery data storage file RECOVERY (m, loop) (Steps r4 to r7 and r11).

The undo processing makes a point of setting FIRSTP(m, 1) to FIRSTP(m, PMA serving as the first molding condition in TmpCURRENT (m) as initial values every backtrack to the past molding condition by one record portion, and also a point of recovering the molding condition in sequence by the trace of the modification history storage file from loop1=1 to loop1=loop in sequence. Thus, when loop has a large value, that is, when a large number of modification histories are stored, the undo processing causes a considerable increase in processing time, in comparison with the processing shown in FIG. 32, while it becomes possible to produce the effects in operation similar to those in the processing shown in FIG. 32.

What is claimed is:

1. A molding-condition recovery device in an injection molding machine, comprising:
   a modification history creation unit writing, every setting modification of a molding condition, a modified component of a molding condition and its set value precedent to modification in a modification history storage file for storage in association with the sequence of modifications;
   a set-up unit setting up a point of time of recovery of the molding condition; and
   a recovering unit recovering the molding condition, upon completion of the setup for the point of time of recovery of the molding condition, by replacing the set value for the component read out from the latest modification history in the modification history storage file by backtrack to the past in sequence, among the components of the molding condition as of the setting up, with said readout set value precedent to modification.

2. A molding-condition recovery device in an injection molding machine according to claim 1, wherein said set-up unit setting up the point-of-time-of recovery of the molding condition specifies a point of time of recovery of the molding condition in a manner going back to the past by one modification history for every one manipulation of the means.

3. A molding-condition recovery device in an injection molding machine according to claim 1, wherein the recovered molding condition is displayed on a display screen.

4. A molding-condition recovery device in an injection molding machine according to claim 1, wherein the recovered molding condition is allowed to be set as an object molding condition.

5. A molding-condition recovery device in an injection molding machine according to claim 1, wherein a plurality of injection molding machines are connected to a host computer to manage the modification history of each injection molding machine by batch processing on the side of the host computer.

6. A molding-condition recovery device in an injection molding machine according to claim 1, wherein said set-up unit setting up the point of time of recovery of the molding condition permits the setup of a target point of time for recovery from said modification history storage file by displaying a synopsis of said modification history storage file on the display screen.

7. A molding-condition recovery device in an injection molding machine according to claim 1, wherein said modification history creation unit stores, every setting modification of the molding condition, the time of setting modification of the molding condition in said modification history storage file in association with modification history and said set-up unit setting up the point of time of recovery of the molding condition permits the setup of a target molding condition for recovery from the modification history storage file by designating a time of setting modification or a range of time of setting modification.

8. A molding-condition recovery device in an injection molding machine according to claim 1, wherein said modification history creation unit stores, every setting modification of the molding condition, a shot number as of the setting modification of the molding condition in said modification history storage file in association with the modification history and said set-up unit setting up the point of time of recovery of the molding condition permits the setup of a target molding condition for recovery from said modification history storage file by designating a shot number or a range of a shot number.

9. A molding-condition recovery device in an injection molding machine according to claim 1, wherein said modification history creation unit stores, every setting modification of the molding condition, an arbitrary keyword in said modification history storage file in association with modification history, and said set-up unit setting up the point of time of recovery of the molding condition permits the setup of a target molding condition for recovery from said modification history storage file by designating the keyword.

10. A molding-condition recovery device in an injection molding machine according to claim 1, wherein it further comprises a data base for storing various keywords in association with each other, said modification history creation unit stores an arbitrary keyword in said modification history storage file in association with modification history every setting modification of the molding condition, and said set-up unit setting up the point of time of recovery of the molding condition permits the setup of a target molding condition for recovery by making a search for the modification history having a designated keyword or a keyword related to the designated keyword through said modification history storage file.

11. A molding-condition recovery device in an injection molding machine according to claim 1, wherein said set-up unit setting up the point of time of recovery of the molding condition permits the setup of a target molding condition for recovery from said modification history storage file by designating the molding condition component subjected to setting modification.

12. A molding-condition recovery device in an injection molding machine according to claim 1, wherein said set-up unit setting up the point of time of recovery of the molding condition includes at least two or more of set-up functions selected from a group consisting of a function to set the target point of time for recovery from the modification history storage file by displaying a synopsis of said modification history storage file on a display screen, a function to set the target point of time for recovery from said modification history storage file by designating the time of setting modification of the molding condition or the range of said time, a function to set the target point of time for recovery from the modification history storage file by designating a shot number as of setting modification of the molding condition or a range of said shot number, a function to set the target point of time for recovery from said modification history storage file by designating a stored keyword as of setting modification of the molding condition and a function to set the target molding condition for recovery from the modification history storage file by designating the molding condition component subjected to setting modification, and the point of time specified redundantly by two or more set-up functions is selected as the point of time of recovery of the molding condition.

13. A molding-condition recovery device in an injection molding machine, comprising:
   a modification history creation unit writing, every setting modification of a molding condition, a modified component of a molding condition and its set value subsequent to the modification in a modification history storage file for storage in association with the sequence of modifications;

a set-up unit setting up a point of time of recovery of a first molding condition; and a recovering unit recovering the molding condition, upon completion of the setup for the point of time of recovery of the molding condition, by replacing the set value for the component read out from the oldest modification history in the modification history storage file in sequence by trace, among the components of the first molding condition, with the readout set value subjected to modification.

14. A control device for controlling the operation of a machine according to predetermined operating conditions, comprising;

a current operating-condition memory means for storing the current operating condition required for the control of said machine;

a manual input means for modifying the value of each component forming said operating condition;

a modification history memory means for storing a series of data containing a component of which value is modified and the modified value and a time of the modification as one record in sequence whenever modification is made on one of said components by said manual input means;

a record designating means for designating any one of a plurality of records stored in said modification history memory means; and a means for specifying, when any record is designated by said record designation means, each component whose value has been renewed or remains unmodified at a time of said record designation, by referring to the designated record and all the records having modification times older than the modification time of said designated record, and then combining these specified components to reconfigurate an operating condition.

15. A control device according to claim 14, wherein it further comprises a means for transferring the operating condition reconfigured by said means for reconfiguring said operating condition to said current operating-condition memory means.

16. A molding-condition recovery device in an injection molding machine, comprising:

memory means for storing, when a set value of a component of molding condition is modified, the set value prior to such modification of that component in accordance with sequence of modifications;

means for specifying a past molding cycle; and means for reproducing, when said past molding cycle is specified, the molding condition in the specified past molding cycle by successively substituting the set values prior to such modifications, stored in said memory means, for the set values of the molding-condition at the time of such specifying of said past molding cycle.

17. A molding-condition recovery device in an injection molding machine, comprising:

memory means for storing, when a set value of a component of molding condition is modified, the set value subjected to the modification of that component in accordance with sequence of modifications;

molding condition memory means for storing a molding condition for storing a molding condition just prior to a modification of molding condition in which said modification was executed to the oldest set value subjected to the modification stored in said memory means;

means for specifying a past molding cycle; and means for reproducing, when said past molding cycle is specified, the molding condition in the specified past molding cycle by successively substituting the set values subjected to modifications, stored in said memory means, for the set values of the molding condition stored in said molding condition memory means.

* * * * *

UNITED STATES PATENT AND TRADEMARK OFFICE
CERTIFICATE OF CORRECTION

PATENT NO. : 6,381,512 B1
DATED : April 30, 2002
INVENTOR(S) : Osamu Saitou et al.

It is certified that error appears in the above-identified patent and that said Letters Patent is hereby corrected as shown below:

<u>Title page,</u>
Item [75], after "Osamu Saitou" insert -- , Minamitsuru --; after "Kazuo Kubota" insert --, Fujiyoshida --; delete "Yamanashi".

<u>Column 21,</u>
Line 14, change "hi" to -- h1 --.
Line 35, insert -- . -- after "(Step s12)".

<u>Column 31,</u>
Line 17, change "hi" to -- h1 --.

<u>Column 34,</u>
Line 30, change "HighSearchD ate" to -- HighSearchDate --
Line 53, change "LowSearcShot" to -- LowSearchShot --.

<u>Column 38,</u>
Line 26, change "tmpCUURENT" to -- TmpCURRENT --.

<u>Column 39,</u>
Line 3, change "RECOVERY" to -- RECOVERY' --.

<u>Column 41,</u>
Line 24, change "MterP" to -- AfterP --.
Line 66, change "Value" to -- value --.

<u>Column 45,</u>
Line 62, change "di" to -- d1 --.

<u>Column 47,</u>
Line 20, change "computers" to -- computer1 --.
Line 57, change "t his" to -- this --.

<u>Column 54,</u>
Line 67, insert -- ) -- after "PMA".

UNITED STATES PATENT AND TRADEMARK OFFICE
CERTIFICATE OF CORRECTION

PATENT NO. : 6,381,512 B1
DATED : April 30, 2002
INVENTOR(S) : Osamu Saitou et al.

It is certified that error appears in the above-identified patent and that said Letters Patent is hereby corrected as shown below:

<u>Column 57,</u>
Line 6, "a" begins a new paragraph.

Signed and Sealed this

Third Day of September, 2002

Attest:

JAMES E. ROGAN
*Attesting Officer*    *Director of the United States Patent and Trademark Office*